United States Patent
Machida

(10) Patent No.: US 11,333,868 B2
(45) Date of Patent: *May 17, 2022

(54) ZOOM OPTICAL SYSTEM, OPTICAL APPARATUS, IMAGING APPARATUS AND METHOD FOR MANUFACTURING THE ZOOM OPTICAL SYSTEM

(71) Applicant: Nikon Corporation, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 441 days.

This patent is subject to a terminal disclaimer.

(21) Appl. No.: 16/345,203

(22) PCT Filed: Nov. 21, 2016

(86) PCT No.: PCT/JP2016/084397
§ 371 (c)(1),
(2) Date: Aug. 2, 2019

(87) PCT Pub. No.: WO2018/092297
PCT Pub. Date: May 24, 2018

(65) Prior Publication Data
US 2019/0353880 A1    Nov. 21, 2019

(51) Int. Cl.
*G02B 15/14* (2006.01)
*G02B 15/16* (2006.01)

(52) U.S. Cl.
CPC ..... *G02B 15/144105* (2019.08); *G02B 15/16* (2013.01)

(58) Field of Classification Search
CPC . G02B 15/14; G02B 15/144105; G02B 15/16
(Continued)

(56) References Cited

U.S. PATENT DOCUMENTS

| 6,061,180 A | 5/2000 | Hayakawa |
| 2009/0190220 A1 | 7/2009 | Sato |

(Continued)

FOREIGN PATENT DOCUMENTS

| CN | 101842730 A | 9/2010 |
| JP | 04-293007 A | 10/1992 |

(Continued)

OTHER PUBLICATIONS

Office Action dated Jan. 21, 2020, in Japanese Patent Application No. 2018-550990.

(Continued)

*Primary Examiner* — James R Greece
(74) *Attorney, Agent, or Firm* — SGPatents PLLC

(57) ABSTRACT

A zoom optical system comprises, in order from an object: a front lens group (GFS) having a positive refractive power; an M1 lens group (GM1) having a negative refractive power; an M2 lens group (GM2) having a positive refractive power; and an RN lens group (GRN) having a negative refractive power, wherein upon zooming, distances between the front lens group and the M1 lens group, between the M1 lens group and the M2 lens group, and between the M2 lens group and the RN lens group change, upon focusing from an infinite distant object to a short distant object, the RN lens group moves, and the M2 lens group comprises an A lens group that satisfies a following conditional expression, $1.10 < \mathrm{fvr}/\mathrm{fTM2} < 2.00$, where, fvr: a focal length of the A lens group, and fTM2: a focal length of the M2 lens group in a telephoto end state.

17 Claims, 37 Drawing Sheets

(58) Field of Classification Search
USPC .................................................. 359/676, 686
See application file for complete search history.

(56) References Cited

U.S. PATENT DOCUMENTS

| | | | |
|---|---|---|---|
| 2009/0251778 A1 | 10/2009 | Adachi et al. | |
| 2009/0290232 A1* | 11/2009 | Hagiwara | G02B 15/145121 359/695 |
| 2010/0284092 A1* | 11/2010 | Hayakawa | G02B 15/145121 359/683 |
| 2012/0019931 A1 | 1/2012 | Ogata et al. | |
| 2012/0050603 A1* | 3/2012 | Imaoka | G02B 15/142 348/347 |
| 2012/0242887 A1* | 9/2012 | Matsumura | H04N 5/23296 348/345 |
| 2014/0022647 A1 | 1/2014 | Ogata et al. | |
| 2014/0211029 A1 | 7/2014 | Okumura | |

FOREIGN PATENT DOCUMENTS

| | | |
|---|---|---|
| JP | H10-133113 | 5/1998 |
| JP | 10-268195 A | 10/1998 |
| JP | 2009-175202 A | 8/2009 |
| JP | 2009-180844 A | 8/2009 |
| JP | 2009-265654 A | 11/2009 |
| JP | 2009-282398 A | 12/2009 |
| JP | 2012-027261 A | 2/2012 |
| JP | 2012-047814 A | 3/2012 |
| JP | 2012-212106 A | 11/2012 |
| JP | 2013-117667 A | 6/2013 |
| JP | 2013-235218 A | 11/2013 |
| JP | 2014-044246 A | 3/2014 |
| JP | 2014-145960 A | 8/2014 |
| JP | 2015-166790 A | 9/2015 |

OTHER PUBLICATIONS

English Translation of International Search Report from International Patent Application No. PCT/JP2016/084397, dated Feb. 14, 2017.
English Translation of International Preliminary Report on Patentability from International Patent Application No. PCT/JP2016/084397, dated May 31, 2019.
Office Action dated Dec. 23, 2020, in Chinese Patent Application No. 201680090910.0.
Office Action dated Sep. 14, 2021, in Japanese Patent Application No. 2020-157441.

* cited by examiner

COMA ABERRATION

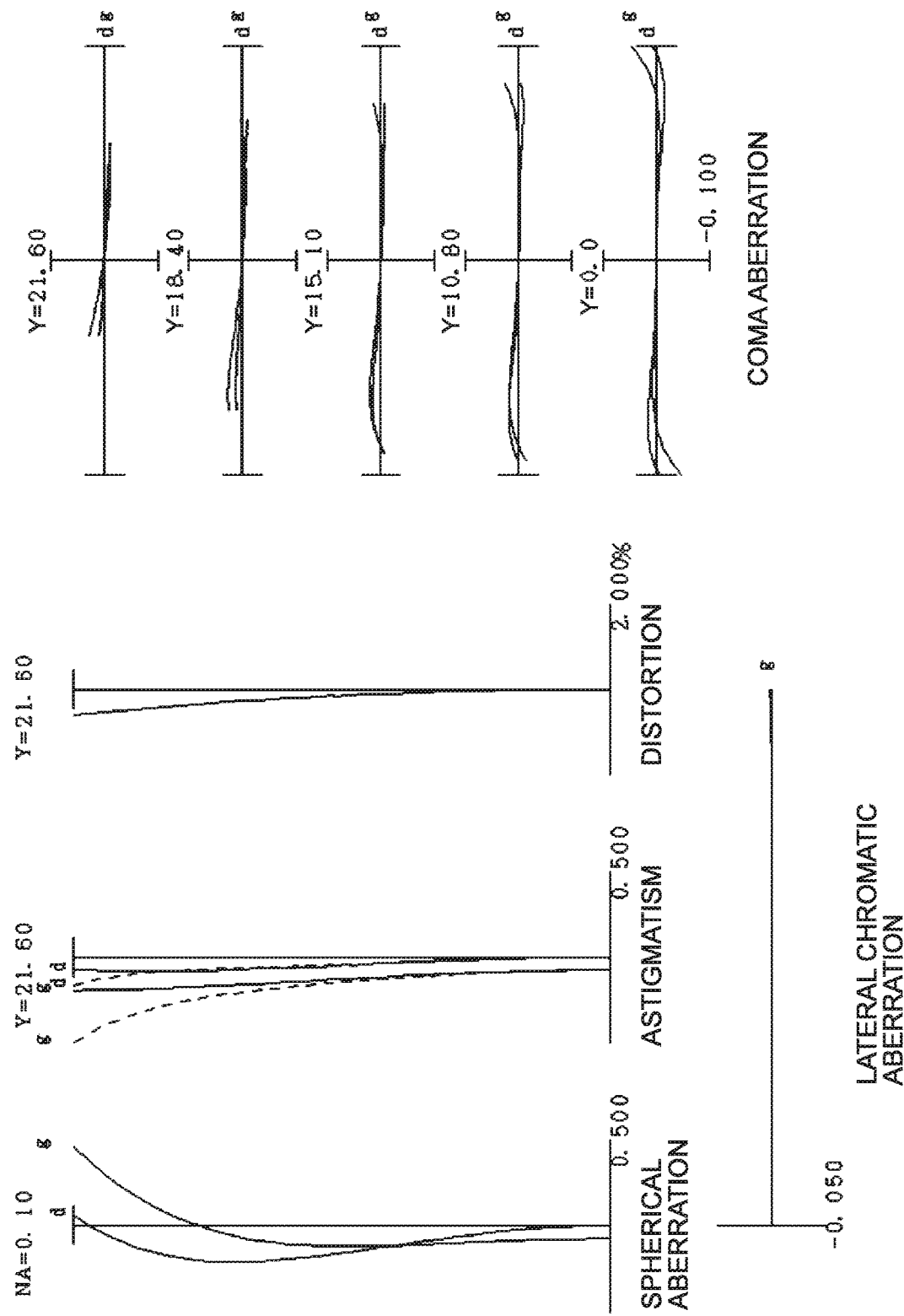

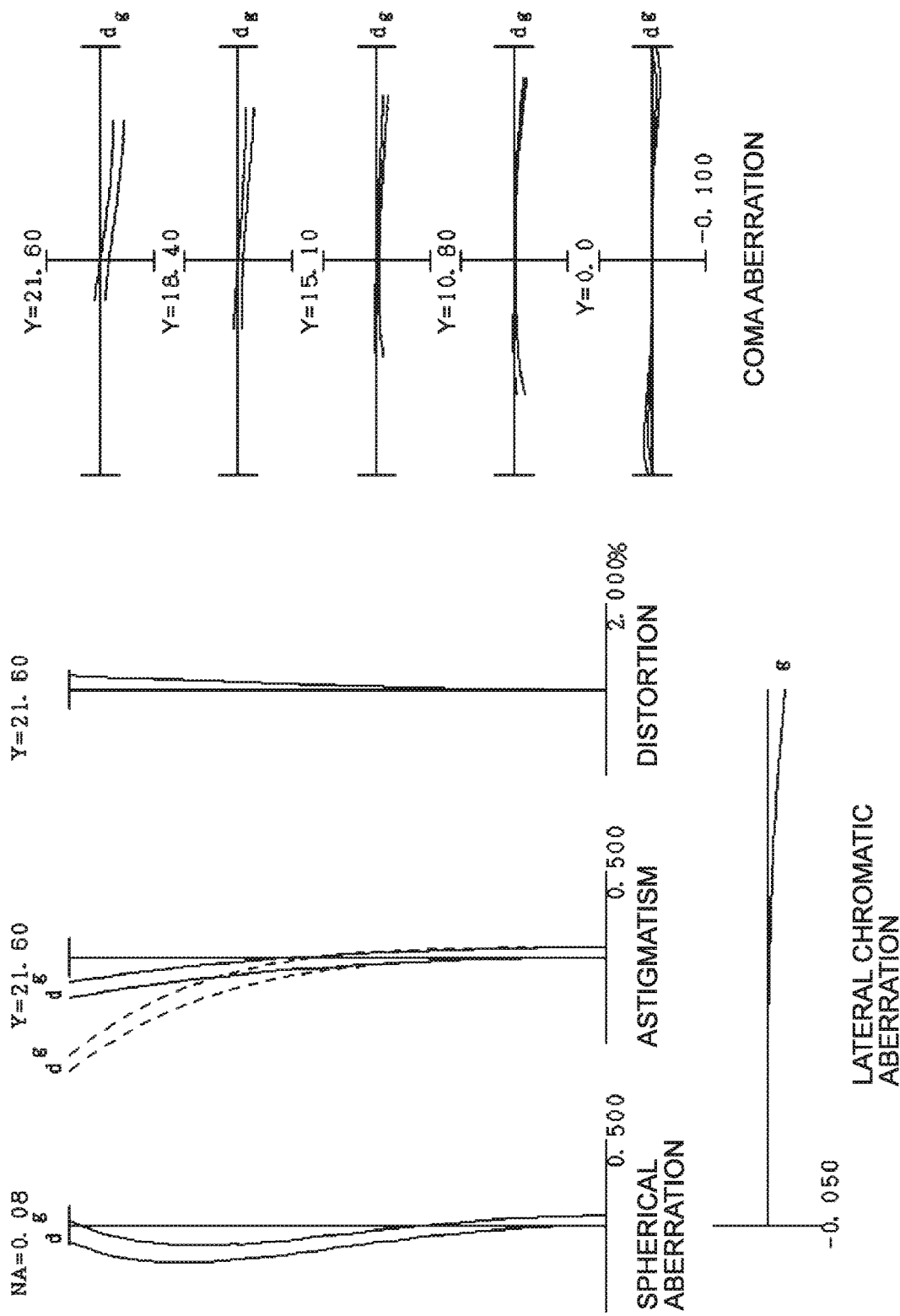

COMA ABERRATION

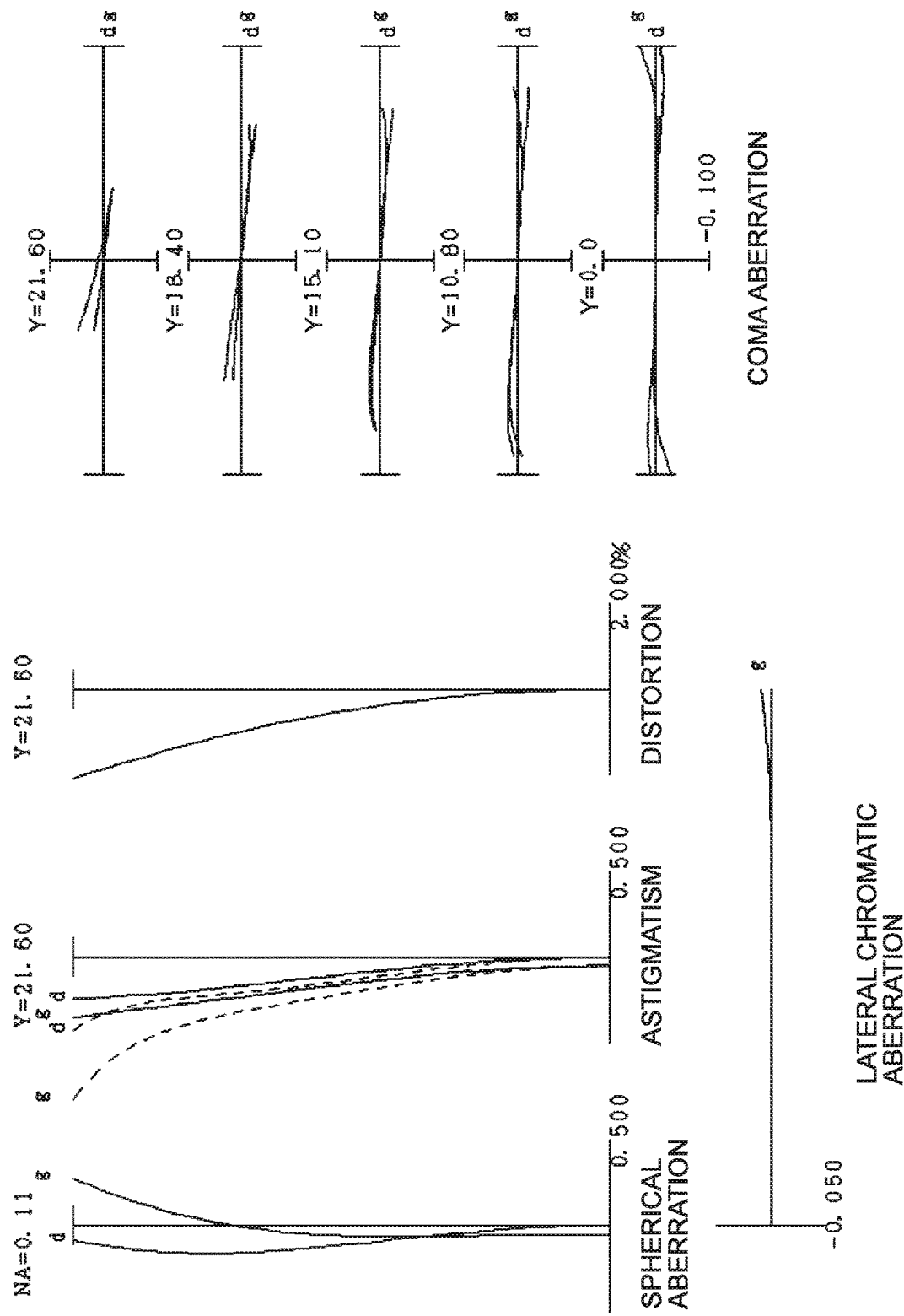

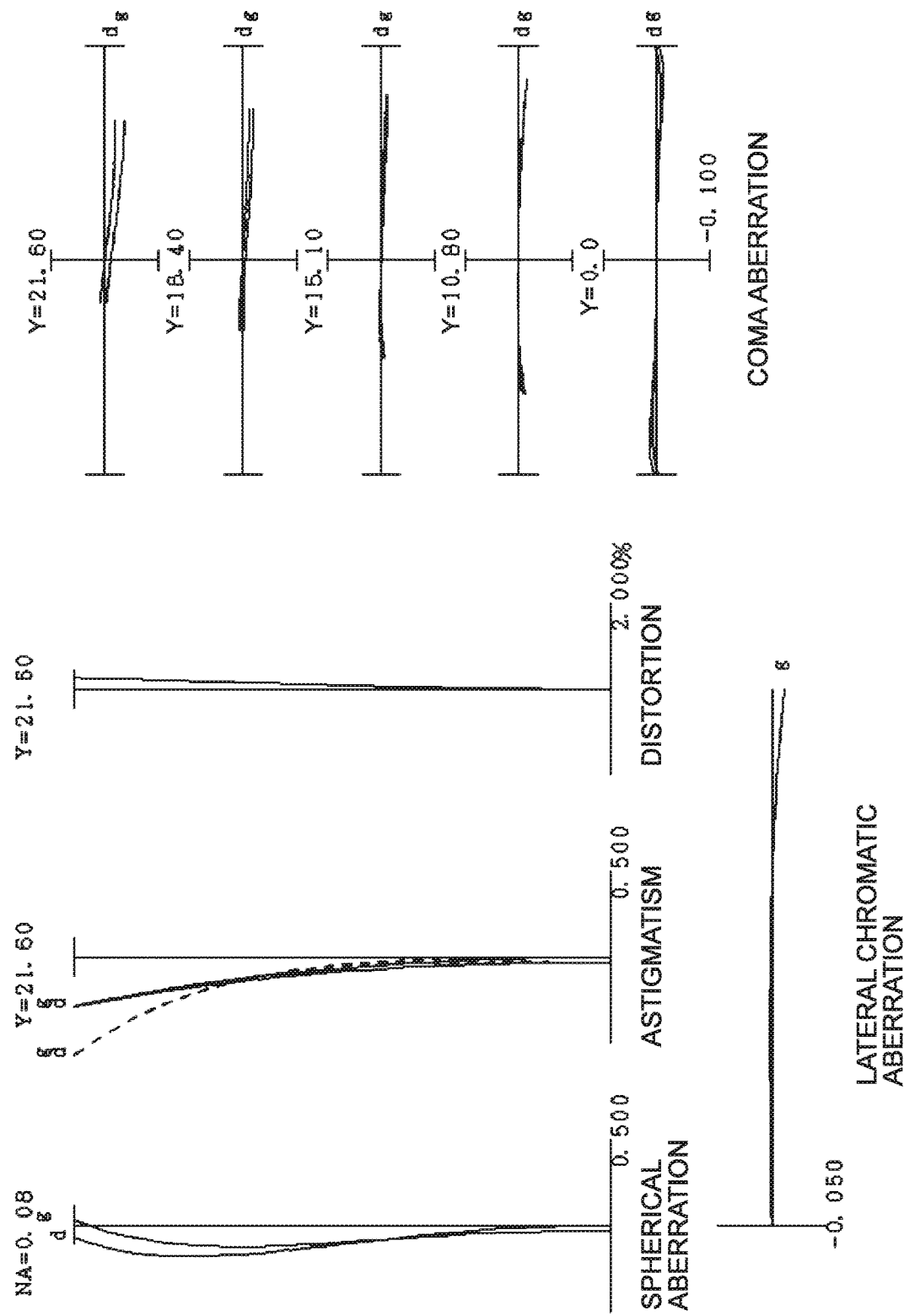

COMA ABERRATION

COMA ABERRATION

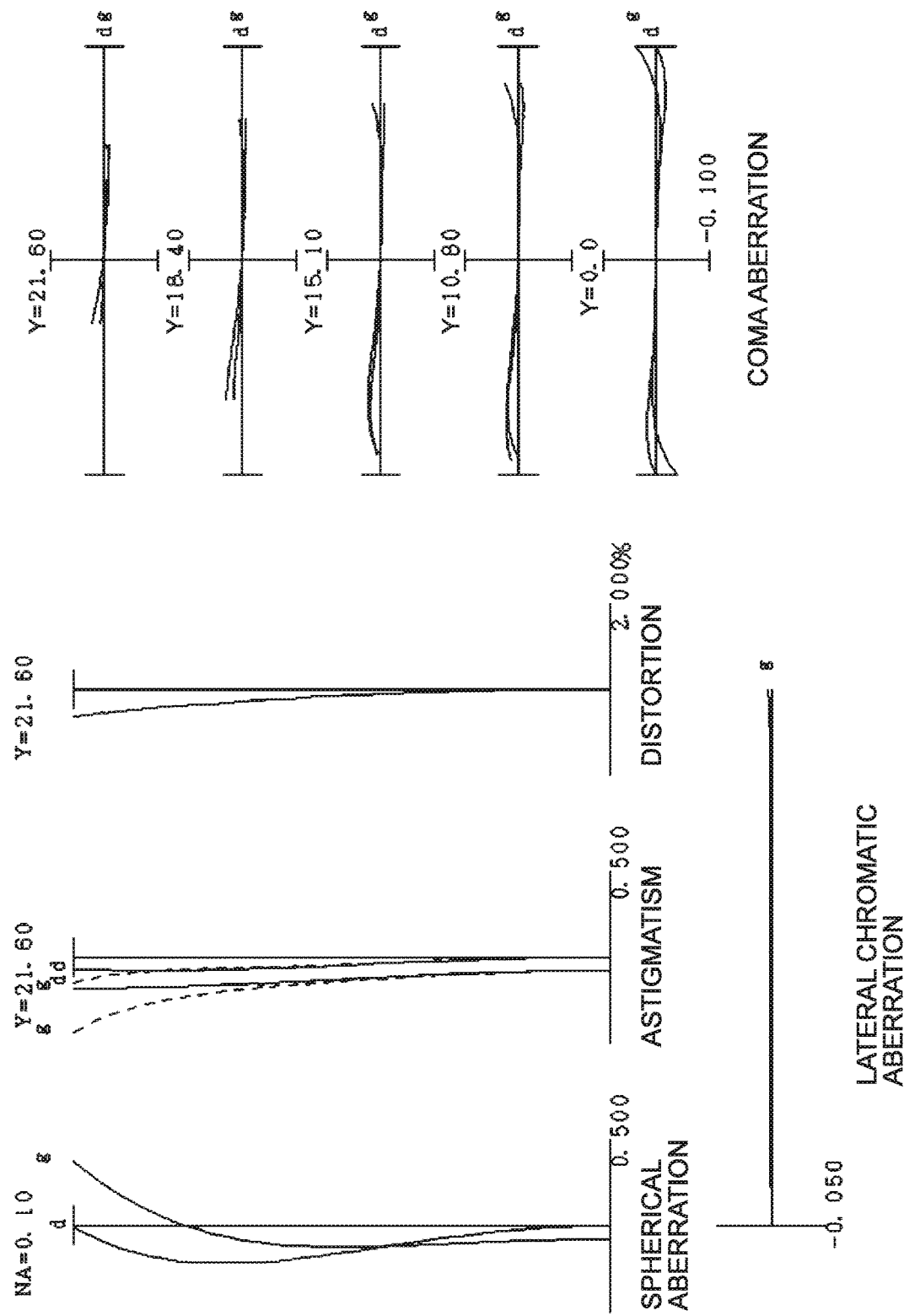

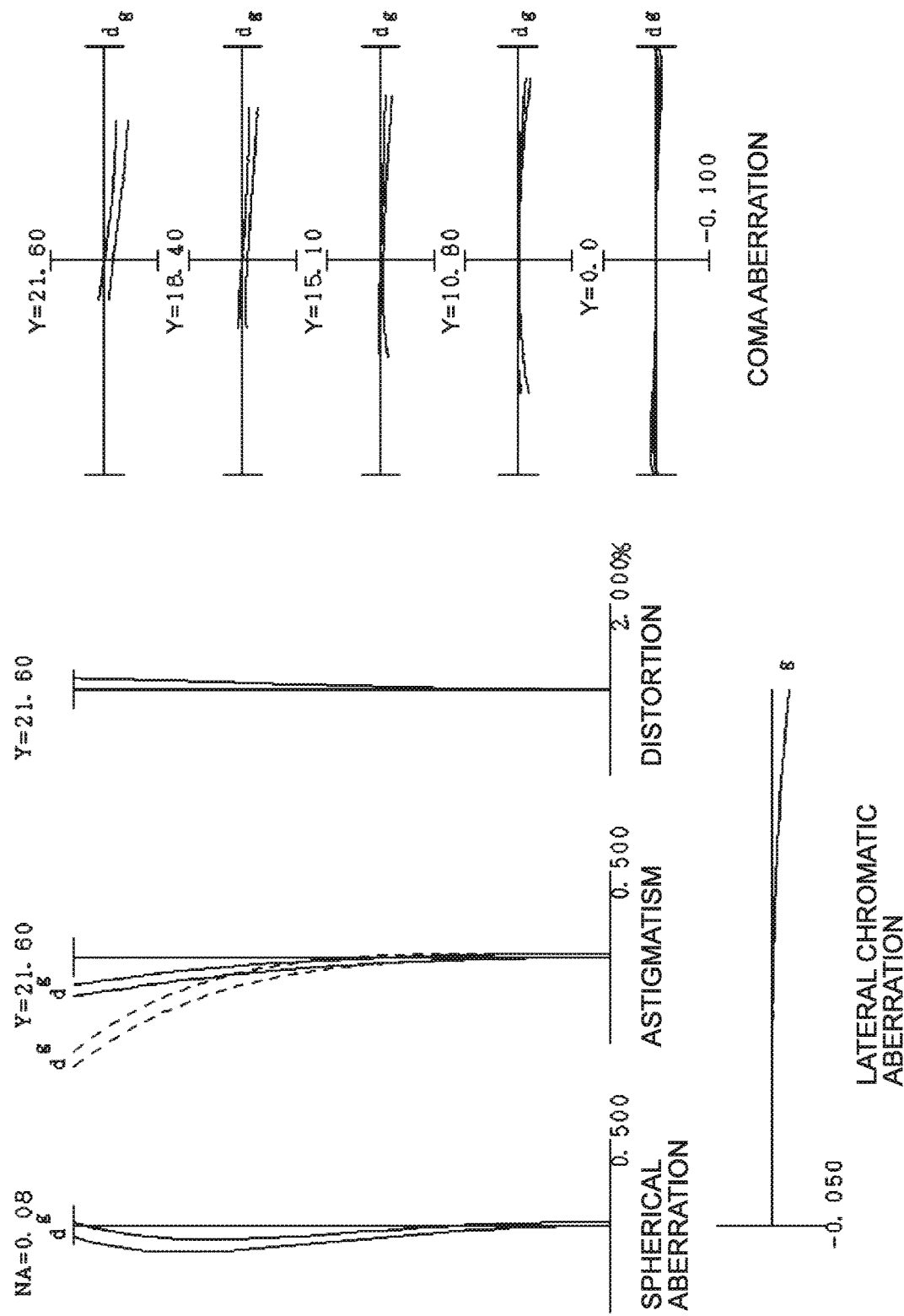

COMA ABERRATION

COMA ABERRATION

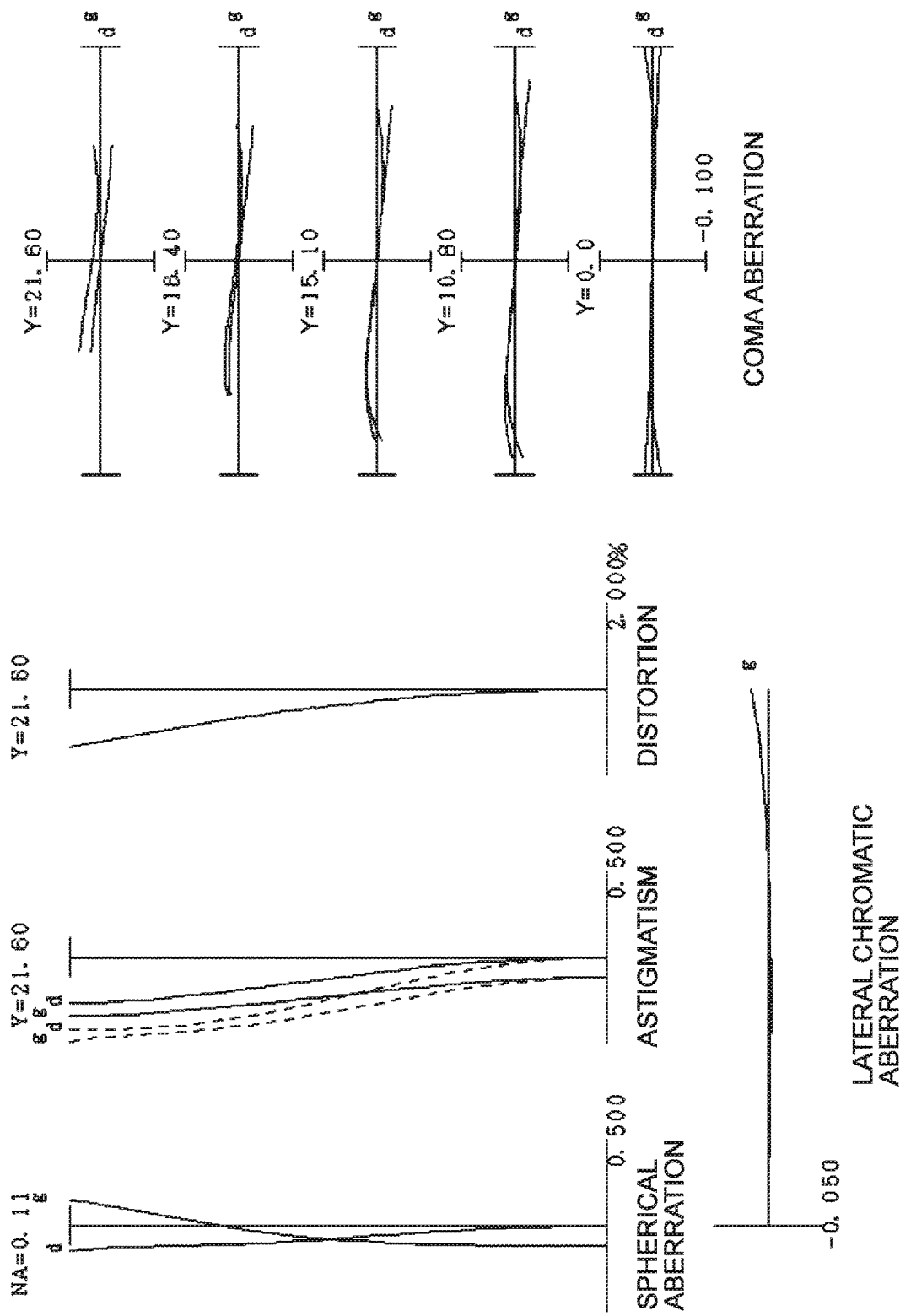

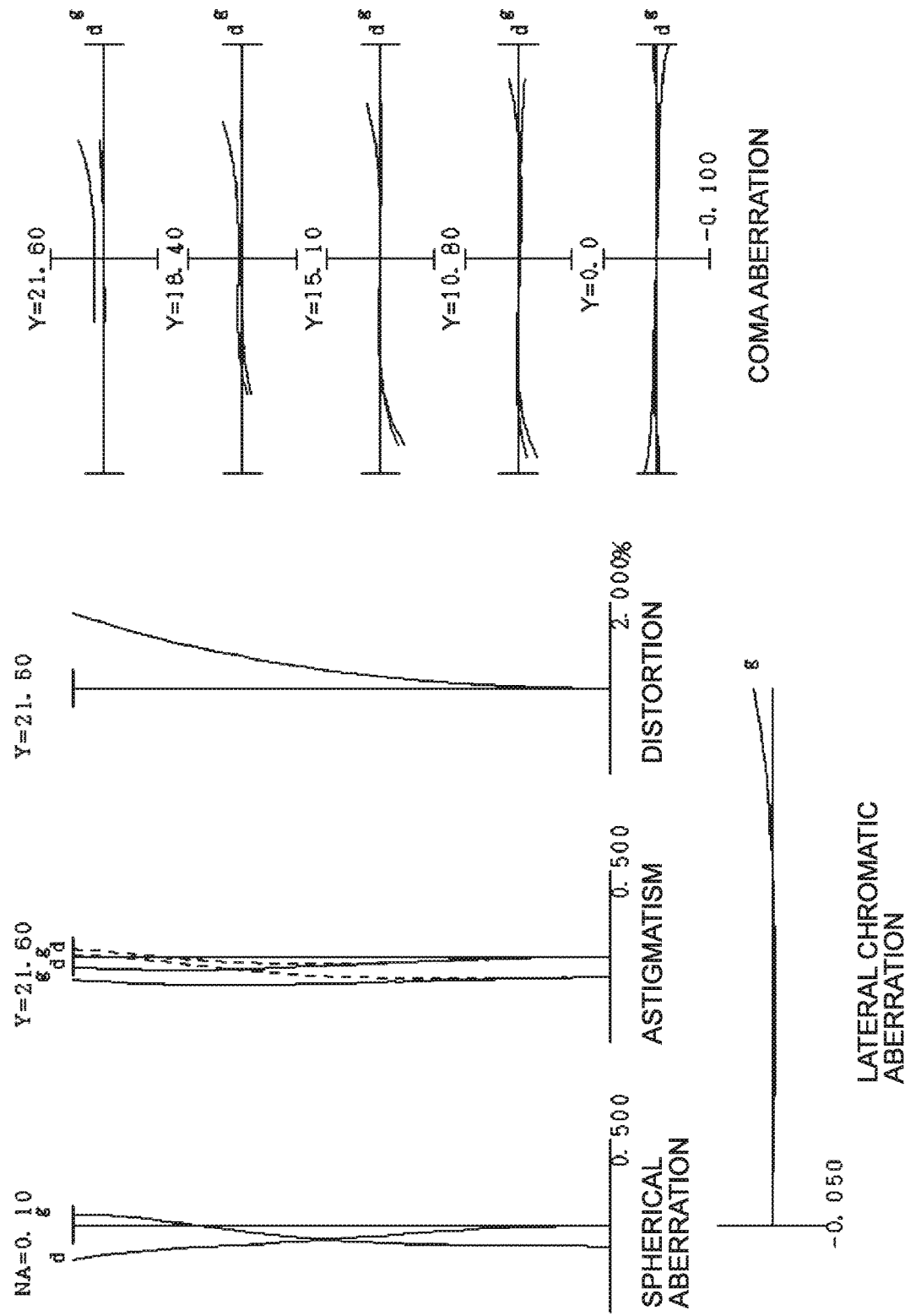

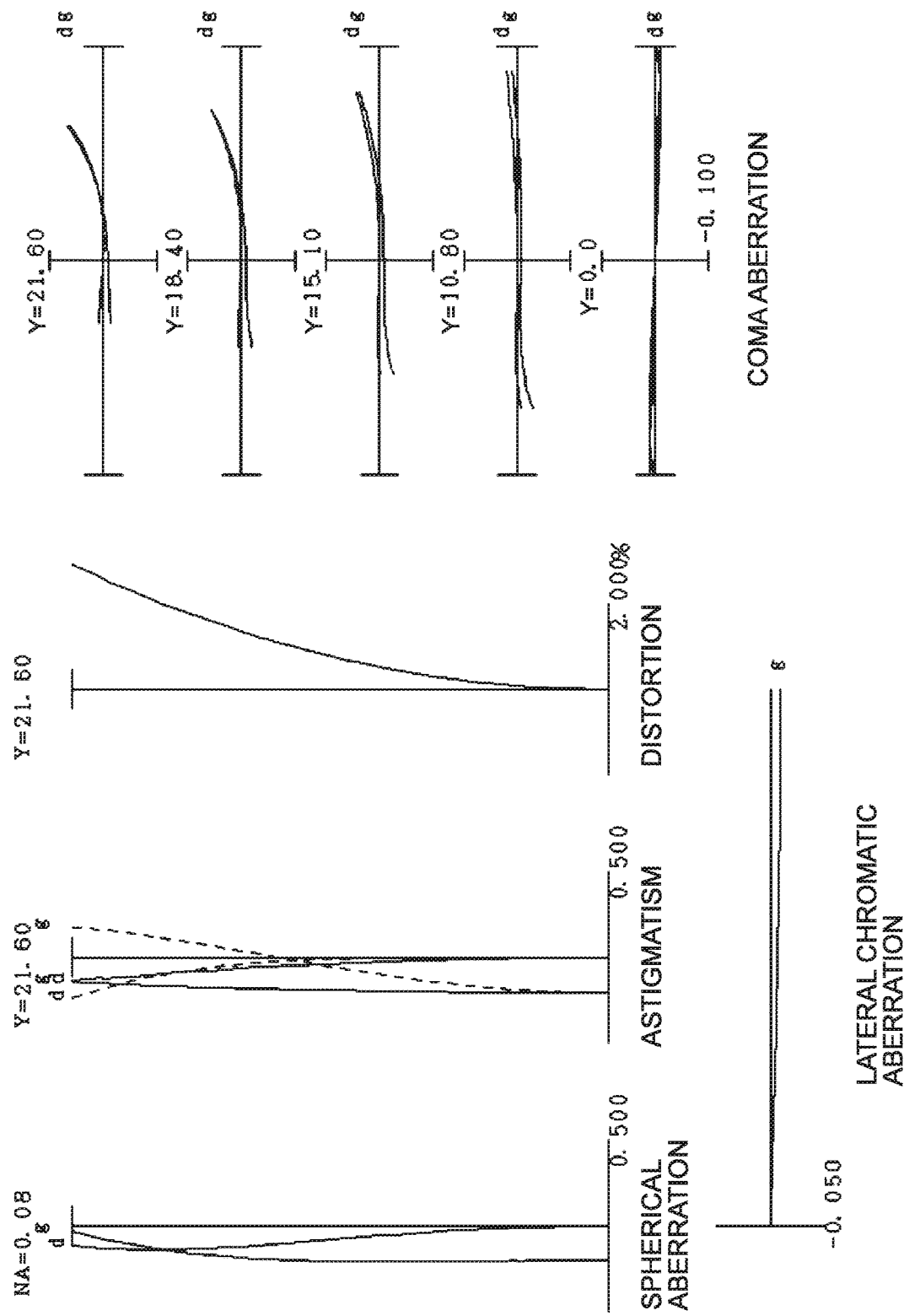

COMA ABERRATION

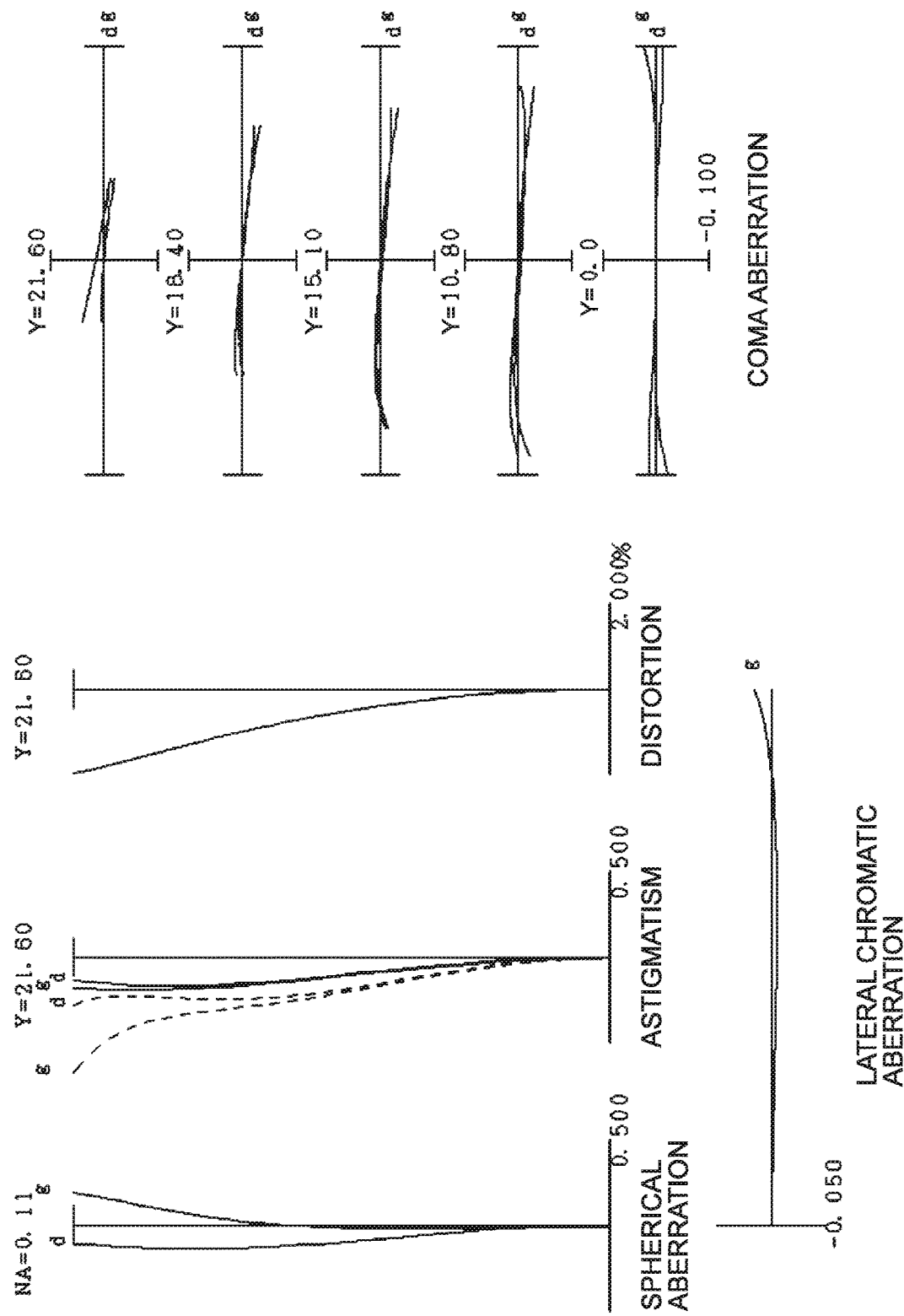

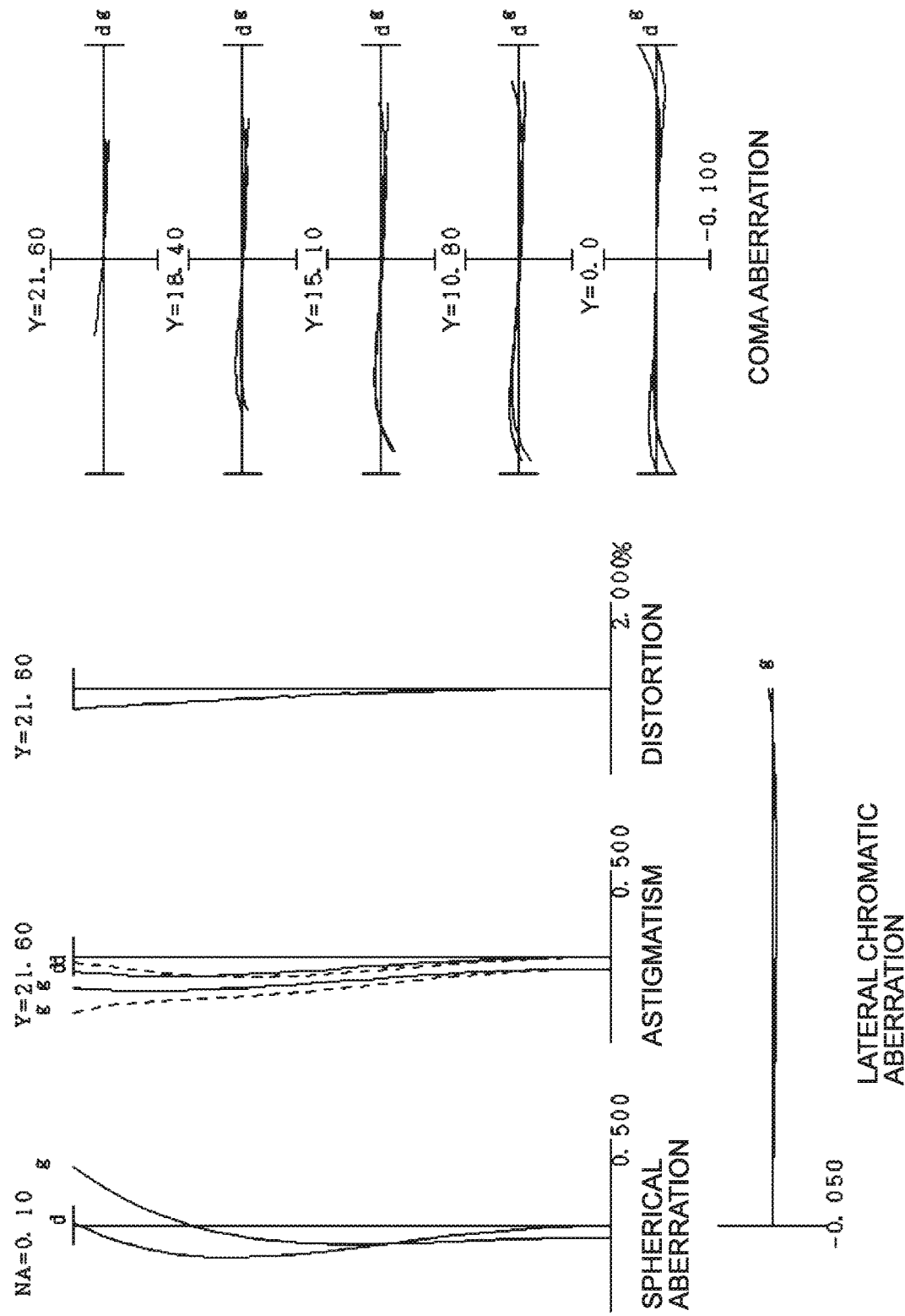

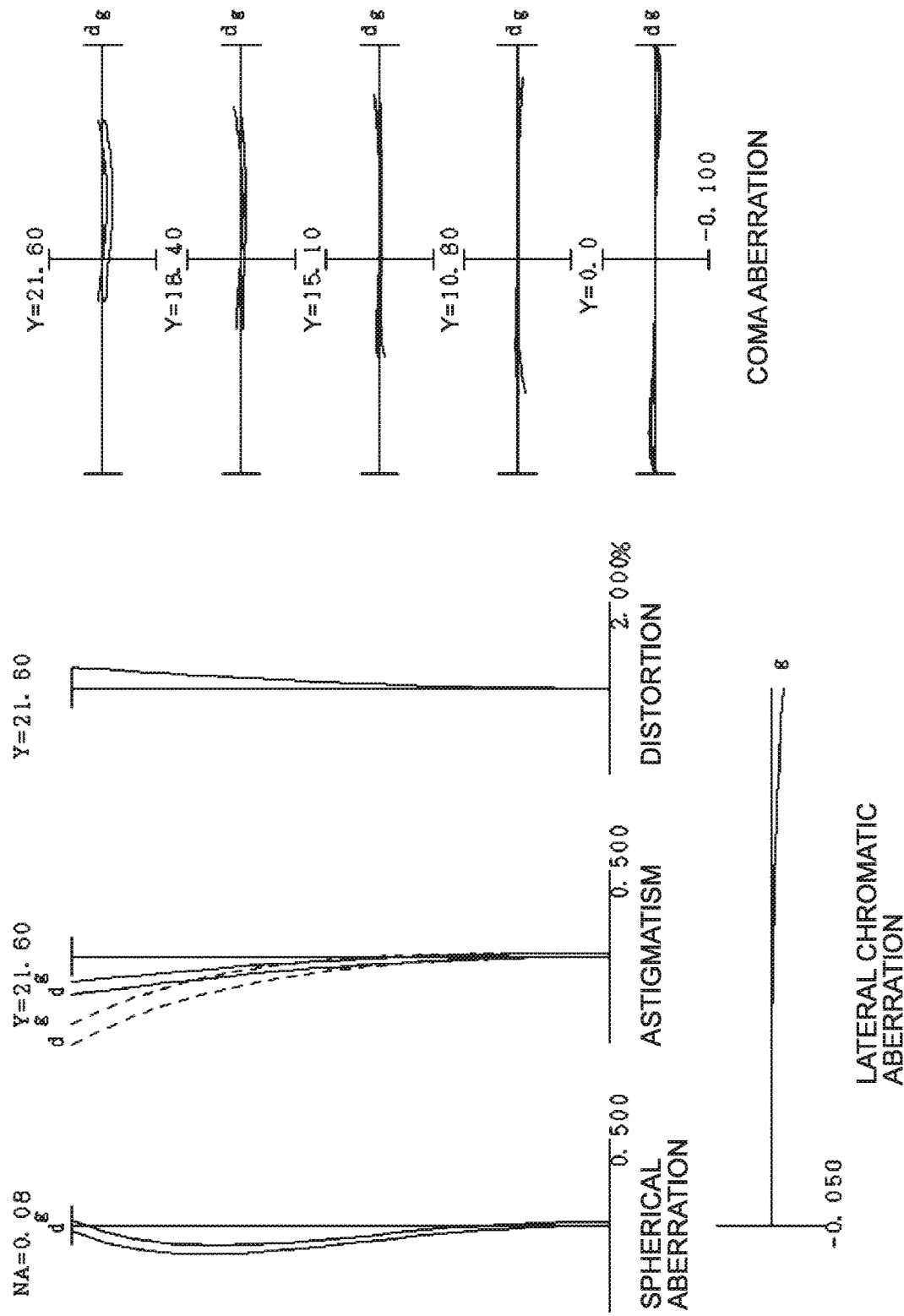

US 11,333,868 B2

ZOOM OPTICAL SYSTEM, OPTICAL APPARATUS, IMAGING APPARATUS AND METHOD FOR MANUFACTURING THE ZOOM OPTICAL SYSTEM

TECHNICAL FIELD

The present invention relates to a zoom optical system, an optical apparatus and an imaging apparatus including the same, and a method for manufacturing the zoom optical system.

TECHNICAL BACKGROUND

Conventionally, zoom optical systems suitable for photographic cameras, electronic still cameras, video cameras and the like have been proposed (for example, see Patent literature 1).

PRIOR ARTS LIST

Patent Document

Patent literature 1: Japanese Laid-Open Patent Publication No. H4-293007(A)

Unfortunately, according to the conventional zoom optical system, reduction in the weight of a focusing lens group is insufficient.

SUMMARY OF THE INVENTION

A zoom optical system according to the present invention comprises, in order from an object: a front lens group having a positive refractive power; an M1 lens group having a negative refractive power; an M2 lens group having a positive refractive power; and an RN lens group having a negative refractive power, wherein upon zooming, a distance between the front lens group and the M1 lens group changes, a distance between the M1 lens group and the M2 lens group changes, and a distance between the M2 lens group and the RN lens group changes, upon focusing from an infinite distant object to a short distant object, the RN lens group moves, and the M2 lens group comprises an A lens group that satisfies a following conditional expression, $$1.10 < fvr/fTM2 < 2.00$$

where fvr: a focal length of the A lens group, and fTM2: a focal length of the M2 lens group in a telephoto end state.

An optical apparatus according to the present invention comprises the zoom optical system.

An imaging apparatus according to the present invention comprises: the zoom optical system; and an imaging unit that takes an image formed by the zoom optical system.

A method for manufacturing a zoom optical system according to the present invention is a method for manufacturing a zoom optical system comprising, in order from an object, a front lens group having a positive refractive power, an M1 lens group having a negative refractive power, an M2 lens group having a positive refractive power, and an RN lens group having a negative refractive power, the method comprising achieving an arrangement where upon zooming, a distance between the front lens group and the M1 lens group changes, a distance between the M1 lens group and the M2 lens group changes, and a distance between the M2 lens group and the RN lens group changes, wherein upon focusing from an infinite distant object to a short distant object, the RN lens group moves, and the M2 lens group comprises an A lens group that satisfies a following conditional expression, $$1.10 < fvr/fTM2 < 2.00$$

where fvr: a focal length of the A lens group, and fTM2: a focal length of the M2 lens group in a telephoto end state.

BRIEF DESCRIPTION OF THE DRAWINGS

FIGS. 5A, 5B and 5C are graphs showing various aberrations of the zoom optical system according to the first example upon focusing on a short distant object in the wide-angle end state, the intermediate focal length state, and the telephoto end state, respectively;

FIGS. 10A, 10B and 10C are graphs showing various aberrations of the zoom optical system according to the second example upon focusing on a short distant object in the wide-angle end state, the intermediate focal length state, and the telephoto end state, respectively;

FIGS. 15A, 15B and 15C are graphs showing various aberrations of the zoom optical system according to the third example upon focusing on a short distant object in the wide-angle end state, the intermediate focal length state, and the telephoto end state, respectively;

FIGS. 20A, 20B and 20C are graphs showing various aberrations of the zoom optical system according to the fourth example upon focusing on a short distant object in the wide-angle end state, the intermediate focal length state, and the telephoto end state, respectively;

FIGS. 25A, 25B and 25C are graphs showing various aberrations of the zoom optical system according to the fifth example upon focusing on a short distant object in the wide-angle end state, the intermediate focal length state, and the telephoto end state, respectively;

DESCRIPTION OF THE EMBODIMENTS

Figure 1:
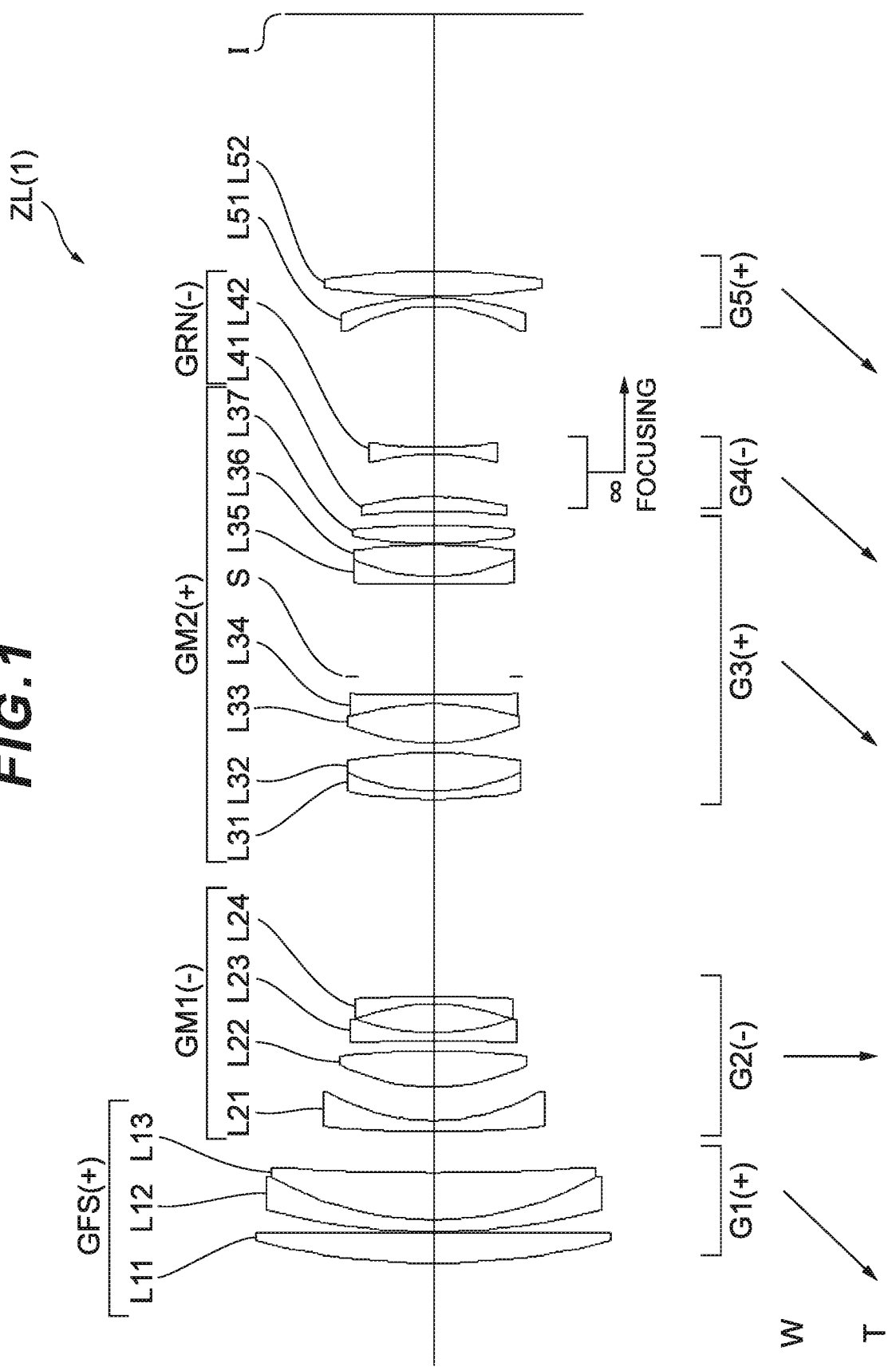
FIG. 1 shows a lens configuration of a zoom optical system according to a first example of this embodiment.

Hereinafter, a zoom optical system, an optical apparatus, and an imaging apparatus of this embodiment are described with reference to the drawings. As shown in FIG. 1, a zoom optical system ZL(1) that is an example of a zoom optical system (zoom lens) ZL according to this embodiment comprises, in order from an object: a front lens group GFS having a positive refractive power; an M1 lens group GM1 having a negative refractive power; an M2 lens group GM2 having a positive refractive power; and an RN lens group GRN having a negative refractive power, wherein upon zooming, a distance between the front lens group GFS and the M1 lens group GM1 changes, a distance between the M1 lens group GM1 and the M2 lens group GM2 changes, and a distance between the M2 lens group GM2 and the RN lens group GRN changes, upon focusing from an infinite distant object to a short distant object, the RN lens group GRN moves, and the M2 lens group GM2 comprises an A lens group that satisfies a following conditional expression (1), $$1.10 < fvr/fTM2 < 2.00 \tag{1}$$

where
fvr: a focal length of the A lens group, and
fTM2: a focal length of the M2 lens group GM2 in a telephoto end state.

Figure 6:
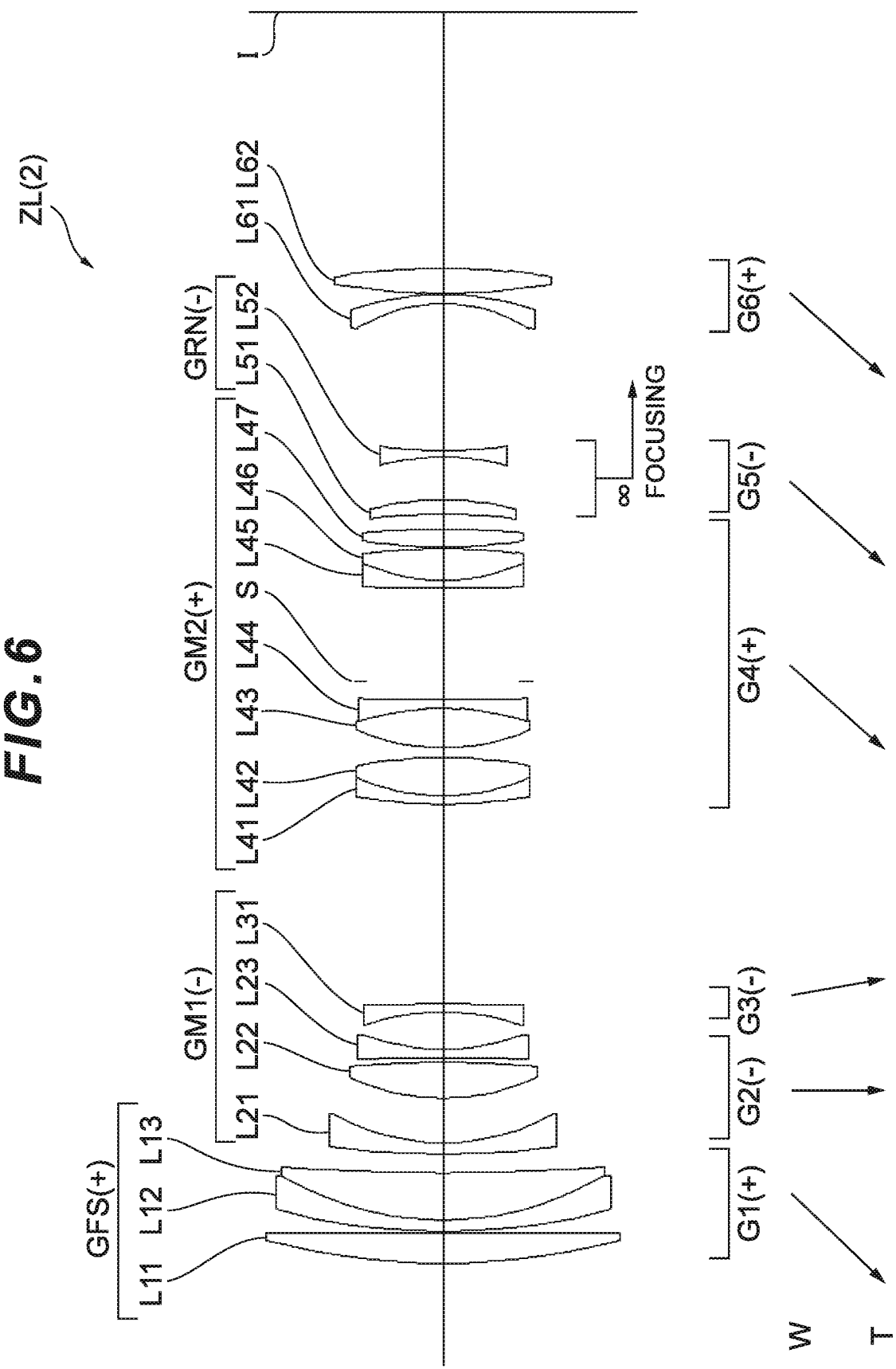
FIG. 6 shows a lens configuration of a zoom optical system according to a second example of this embodiment.
Figure 11:
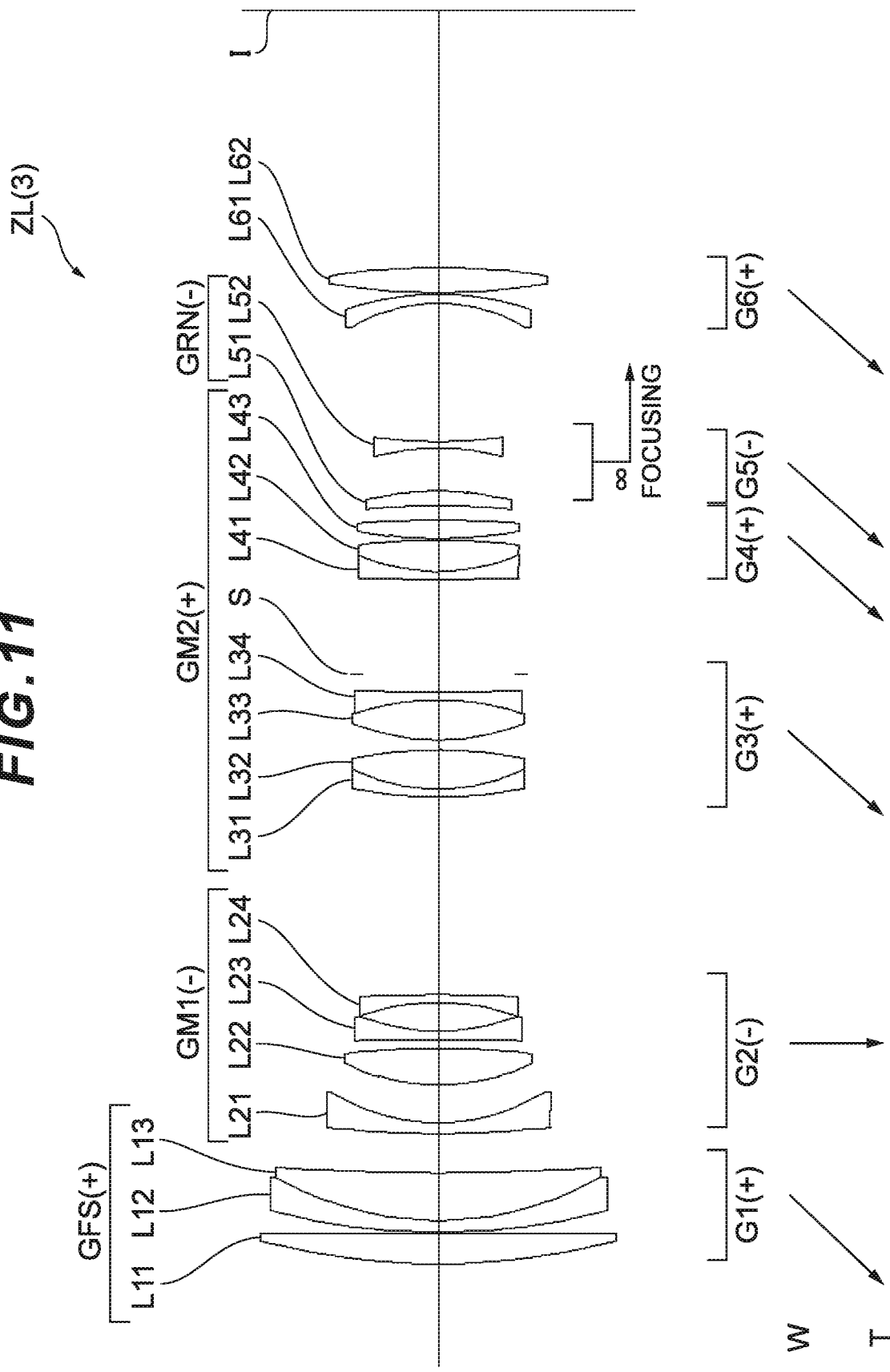
FIG. 11 shows a lens configuration of a zoom optical system according to a third example of this embodiment.
Figure 16:
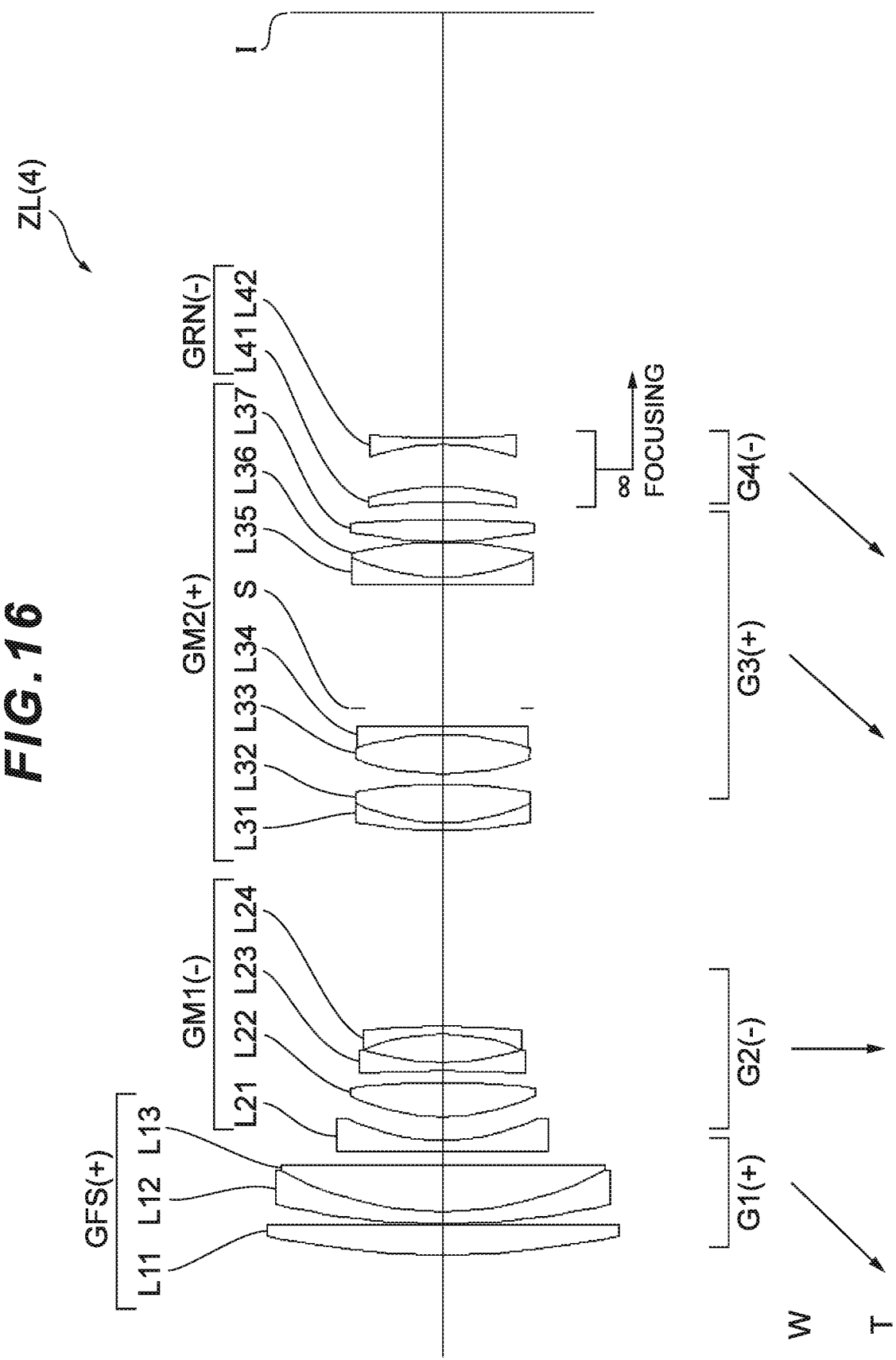
FIG. 16 shows a lens configuration of a zoom optical system according to a fourth example of this embodiment.
Figure 21:
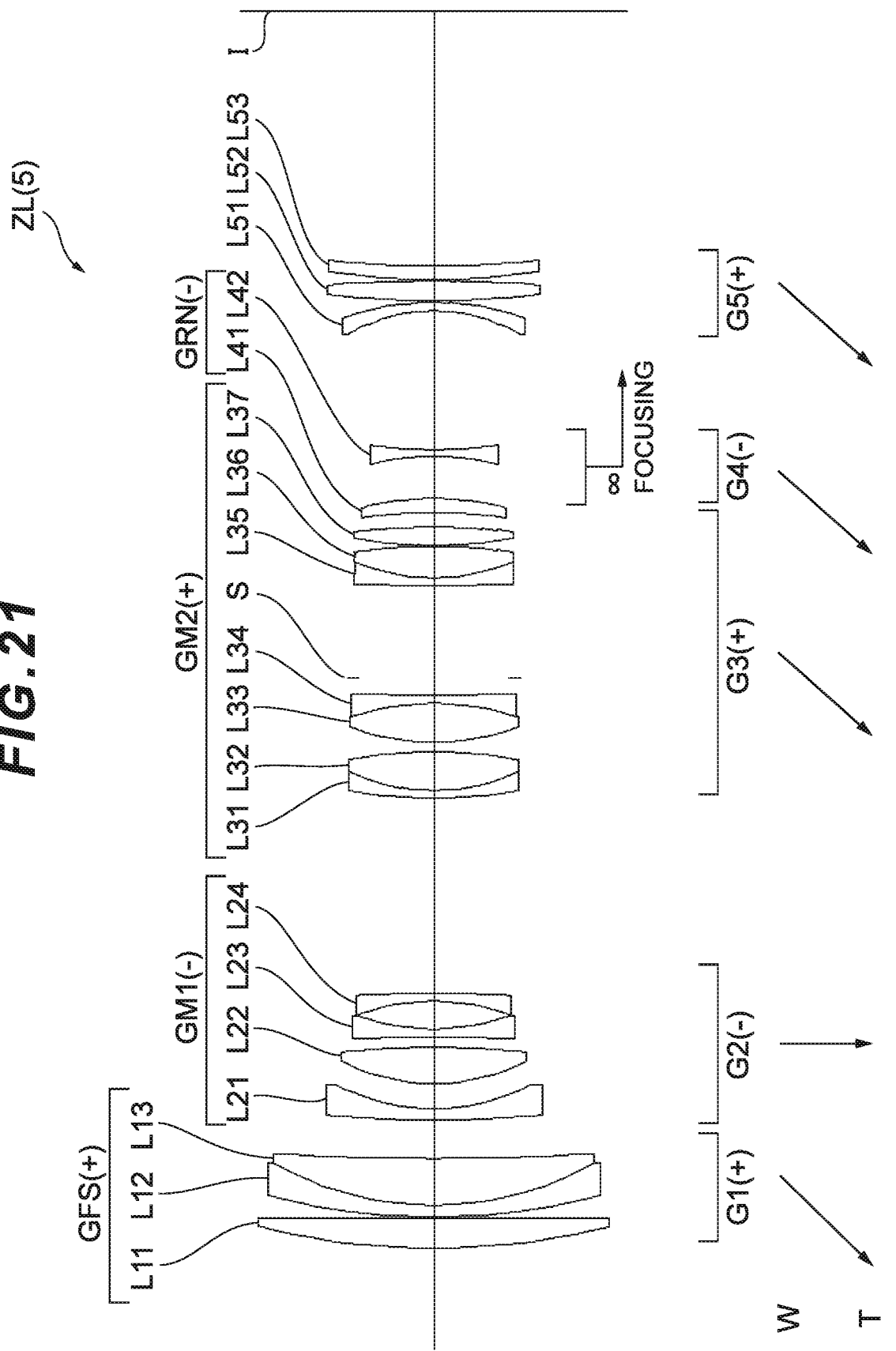
FIG. 21 shows a lens configuration of a zoom optical system according to a fifth example of this embodiment.

The zoom optical system ZL according to this embodiment may be a zoom optical system ZL(2) shown in FIG. 6, a zoom optical system ZL(3) shown in FIG. 11, a zoom optical system ZL(4) shown in FIG. 16, or a zoom optical system ZL(5) shown in FIG. 21.

The zoom optical system of this embodiment includes at least four lens groups, and changes the distances between lens groups upon zooming from the wide-angle end state to the telephoto end state, thereby allowing favorable aberration correction upon zooming to be facilitated. Focusing with the RN lens group GRN can reduce the size and weight of the RN lens group GRN, that is, the focusing lens group.

The conditional expression (1) defines the ratio of the focal length of the A lens group to the focal length of the M2 lens group GM2 in the telephoto end state. By satisfying the conditional expression (1), variation in various aberrations including the spherical aberration upon zooming from the wide-angle end to the telephoto end can be suppressed, and occurrence of various aberrations including the decentering coma aberration upon blur correction can be suppressed.

If the corresponding value of the conditional expression (1) of the zoom optical system of this embodiment exceeds the upper limit value, the refractive power of the M2 lens group GM2 in the telephoto end state becomes strong, and it is difficult to suppress variation in various aberrations including the spherical aberration upon zooming from the wide-angle end to the telephoto end. Note that setting of the upper limit value of the conditional expression (1) to 1.95 can more securely achieve the advantageous effects of this embodiment. To further secure the advantageous effects of this embodiment, it is preferable that the upper limit value of the conditional expression (1) be 1.90.

If the corresponding value of the conditional expression (1) of the zoom optical system of this embodiment falls below the lower limit value, the refractive power of the A lens group becomes strong, and it becomes difficult to suppress occurrence of various aberrations including the decentering coma aberration upon blur correction. Note that setting of the lower limit value of the conditional expression (1) to 1.15 can more securely achieve the advantageous effects of this embodiment. To further secure the advantageous effects of this embodiment, it is preferable that the lower limit value of the conditional expression (1) be 1.20.

According to the zoom optical system of this embodiment, reduction in size and weight of the focusing lens group can achieve high-speed AF and silence during AF without increasing the size of the lens barrel. Furthermore, variation of aberrations upon zooming from the wide-angle end state to the telephoto end state, and variation of aberrations upon focusing from an infinite distant object to a short distant object can be favorably suppressed. The optical apparatus, the imaging apparatus, and the method for manufacturing the zoom optical system according to this embodiment can also achieve analogous advantageous effects.

In the zoom optical system according to this embodiment, preferably, upon zooming from a wide-angle end state to a telephoto end state, the front lens group GFS moves toward the object. Accordingly, the entire length of the lens at the wide-angle end state can be reduced, which can facilitate reduction in the size of the zoom optical system.

In the zoom optical system according to this embodiment, preferably, upon zooming from a wide-angle end state to a telephoto end state, a lens group nearest to the object in the M1 lens group GM1 is fixed with respect to an image surface. Accordingly, degradation in performance due to manufacturing errors is suppressed, which can secure mass-productivity.

In the zoom optical system according to this embodiment, preferably, the A lens group consists of, in order from the object: a lens having a negative refractive power; and a lens having a positive refractive power.

It is desirable that the zoom optical system of this embodiment comprising the A lens group satisfy a following conditional expression (2), $$1.00 < nvrN/nvrP < 1.25 \qquad (2)$$

where nvrN: a refractive index of the lens having the negative refractive power in the A lens group, and nvrP: a refractive index of the lens having the positive refractive power in the A lens group.

The conditional expression (2) defines the ratio of the refractive index of the lens that is in the A lens group and has the negative refractive power to the refractive index of the lens that is in the A lens group and has the positive refractive power. By satisfying the conditional expression (2), degradation in performance upon blur correction by the A lens group can be effectively suppressed.

If the corresponding value of the conditional expression (2) exceeds the upper limit value, the refractive index of the lens that is in the A lens group and has a positive refractive power decreases, the decentering coma aberration caused upon blur correction excessively occurs, and it becomes difficult to correct the aberration. Setting of the upper limit value of the conditional expression (2) to 1.22 can more securely achieve the advantageous effects of this embodiment. To further secure the advantageous effects of this embodiment, it is preferable that the upper limit value of the conditional expression (2) be 1.20.

If the corresponding value of the conditional expression (2) falls below the lower limit value, the refractive index of the lens that is in the A lens group and has the negative refractive power becomes low, and it becomes difficult to correct the decentering coma aberration upon blur correction. Setting of the lower limit value of the conditional expression (2) to 1.03 can more securely achieve the advantageous effects of this embodiment. To further secure the advantageous effects of this embodiment, it is preferable that the lower limit value of the conditional expression (2) be 1.05.

It is also desirable that the zoom optical system comprising the A lens group satisfy a following conditional expression (3), $$0.30 < vvrN/vvrP < 0.90 \qquad (3)$$

where vvrN: an Abbe number of the lens having the negative refractive power in the A lens group, and vvrP: an Abbe number of the lens having the positive refractive power in the A lens group.

The conditional expression (3) defines the ratio of the Abbe number of the lens that is in the A lens group and has a negative refractive power to the Abbe number of the lens that is in the A lens group and has a positive refractive power. By satisfying the conditional expression (3), degradation in performance upon blur correction can be effectively suppressed.

If the corresponding value of the conditional expression (3) exceeds the upper limit value, the Abbe number of the lens that is in the A lens group and has the positive refractive power decreases, and it becomes difficult to correct the chromatic aberration caused upon blur correction. Setting of the upper limit value of the conditional expression (3) to 0.85 can more securely achieve the advantageous effects of this embodiment. To further secure the advantageous effects of this embodiment, it is preferable that the upper limit value of the conditional expression (3) be 0.80.

If the corresponding value of the conditional expression (3) falls below the lower limit value, the Abbe number of the lens that is in the A lens group and has a negative refractive power decreases, and it becomes difficult to correct the chromatic aberration caused upon blur correction. Setting of the lower limit value of the conditional expression (3) to 0.35 can more securely achieve the advantageous effects of this embodiment. To further secure the advantageous effects of this embodiment, it is preferable that the lower limit value of the conditional expression (3) be 0.40.

It is desirable that the zoom optical system according to this embodiment satisfy a following conditional expression (4), $$0.15 < (-fTM1)/f1 < 0.35 \qquad (4)$$

where fTM1: a focal length of the M1 lens group GM1 in a telephoto end state, and f1: a focal length of the front lens group GFS.

The conditional expression (4) defines the ratio of the focal length of the M1 lens group GM1 to the focal length of the front lens group GFS in the telephoto end state. By satisfying the conditional expression (4), various aberrations including the spherical aberration upon zooming from the wide-angle end to the telephoto end can be suppressed.

If the corresponding value of the conditional expression (4) exceeds the upper limit value, the refractive power of the front lens group GFS becomes strong, and it is difficult to correct various aberrations including the spherical aberration upon zooming from the wide-angle end to the telephoto end. Setting of the upper limit value of the conditional expression (4) to 0.33 can more securely achieve the advantageous effects of this embodiment. To further secure the advantageous effects of this embodiment, it is preferable that the upper limit value of the conditional expression (4) be 0.31.

If the corresponding value of the conditional expression (4) falls below the lower limit value, the refractive power of the M1 lens group GM1 becomes strong, and it is difficult to suppress variation in various aberrations including the spherical aberration upon zooming from the wide-angle end to the telephoto end. Setting of the lower limit value of the conditional expression (4) to 0.16 can more securely achieve the advantageous effects of this embodiment. To further secure the advantageous effects of this embodiment, it is preferable that the lower limit value of the conditional expression (4) be 0.17.

It is desirable that the zoom optical system according to this embodiment satisfy a following conditional expression (5), $$0.20 < fTM2/f1 < 0.40 \qquad (5)$$

where f1: a focal length of the front lens group GFS.

The conditional expression (5) defines the ratio of the focal length of the M2 lens group GM2 to the focal length of the front lens group GFS in the telephoto end state. By satisfying the conditional expression (5), various aberrations including the spherical aberration upon zooming from the wide-angle end to the telephoto end can be suppressed.

If the corresponding value of the conditional expression (5) exceeds the upper limit value, the refractive power of the front lens group GFS becomes strong, and it is difficult to correct various aberrations including the spherical aberration upon zooming from the wide-angle end to the telephoto end. Setting of the upper limit value of the conditional expression (5) to 0.37 can more securely achieve the advantageous effects of this embodiment. To further secure the advantageous effects of this embodiment, it is preferable that the upper limit value of the conditional expression (5) be 0.34.

If the corresponding value of the conditional expression (5) falls below the lower limit value, the refractive power of the M2 lens group GM2 becomes strong, and it is difficult to suppress variation in various aberrations including the spherical aberration upon zooming from the wide-angle end to the telephoto end. Setting of the lower limit value of the conditional expression (5) to 0.22 can more securely achieve the advantageous effects of this embodiment. To further secure the advantageous effects of this embodiment, it is preferable that the lower limit value of the conditional expression (5) be 0.24.

In the zoom optical system according to this embodiment, preferably, the A lens group is a vibration-proof lens group movable in a direction orthogonal to an optical axis to correct an imaging position displacement due to a camera shake or the like. Accordingly, degradation in performance upon blur correction can be effectively suppressed.

Preferably, the zoom optical system according to this embodiment further comprises a negative meniscus lens that has a concave surface facing the object, which is provided contiguous to the RN lens group on an image side. The configuration may further comprise, in order from the object: a lens having a negative refractive power; and a lens having a positive refractive power, which are provided contiguous to the RN lens group on an image side. Accordingly, various aberrations including the coma aberration can be effectively corrected.

It is preferable that the zoom optical system according to this embodiment satisfy a following conditional expression (6), $$0.70<(-fN)/fP<2.00 \quad (6)$$

where fN: a focal length of a lens having a strongest negative refractive power among lenses adjacent to the image side of the RN lens group GRN, and fP: a focal length of a lens having a strongest positive refractive power among lenses adjacent to the image side of the RN lens group GRN.

The conditional expression (6) described above defines the ratio of the focal length of the lens that has the strongest negative refractive power among the lenses adjacent to the image side of the RN lens group GRN to the focal length of the lens that has the strongest positive refractive power among the lenses adjacent to the image side of the RN lens group GRN. By satisfying the conditional expression (6), various aberrations including the coma aberration can be effectively corrected.

If the corresponding value of the conditional expression (6) exceeds the upper limit value, the refractive power of the lens that is disposed to the image side of the focusing lens group and has a positive refractive power becomes strong, and the coma aberration occurs excessively. Setting of the upper limit value of the conditional expression (6) to 1.90 can more securely achieve the advantageous effects of this embodiment. To further secure the advantageous effects of this embodiment, it is preferable that the upper limit value of the conditional expression (6) be 1.80.

If the corresponding value of the conditional expression (6) falls below the lower limit value, the refractive power of the lens that is disposed to the image side of the focusing lens group and has a negative refractive power becomes strong, and the coma aberration is excessively corrected. Setting of the lower limit value of the conditional expression (6) to 0.80 can more securely achieve the advantageous effects of this embodiment. To further secure the advantageous effects of this embodiment, it is preferable that the lower limit value of the conditional expression (6) be 0.90.

It is preferable that the zoom optical system according to this embodiment satisfy a following conditional expression (7), $$1.80<f1/fw<3.50 \quad (7)$$

where fw: a focal length of the zoom optical system in a wide-angle end state, and f1: a focal length of the front lens group GFS.

The conditional expression (7) defines the ratio of the focal length of the front lens group GFS to the focal length of the zoom optical system in the wide-angle end state. By satisfying the conditional expression (7), the size of the lens barrel can be prevented from increasing, and various aberrations including the spherical aberration upon zooming from the wide-angle end to the telephoto end can be suppressed.

If the corresponding value of the conditional expression (7) exceeds the upper limit value, the refractive power of the front lens group GFS becomes weak, and the size of lens barrel increases. Setting of the upper limit value of the conditional expression (7) to 3.30 can more securely achieve the advantageous effects of this embodiment. To further secure the advantageous effects of this embodiment, it is preferable to set the upper limit value of the conditional expression (7) to 3.10.

If the corresponding value of the conditional expression (7) falls below the lower limit value, the refractive power of the front lens group GFS becomes strong, and it is difficult to correct various aberrations including the spherical aberration upon zooming from the wide-angle end to the telephoto end. Setting of the lower limit value of the conditional expression (7) to 1.90 can more securely achieve the advantageous effects of this embodiment. To further secure the advantageous effects of this embodiment, it is preferable to set the lower limit value of the conditional expression (7) to 2.00, and it is more preferable to set the lower limit value of the conditional expression (7) to 2.10.

It is preferable that the zoom optical system according to this embodiment satisfy a following conditional expression (8), $$3.70<f1/(-fTM1)<5.00 \quad (8)$$

where fTM1: a focal length of the M1 lens group GM1 in a telephoto end state, and f1: a focal length of the front lens group GFS.

The conditional expression (8) defines the ratio of the focal length of the front lens group GFS to the focal length of the M1 lens group GM1. By satisfying the conditional expression (8), various aberrations including the spherical aberration upon zooming from the wide-angle end to the telephoto end can be suppressed.

If the corresponding value of the conditional expression (8) exceeds the upper limit value, the refractive power of the M1 lens group GM1 becomes strong, and it is difficult to suppress variation in various aberrations including the spherical aberration upon zooming from the wide-angle end to the telephoto end. Setting of the upper limit value of the conditional expression (8) to 4.90 can more securely achieve the advantageous effects of this embodiment. To further secure the advantageous effects of this embodiment, it is preferable to set the upper limit value of the conditional expression (8) to 4.80.

If the corresponding value of the conditional expression (8) falls below the lower limit value, the refractive power of the front lens group GFS becomes strong, and it is difficult to correct various aberrations including the spherical aberration upon zooming from the wide-angle end to the telephoto end. Setting of the lower limit value of the conditional expression (8) to 3.90 can more securely achieve the advantageous effects of this embodiment. To further secure the advantageous effects of this embodiment, it is preferable to set the lower limit value of the conditional expression (8) to 3.95.

It is preferable that the zoom optical system according to this embodiment satisfy a following conditional expression (9)

$$3.20 < f1/fTM2 < 5.00 \qquad (9)$$

where f1: a focal length of the front lens group GFS.

The conditional expression (9) defines the ratio of the focal length of the front lens group GFS to the focal length of the M2 lens group GM2. By satisfying the conditional expression (9), various aberrations including the spherical aberration upon zooming from the wide-angle end to the telephoto end can be suppressed.

If the corresponding value of the conditional expression (9) exceeds the upper limit value, the refractive power of the M2 lens group GM2 becomes strong, and it is difficult to suppress variation in various aberrations including the spherical aberration upon zooming from the wide-angle end to the telephoto end. Setting of the upper limit value of the conditional expression (9) to 4.80 can more securely achieve the advantageous effects of this embodiment. To further secure the advantageous effects of this embodiment, it is preferable to set the upper limit value of the conditional expression (9) to 4.60.

If the corresponding value of the conditional expression (9) falls below the lower limit value, the refractive power of the front lens group GFS becomes strong, and it is difficult to correct various aberrations including the spherical aberration upon zooming from the wide-angle end to the telephoto end. Setting of the lower limit value of the conditional expression (9) to 3.40 can more securely achieve the advantageous effects of this embodiment. To further secure the advantageous effects of this embodiment, it is preferable to set the lower limit value of the conditional expression (9) to 3.60.

Figure 26:
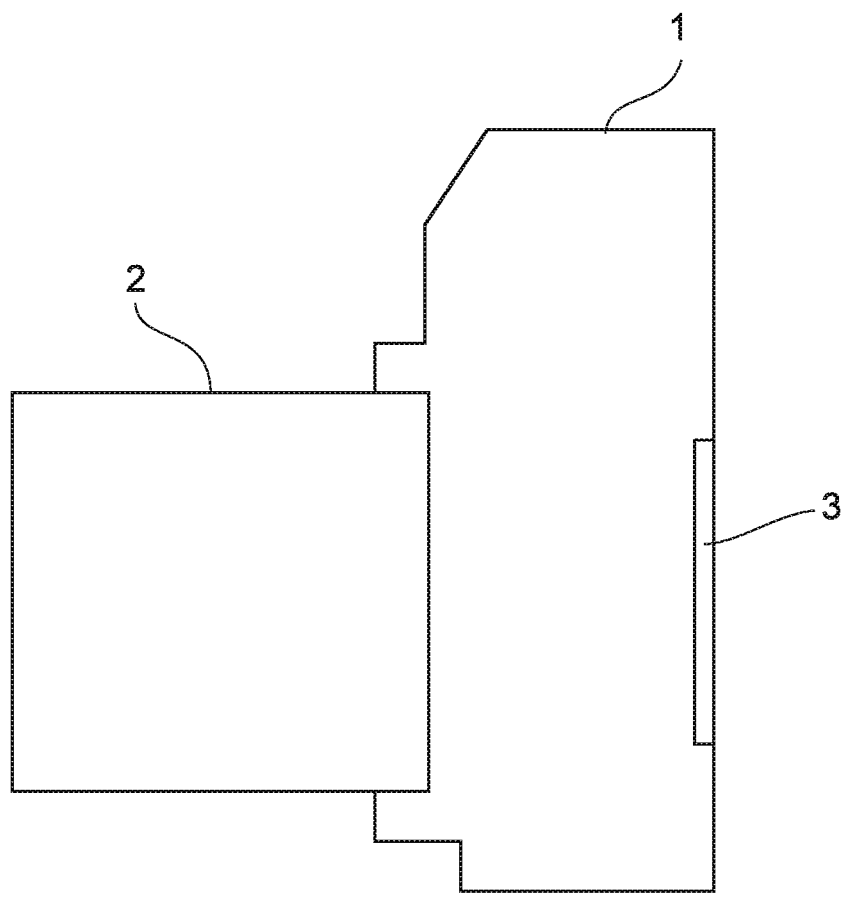
FIG. 26 shows a configuration of a camera comprising a zoom optical system according to this embodiment.

An optical apparatus and an imaging apparatus according to this embodiment comprise the zoom optical system having the configuration described above. As a specific example, a camera (corresponding to the imaging apparatus of the invention of the present application) including the aforementioned zoom optical system ZL is described with reference to FIG. 26. As shown in FIG. 26, this camera 1 has a lens assembly configuration including a replaceable imaging lens 2. The zoom optical system having the configuration described above is provided in the imaging lens 2. That is, the imaging lens 2 corresponds to the optical apparatus of the invention of the present application. The camera 1 is a digital camera. Light from an object (subject), not shown, is collected by the imaging lens 2, and reaches an imaging element 3. Accordingly, the light from the subject is imaged by the imaging element 3, and recorded as a subject image in a memory, not shown. As described above, a photographer can take an image of the subject through the camera 1. Note that this camera may be a mirrorless camera, or a single-lens reflex type camera including a quick return mirror.

According to the configuration described above, the camera 1 mounted with the zoom optical system ZL described above in the imaging lens 2 can achieve high-speed AF and silence during AF without increasing the size of the lens barrel by reducing the size and weight of the focusing lens group. Furthermore, variation of aberrations upon zooming from the wide-angle end state to the telephoto end state, and variation of aberrations upon focusing from an infinite distant object to a short distant object can be favorably suppressed, and a favorable optical performance can be achieved.

Figure 27:
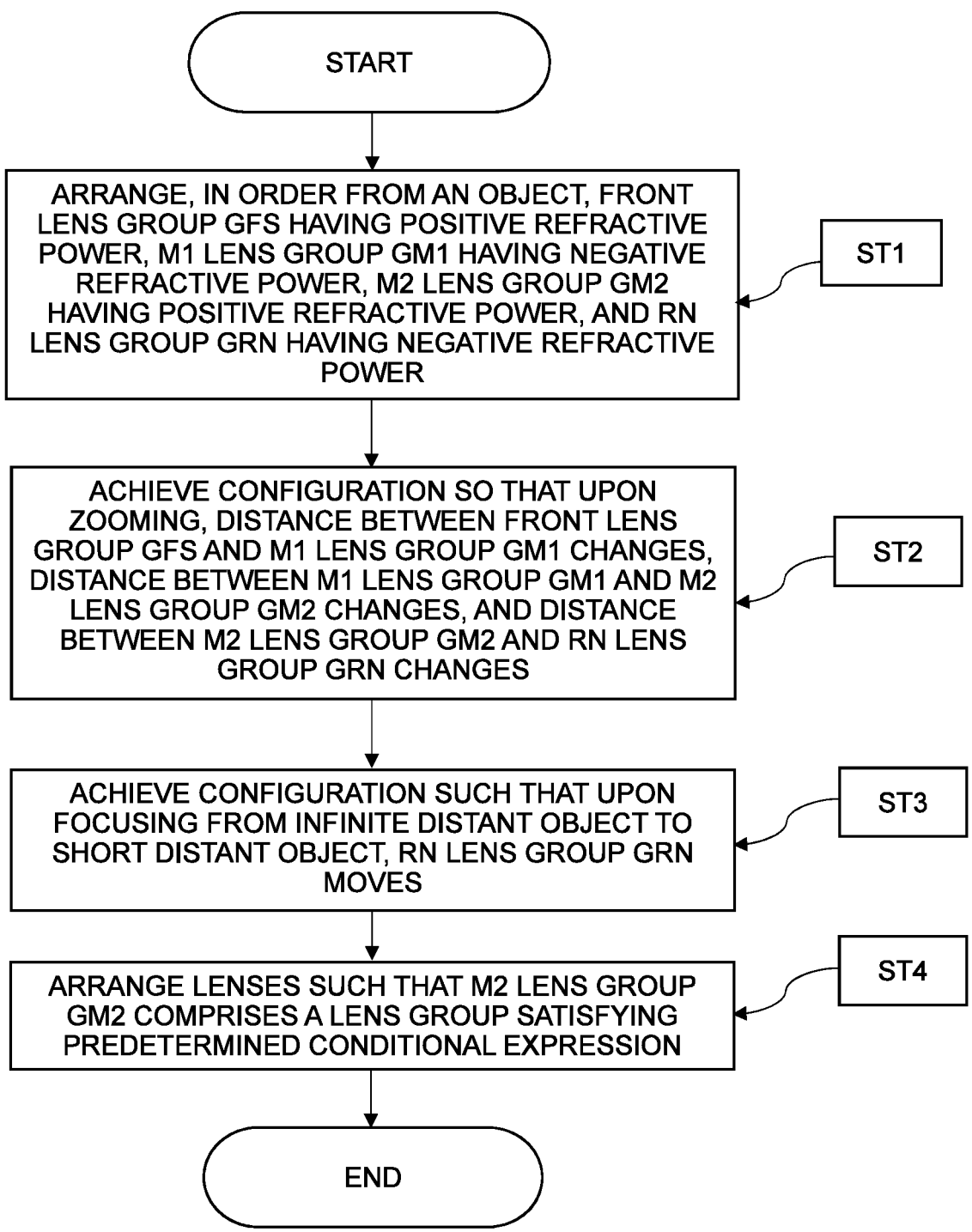
FIG. 27 is a flowchart showing a method for manufacturing the zoom optical system according to this embodiment.

Subsequently, referring to FIG. 27, an overview of a method for manufacturing the aforementioned zoom optical system ZL is described. First, arrange, in order from an object, a front lens group GFS having a positive refractive power, an M1 lens group GM1 having a negative refractive power, an M2 lens group GM2 having a positive refractive power, and an RN lens group GRN having a negative refractive power (step ST1). Then, achieve a configuration such that upon zooming, a distance between the front lens group GFS and the M1 lens group GM1 changes, a distance between the M1 lens group GM1 and the M2 lens group GM2 changes, and a distance between the M2 lens group GM2 and the RN lens group GRN changes (step ST2). In this case, the RN lens group GRN is configured to move upon focusing from an infinite distant object to a short distant object (step ST3), and lenses are arranged such that the M2 lens group GM2 comprises the A lens group satisfying a predetermined conditional expression (step ST4).

EXAMPLES

Hereinafter, zoom optical systems (zoom lens) ZL according to the examples of this embodiment are described with reference to the drawings. FIGS. 1, 6, 11, 16 and 21 are sectional views showing the configurations and refractive power distributions of the zoom optical systems ZL {ZL(1) to ZL(5)} according to first to fifth examples. At lower parts of the sectional views of the zoom optical systems ZL(1) to ZL(5), the movement direction of each lens group along the optical axis during zooming from the wide-angle end state (W) to the telephoto end state (T) is indicated by a corresponding arrow. Furthermore, the movement direction during focusing the focusing group GRN from infinity to a short distant object is indicated by an arrow accompanied by characters "FOCUSING."

FIGS. 1, 6, 11, 16 and 21 show each lens group by a combination of a symbol G and a numeral or alphabet (s), and show each lens by a combination of a symbol L and a numeral. In this case, to prevent the types and numbers of symbols and numerals from increasing and being complicated, the lens groups and the like are indicated using the combinations of symbols and numerals independently on an example-by-example basis. Accordingly, even though the same combinations of symbols and numerals are used among the examples, the combinations do not mean the same configurations.

Tables 1 to 5 are hereinafter shown below. Tables 1 to 5 are tables representing various data in the first to fifth examples. In each example, d-line (wavelength 587.562 nm) and g-line (wavelength 435.835 nm) are selected as calculation targets of aberration characteristics.

In [Lens data] tables, the surface number denotes the order of optical surfaces from the object along a light beam traveling direction, R denotes the radius of curvature (a surface whose center of curvature is nearer to the image is assumed to have a positive value) of each optical surface, D denotes the surface distance, which is the distance on the optical axis from each optical surface to the next optical surface (or the image surface), nd denotes the refractive index of the material of an optical element for the d-line, and vd denotes the Abbe number of the material of an optical element with reference to the d-line. The object surface denotes the surface of an object. "x" of the radius of curvature indicates a flat surface or an aperture. (Stop S) indicates an aperture stop S. The image surface indicates an image surface I. The description of the air refractive index nd=1.00000 is omitted.

In [Various data] tables, f denotes the focal length of the entire zoom lens, FNO denotes the f-number, 2ω denotes the angle of view (represented in units of ° (degree); ω denotes the half angle of view), and Ymax denotes the maximum image height. TL denotes the distance obtained by adding BF to the distance on the optical axis from the lens forefront surface to the lens last surface upon focusing on infinity. BF denotes the distance (back focus) on the optical axis from the lens last surface to the image surface I upon focusing on infinity. Note that these values are represented for zooming states of the wide-angle end (W), the intermediate focal length (M), and the telephoto end (T).

[Variable distance data] tables show the surface distances at surface numbers (e.g., surface numbers 5, 13, 25 and 29 in First Example) to which the surface distance of "Variable" in the table representing [Lens data] correspond. This shows the surface distances in the zooming states of the wide-angle end (W), the intermediate focal length (M) and the telephoto end (T) upon focusing on infinity and a short distant object.

[Lens group data] tables show the starting surfaces (the surfaces nearest to the object) and the focal lengths of the first to fifth lens groups (or the first to fourth lens groups or the first to sixth lens groups).

[Conditional expression corresponding value] tables show values corresponding to the conditional expressions (1) to (9) described above.

Hereinafter, for all the data values, the listed focal length f, radius of curvature R, surface distance D, other lengths and the like are typically represented in "mm" if not otherwise specified. However, the optical system can exert equivalent optical performances even if being proportionally magnified or proportionally reduced. Consequently, the representation is not limited thereto.

The above descriptions of the tables are common to all the examples. Hereinafter, redundant description is omitted.

First Example

The first example is described with reference to FIG. 1 and Table 1. FIG. 1 shows a lens configuration of a zoom optical system according to the first example of this embodiment. The zoom optical system ZL(1) according to this example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. The sign (+) or (−) assigned to each lens group symbol indicates the refractive power of the corresponding lens group. This similarly applies to all the following examples.

In relation to the embodiment described above, in this configuration, the first lens group G1 corresponds to the front lens group GFS, the second lens group G2 corresponds to the M1 lens group GM1, the third lens group G3 corresponds to the M2 lens group GM2, and the fourth lens group G4 corresponds to the RN lens group GRN.

The first lens group G1 consists of, in order from the object: a positive convexo-planar lens L11 having a convex surface facing the object; and a positive cemented lens consisting of a negative meniscus lens L12 having a convex surface facing the object, and a positive meniscus lens L13 having a convex surface facing the object.

The second lens group G2 consists of, in order from the object: a negative meniscus lens L21 having a convex surface facing the object; a positive biconvex lens L22; a negative biconcave lens L23; and a negative meniscus lens L24 having a concave surface facing the object.

The third lens group G3 consists of, in order from the object: a positive cemented lens consisting of a negative meniscus lens L31 having a convex surface facing the object, and a positive biconvex lens L32; a positive cemented lens consisting of a positive biconvex lens L33, and a negative biconcave lens L34; an aperture stop S; a negative cemented lens consisting of a negative meniscus lens L35 having a convex surface facing the object, and a positive biconvex lens L36; and a positive biconvex lens L37.

The fourth lens group G4 consists of, in order from the object: a positive meniscus lens L41 having a concave surface facing the object; and a negative biconcave lens L42.

The fifth lens group G5 consists of, in order from the object: a negative meniscus lens L51 having a concave surface facing the object; and a positive biconvex lens L52.

In the optical system according to this example, focusing from a long distant object to a short distant object is performed by moving the fourth lens group G4 in the image surface direction.

The zoom optical system according to this example corrects the imaging position displacement due to a camera shake or the like by moving the positive cemented lens that consists of the negative meniscus lens L31 having the convex surface facing the object and the positive biconvex lens L32, in a direction orthogonal to the optical axis. That is, the lenses L31 and L32 constitute the vibration-proof lens group, and correspond to the A lens group of the present invention and this embodiment.

To correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction may be moved in a direction orthogonal to the optical axis by (f·tan θ)/K. At the wide-angle end in the first example, the vibration proof coefficient is 1.65, and the focal length is 72.1 mm. Accordingly, the amount of movement of the vibration-proof lens group to correct a rotational blur by 0.30° is 0.23 mm. In the telephoto end state in the first example, the vibration proof coefficient is 2.10, and the focal length is 292.0 mm.

Accordingly, the amount of movement of the vibration-proof lens group to correct a rotational blur by 0.20° is 0.49 mm.

The following Table 1 lists the values of data on the optical system according to this example. In Table 1, f denotes the focal length, and BF denotes the back focus.

TABLE 1

First Example

[Lens data]

| Surface No. | R | D | nd | vd |
|---|---|---|---|---|
| Object surface | ∞ | | | |
| 1 | 109.4870 | 4.600 | 1.48749 | 70.31 |
| 2 | ∞ | 0.200 | | |
| 3 | 101.1800 | 1.800 | 1.62004 | 36.40 |
| 4 | 49.8109 | 7.200 | 1.49700 | 81.61 |
| 5 | 385.8166 | Variable | | |
| 6 | 176.0187 | 1.700 | 1.69680 | 55.52 |
| 7 | 31.3680 | 5.150 | | |
| 8 | 32.6087 | 5.500 | 1.78472 | 25.64 |
| 9 | −129.7634 | 1.447 | | |
| 10 | −415.4105 | 1.300 | 1.77250 | 49.62 |
| 11 | 34.3083 | 4.300 | | |
| 12 | −33.1502 | 1.200 | 1.85026 | 32.35 |
| 13 | −203.5644 | Variable | | |
| 14 | 70.9040 | 1.200 | 1.80100 | 34.92 |
| 15 | 30.2785 | 5.900 | 1.64000 | 60.20 |
| 16 | −70.1396 | 1.500 | | |
| 17 | 34.0885 | 6.000 | 1.48749 | 70.31 |
| 18 | −42.6106 | 1.300 | 1.80610 | 40.97 |
| 19 | 401.2557 | 2.700 | | |
| 20 | ∞ | 14.110 | | (Stop S) |
| 21 | 350.0000 | 1.200 | 1.83400 | 37.18 |
| 22 | 30.1592 | 4.800 | 1.51680 | 63.88 |
| 23 | −94.9908 | 0.200 | | |
| 24 | 66.3243 | 2.800 | 1.80100 | 34.92 |
| 25 | −132.5118 | Variable | | |
| 26 | −92.0997 | 2.200 | 1.80518 | 25.45 |
| 27 | −44.0090 | 6.500 | | |
| 28 | −36.9702 | 1.000 | 1.77250 | 49.62 |
| 29 | 68.3346 | Variable | | |
| 30 | −24.5000 | 1.400 | 1.62004 | 36.40 |
| 31 | −41.1519 | 0.200 | | |
| 32 | 106.0000 | 3.800 | 1.67003 | 47.14 |
| 33 | −106.0000 | BF | | |
| Image surface | ∞ | | | |

[Various data]
Zooming ratio 4.05

| | W | M | T |
|---|---|---|---|
| f | 72.1 | 100.0 | 292.0 |
| FNO | 4.49 | 4.86 | 5.88 |
| 2ω | 33.96 | 24.48 | 8.44 |
| Ymax | 21.60 | 21.60 | 21.60 |
| TL | 190.13 | 205.07 | 245.82 |
| BF | 39.12 | 46.45 | 67.12 |

[Variable distance data]

| | W Infinity | M Infinity | T Infinity | W Short distance | M Short distance | T Short distance |
|---|---|---|---|---|---|---|
| d5 | 6.204 | 21.150 | 61.895 | 6.204 | 21.150 | 61.895 |
| d13 | 30.000 | 22.666 | 2.000 | 30.000 | 22.666 | 2.000 |
| d25 | 2.180 | 3.742 | 3.895 | 2.837 | 4.562 | 5.614 |
| d29 | 21.418 | 19.856 | 19.703 | 20.761 | 19.036 | 17.984 |

TABLE 1-continued

First Example

[Lens group data]

| Group | Starting surface | f |
|---|---|---|
| G1 | 1 | 145.319 |
| G2 | 6 | −29.546 |
| G3 | 14 | 38.298 |
| G4 | 26 | −48.034 |
| G5 | 30 | 324.470 |

[Conditional expression corresponding value]

(1) fvr/fTM2 = 1.755
(2) nvrN/nvrP = 1.098
(3) vvrN/vvrP = 0.580
(4) (−fTM1)/f1 = 0.203
(5) fTM2/f1 = 0.264
(6) (−fN)/fP = 1.266
(7) f1/fw = 2.016
(8) f1/(−fTM1) = 4.918
(9) f1/fTM2 = 3.794

Figure 2A:
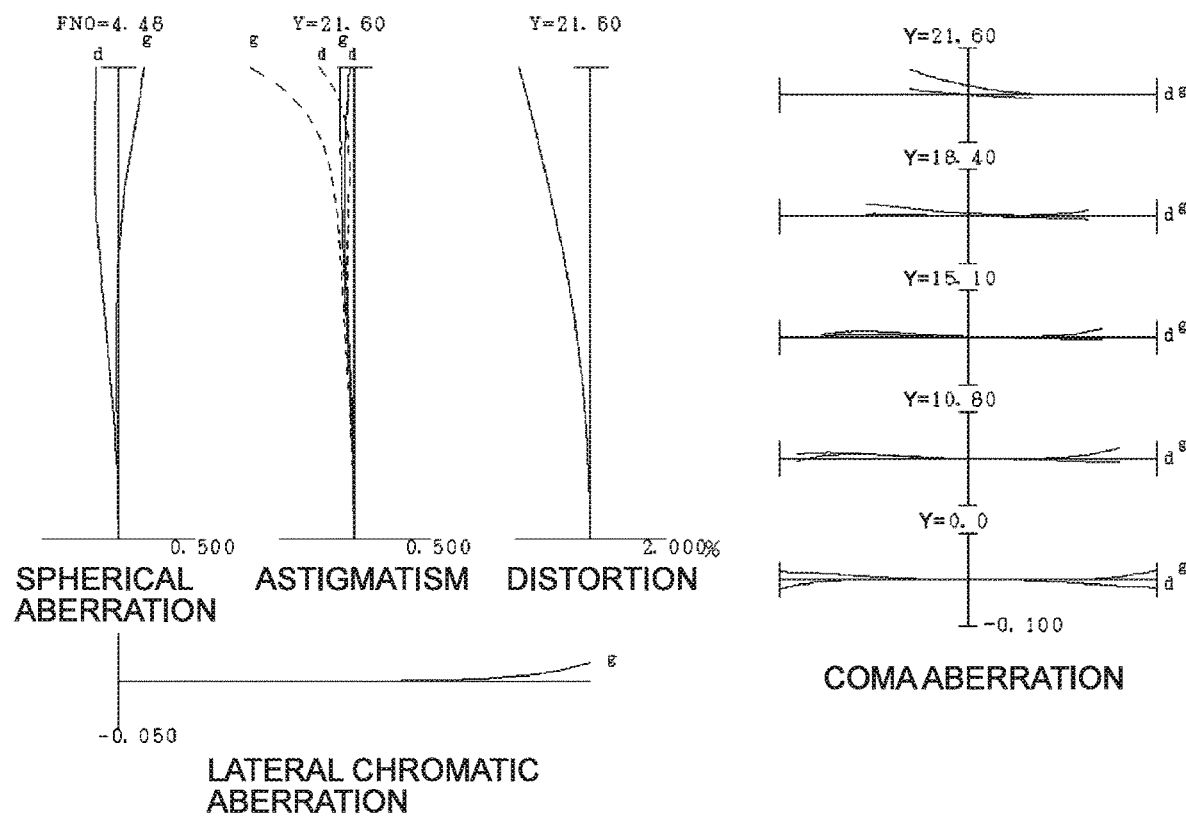
FIG. 2A is graphs showing various aberrations of the zoom optical system according to the first example upon focusing on infinity in the wide-angle end state.
Figure 2B:
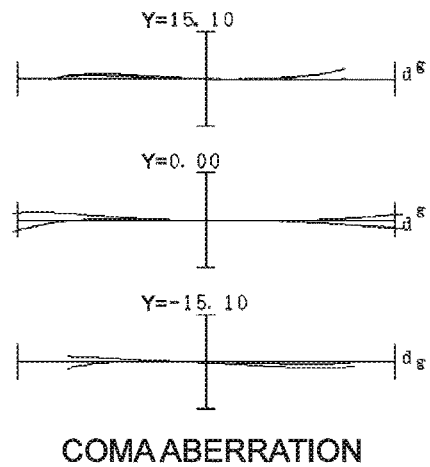
FIG. 2B is graphs showing meridional lateral aberrations (coma aberrations) when blur correction is applied to a rotational blur by 0.30°.
Figure 3:
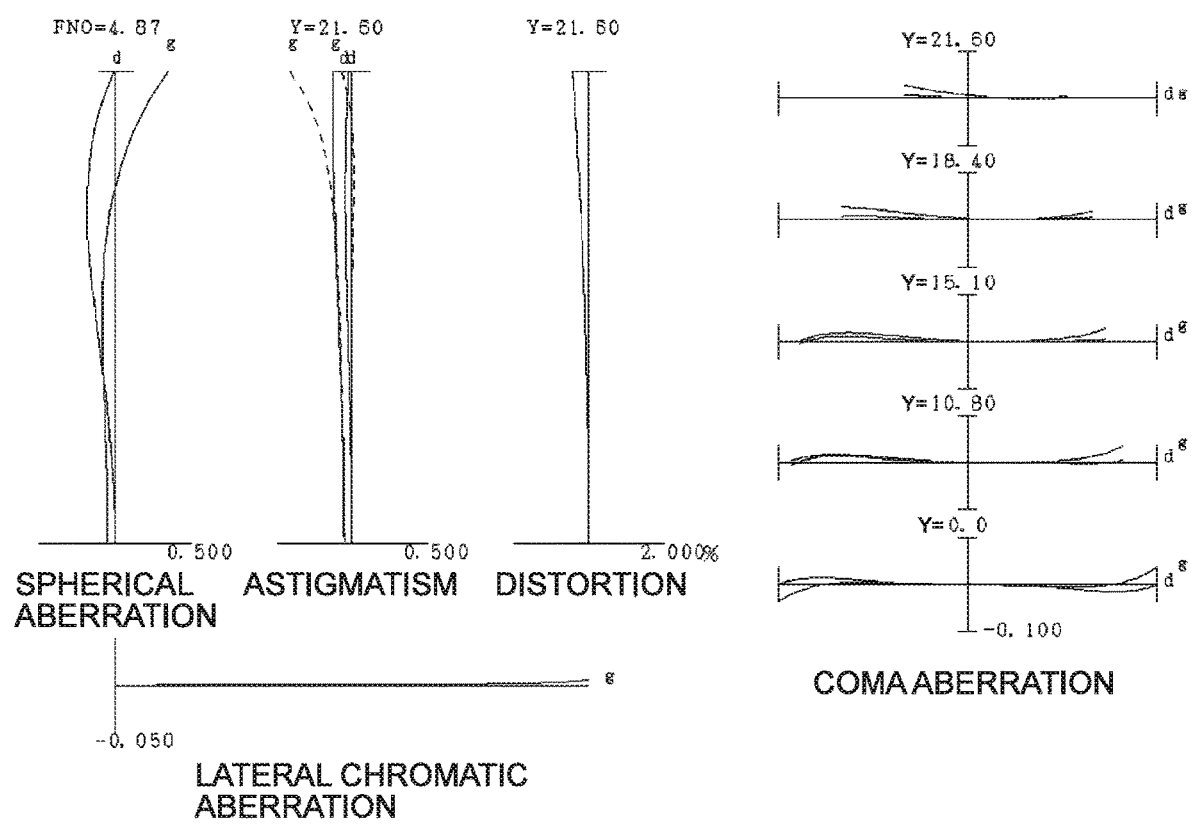
FIG. 3 is graphs showing various aberrations of the zoom optical system according to the first example upon focusing on infinity in the intermediate focal length state.
Figure 4A:
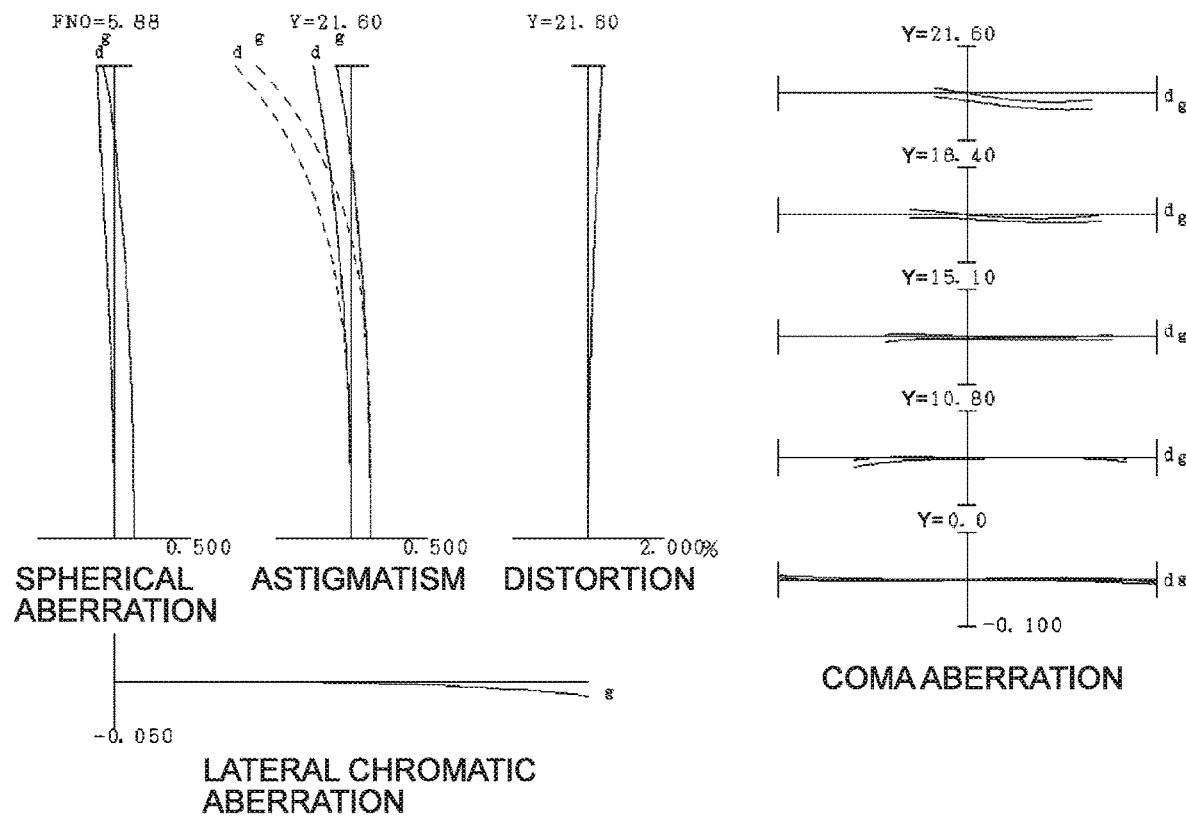
FIG. 4A is graphs showing various aberrations of the zoom optical system according to the first example upon focusing on infinity in the telephoto end state.
Figure 4B:
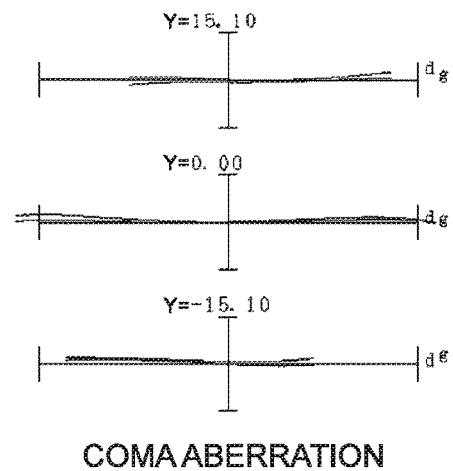
FIG. 4B is graphs showing meridional lateral aberrations when blur correction is applied to a rotational blur by 0.20°.
Figure 5A:
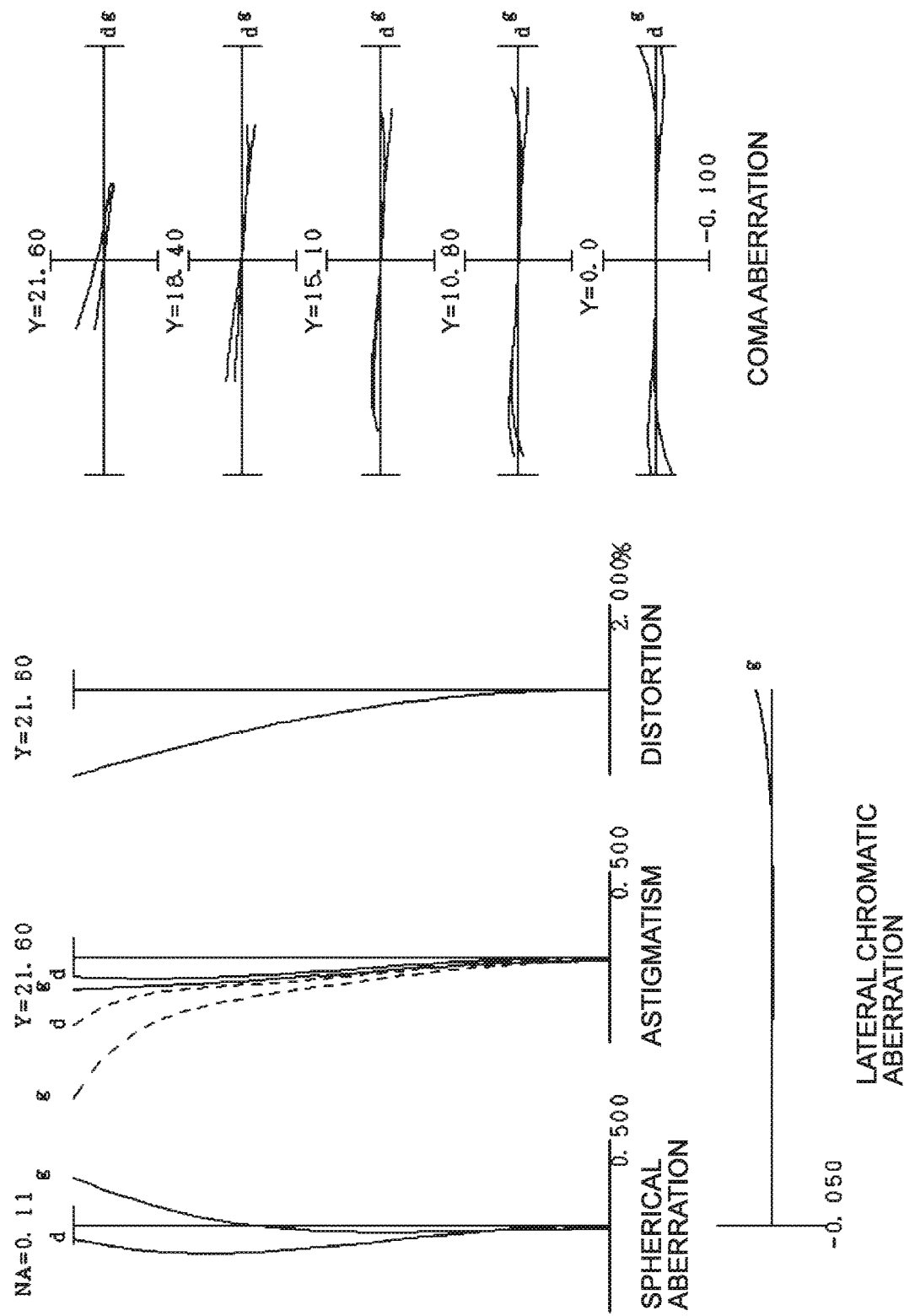

FIGS. 2A and 2B are graphs showing various aberrations of the zoom optical system having the vibration-proof function according to the first example upon focusing on infinity in the wide-angle end state, and graphs showing meridional lateral aberrations when blur correction is applied to a rotational blur by 0.30°, respectively. FIG. 3 is graphs showing various aberrations of the zoom optical system having the vibration-proof function according to the first example upon focusing on infinity in the intermediate focal length state. FIGS. 4A and 4B are graphs showing various aberrations of the zoom optical system having the vibration-proof function according to the first example upon focusing on infinity in the telephoto end state, and graphs showing meridional lateral aberrations when blur correction is applied to a rotational blur by 0.20°, respectively. FIGS. 5A, 5B and 5C are graphs showing various aberrations of the zoom optical system according to the first example upon focusing on a short distant object in the wide-angle end state, the intermediate focal length state, and the telephoto end state, respectively.

In the aberration graphs of FIGS. 2 to 5, FNO denotes the f-number, NA denotes the numerical aperture, and Y denotes the image height. Note that the spherical aberration graph shows the value of the f-number or the numerical aperture corresponding to the maximum aperture. The astigmatism graph and the distortion graph show the maximum value of the image height. The coma aberration graph shows the value of each image height. d denotes the d-line (λ=587.6 nm), and g denotes the g-line (λ=435.8 nm). In the astigmatism graph, solid lines indicate sagittal image surfaces, and broken lines indicate meridional image surfaces. Note that symbols analogous to those in this example are used also in the aberration graphs in the following examples.

The graphs showing various aberrations show that the zoom optical system according to this example favorably corrects the various aberrations and has excellent image forming performances from the wide-angle end state to the telephoto end state, and further has excellent image forming performances also upon focusing on a short distant object.

Second Example

FIG. 6 shows a lens configuration of a zoom optical system according to the second example of this embodiment. The zoom optical system according to this example consists of, in order from the object: a first lens group G1 having a positive refractive power; a second lens group G2 having a negative refractive power; a third lens group G3 having a negative refractive power; a fourth lens group G4 having a positive refractive power; a fifth lens group G5 having a negative refractive power; and a sixth lens group G6 having a positive refractive power.

In relation to the embodiment described above, in this configuration, the first lens group G1 corresponds to the front lens group GFS, the second lens group G2 and the third lens group G3 correspond to the M1 lens group GM1, the fourth lens group G4 corresponds to the M2 lens group GM2, and the fifth lens group G5 corresponds to the RN lens group GRN.

The first lens group G1 consists of, in order from the object: a positive convexo-planar lens L11 having a convex surface facing the object; and a positive cemented lens consisting of a negative meniscus lens L12 having a convex surface facing the object, and a positive meniscus lens L13 having a convex surface facing the object.

The second lens group G2 consists of, in order from the object: a negative meniscus lens L21 having a convex surface facing the object; a positive biconvex lens L22; and a negative biconcave lens L23.

The third lens group G3 consists of a negative meniscus lens L31 having a concave surface facing the object.

The fourth lens group G4 consists of, in order from the object: a positive cemented lens consisting of a negative meniscus lens L41 having a convex surface facing the object, and a positive biconvex lens L42; a positive cemented lens consisting of a positive biconvex lens L43, and a negative biconcave lens L44; an aperture stop S; a negative cemented lens consisting of a negative meniscus lens L45 having a convex surface facing the object, and a positive biconvex lens L46; and a positive biconvex lens L47.

The fifth lens group G5 consists of, in order from the object: a positive meniscus lens L51 having a concave surface facing the object; and a negative biconcave lens L52.

The sixth lens group G6 consists of, in order from the object: a negative meniscus lens L61 having a concave surface facing the object; and a positive biconvex lens L62.

In the optical system according to this example, focusing from a long distant object to a short distant object is performed by moving the fifth lens group G5 in the image surface direction. The imaging position displacement due to a camera shake or the like is corrected by moving the positive cemented lens that consists of the negative meniscus lens L41 having the convex surface facing the object and the positive biconvex lens L42, in a direction orthogonal to the optical axis. That is, the lenses L41 and L42 constitute the vibration-proof lens group, and correspond to the A lens group of the present invention and this embodiment.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. At the wide-angle end in the second example, the vibration proof coefficient is 1.66, and the focal length is 72.1 mm. Accordingly, the amount of movement of the vibration-proof lens group to correct a rotational blur by 0.30° is 0.23 mm. In the telephoto end state in the second example, the vibration proof coefficient is 2.10, and the focal length is 292.0 mm. Accordingly, the amount of movement of the vibration-proof lens group to correct a rotational blur by 0.20° is 0.49 mm.

The following Table 2 lists the values of data on the optical system according to this example.

TABLE 2

Second Example

[Lens data]

| Surface No. | R | D | nd | vd |
|---|---|---|---|---|
| Object surface | ∞ | | | |
| 1 | 107.5723 | 4.600 | 1.48749 | 70.32 |
| 2 | ∞ | 0.200 | | |
| 3 | 96.9007 | 1.800 | 1.62004 | 36.40 |
| 4 | 47.8324 | 7.200 | 1.49700 | 81.61 |
| 5 | 361.3792 | Variable | | |
| 6 | 139.8663 | 1.700 | 1.69680 | 55.52 |
| 7 | 33.7621 | 6.806 | | |
| 8 | 33.5312 | 5.500 | 1.78472 | 25.64 |
| 9 | −139.8348 | 0.637 | | |
| 10 | −492.0620 | 1.300 | 1.80400 | 46.60 |
| 11 | 35.1115 | Variable | | |
| 12 | −34.6163 | 1.200 | 1.83400 | 37.18 |
| 13 | −377.1306 | Variable | | |
| 14 | 74.8969 | 1.200 | 1.80100 | 34.92 |
| 15 | 31.6202 | 5.900 | 1.64000 | 60.19 |
| 16 | −69.0444 | 1.500 | | |
| 17 | 34.2668 | 6.000 | 1.48749 | 70.32 |
| 18 | −42.8334 | 1.300 | 1.80610 | 40.97 |
| 19 | 434.9585 | 2.700 | | |
| 20 | ∞ | 14.312 | | (Stop S) |
| 21 | 350.0000 | 1.200 | 1.83400 | 37.18 |
| 22 | 30.4007 | 4.800 | 1.51680 | 63.88 |
| 23 | −98.0361 | 0.200 | | |
| 24 | 68.9306 | 2.800 | 1.80100 | 34.92 |
| 25 | −129.3404 | Variable | | |
| 26 | −90.5065 | 2.200 | 1.80518 | 25.45 |
| 27 | −44.1796 | 6.500 | | |
| 28 | −37.6907 | 1.000 | 1.77250 | 49.62 |
| 29 | 68.3000 | Variable | | |
| 30 | −24.5545 | 1.400 | 1.62004 | 36.40 |
| 31 | −41.7070 | 0.200 | | |
| 32 | 106.0000 | 3.800 | 1.67003 | 47.14 |
| 33 | −106.0000 | BF | | |
| Image surface | ∞ | | | |

[Various data]
Zooming ratio 4.05

| | W | M | T |
|---|---|---|---|
| f | 72.1 | 100.0 | 292.0 |
| FNO | 4.53 | 4.89 | 5.88 |
| 2ω | 33.98 | 24.48 | 8.44 |
| Ymax | 21.60 | 21.60 | 21.60 |
| TL | 190.82 | 206.02 | 245.82 |
| BF | 39.12 | 46.27 | 66.46 |

[Variable distance data]

| | W Infinity | M Infinity | T Infinity | W Short distance | M Short distance | T Short distance |
|---|---|---|---|---|---|---|
| d5 | 2.861 | 18.057 | 57.861 | 2.861 | 18.057 | 57.861 |
| d11 | 5.727 | 5.812 | 6.883 | 5.727 | 5.812 | 6.883 |
| d13 | 30.500 | 23.259 | 2.000 | 30.500 | 23.259 | 2.000 |
| d25 | 2.246 | 3.634 | 3.634 | 2.888 | 4.436 | 5.329 |
| d29 | 22.411 | 21.023 | 21.023 | 21.770 | 20.221 | 19.329 |

TABLE 2-continued

Second Example

[Lens group data]

| Group | Starting surface | f |
|---|---|---|
| G1 | 1 | 141.867 |
| G2 | 6 | −104.910 |
| G3 | 12 | −45.774 |
| G4 | 14 | 38.681 |
| G5 | 26 | −48.266 |
| G6 | 30 | 340.779 |

[Conditional expression corresponding value]

(1) fvr/fTM2 = 1.764
(2) nvrN/nvrP = 1.098
(3) vvrN/vvrP = 0.580
(4) (−fTM1)/f1 = 0.208
(5) fTM2/f1 = 0.273
(6) (−fN)/fP = 1.248
(7) f1/fw = 1.968
(8) f1/(−fTM1) = 4.804
(9) f1/fTM2 = 3.668

Figure 7A:
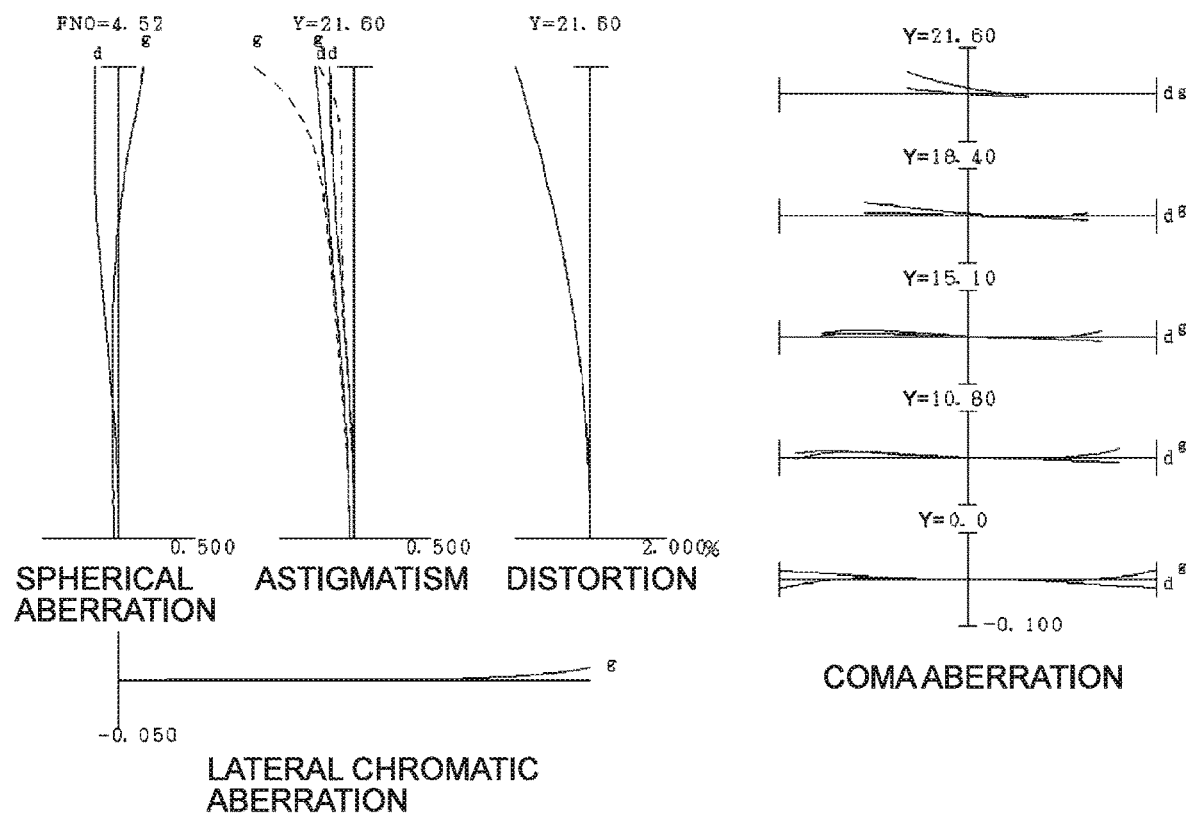
FIG. 7A is graphs showing various aberrations of the zoom optical system according to the second example upon focusing on infinity in the wide-angle end state.
Figure 7B:
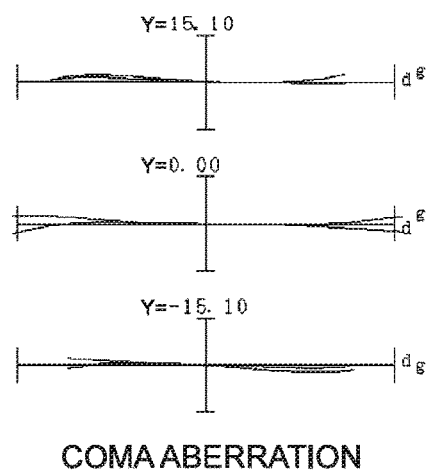
FIG. 7B is graphs showing meridional lateral aberrations when blur correction is applied to a rotational blur by 0.30°.
Figure 8:
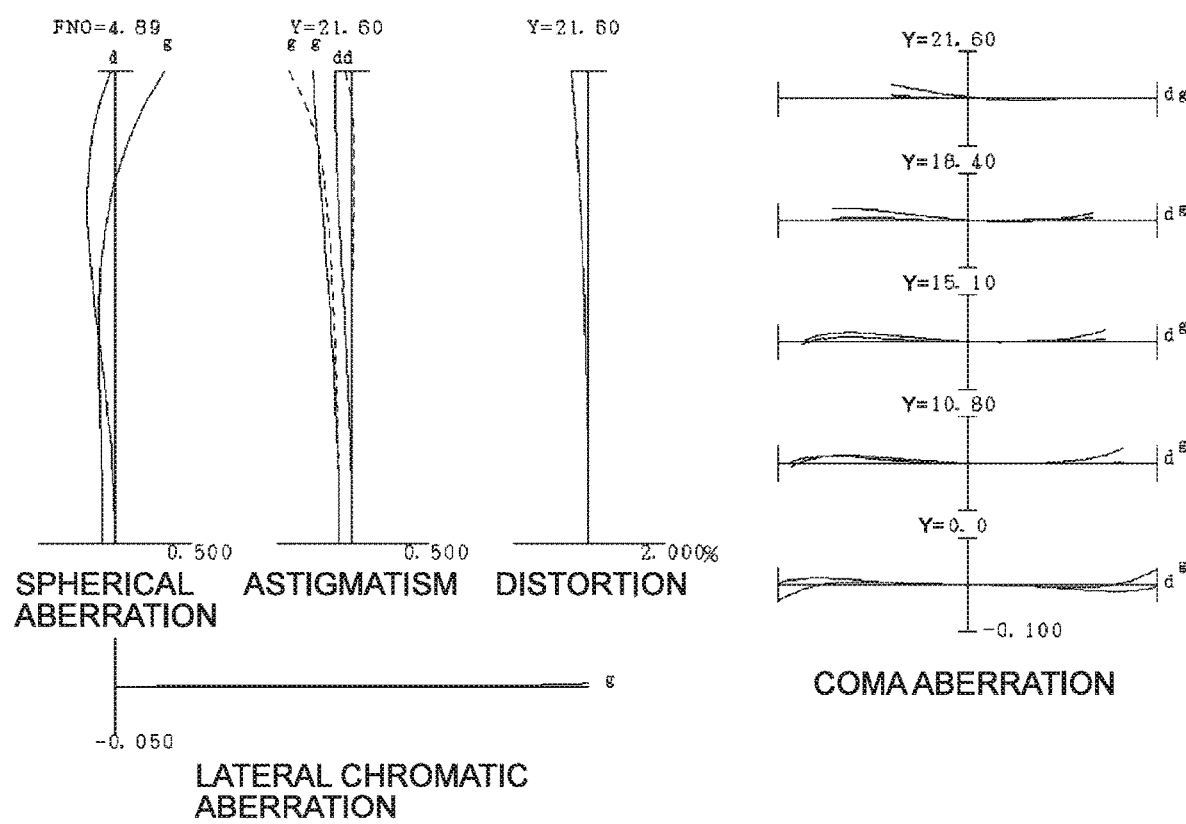
FIG. 8 is graphs showing various aberrations of the zoom optical system according to the second example upon focusing on infinity in the intermediate focal length state.
Figure 9A:
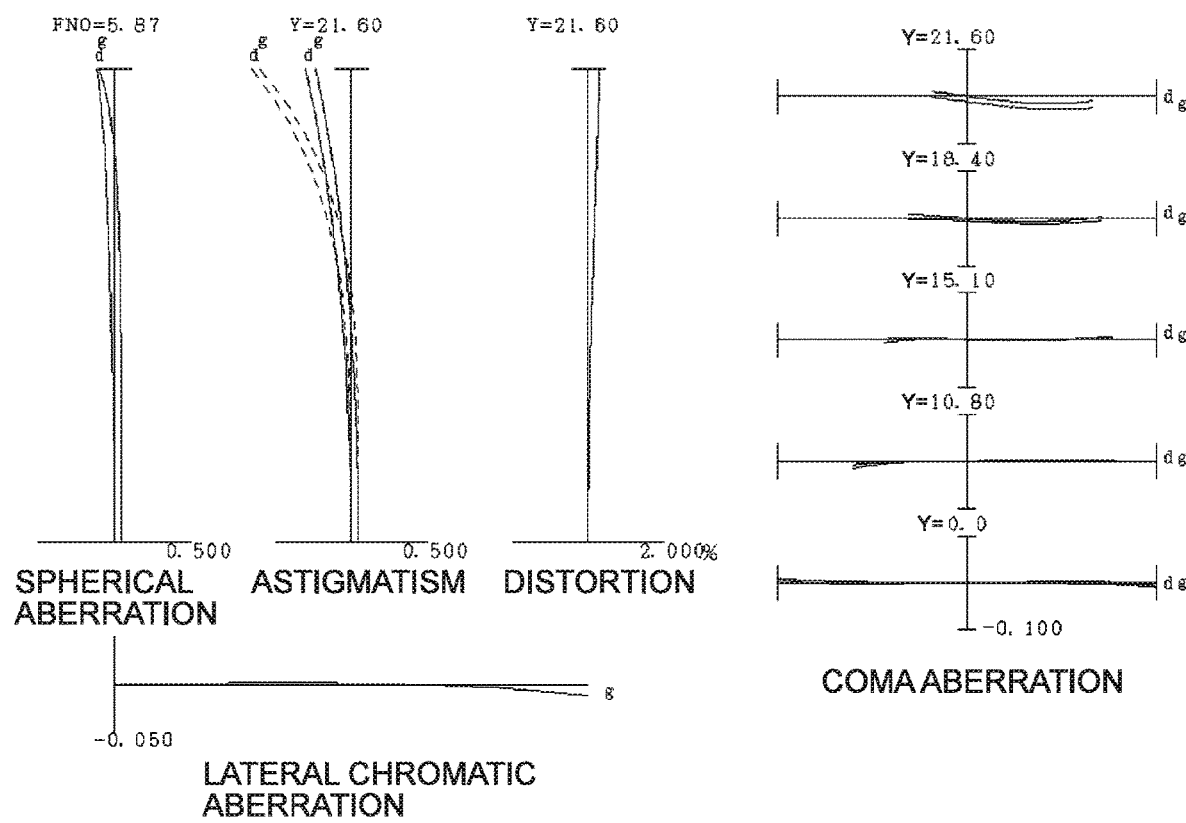
FIG. 9A is graphs showing various aberrations of the zoom optical system according to the second example upon focusing on infinity in the telephoto end state.
Figure 9B:
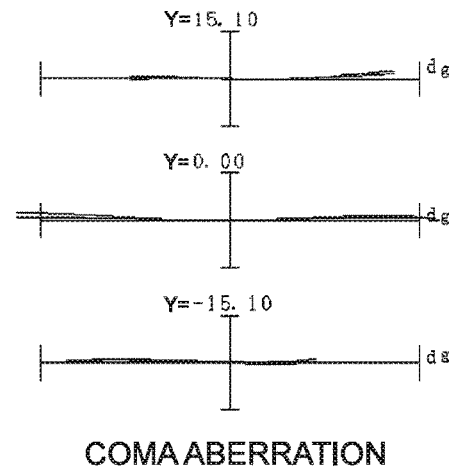
FIG. 9B is graphs showing meridional lateral aberrations when blur correction is applied to a rotational blur by 0.20°.
Figure 10B:
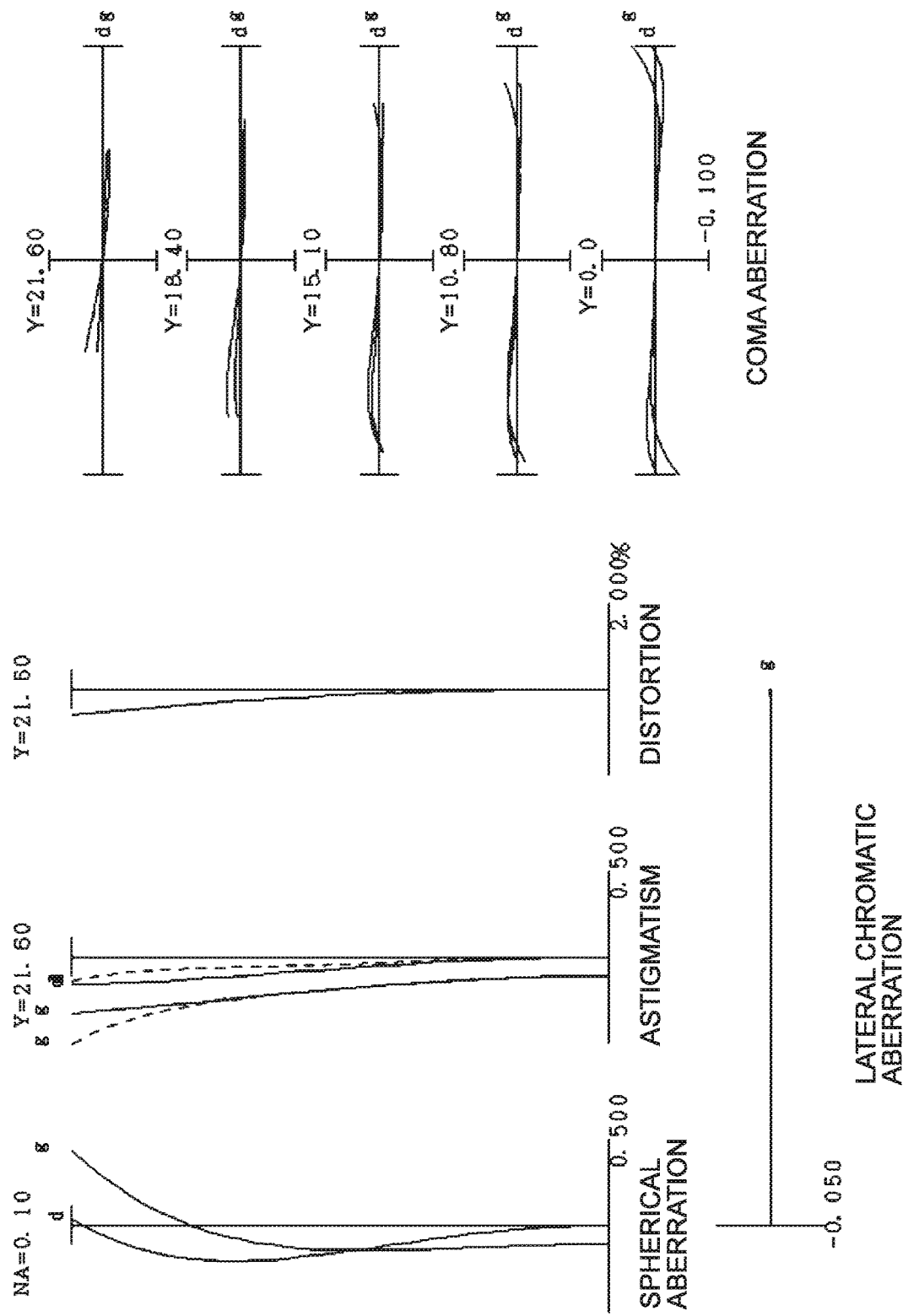

FIGS. 7A and 7B are graphs showing various aberrations of the zoom optical system having the vibration-proof function according to the second example upon focusing on infinity in the wide-angle end state, and graphs showing meridional lateral aberrations when blur correction is applied to a rotational blur by 0.30°, respectively. FIG. 8 is graphs showing various aberrations of the zoom optical system having the vibration-proof function according to the second example upon focusing on infinity in the intermediate focal length state. FIGS. 9A and 9B are graphs showing various aberrations of the zoom optical system having the vibration-proof function according to the second example upon focusing on infinity in the telephoto end state, and graphs showing meridional lateral aberrations when blur correction is applied to a rotational blur by 0.20°, respectively. FIGS. 10A, 10B and 10C are graphs showing various aberrations of the zoom optical system according to the second example upon focusing on a short distant object in the wide-angle end state, the intermediate focal length state, and the telephoto end state, respectively.

The graphs showing various aberrations show that the zoom optical system according to this example favorably corrects the various aberrations and has excellent image forming performances from the wide-angle end state to the telephoto end state, and further has excellent image forming performances also upon focusing on a short distant object.

Third Example

FIG. 11 shows a lens configuration of a zoom optical system according to the third example of this embodiment. The zoom optical system according to this example consists of, in order from the object: a first lens group G1 having a positive refractive power; a second lens group G2 having a negative refractive power; a third lens group G3 having a positive refractive power; a fourth lens group G4 having a positive refractive power; a fifth lens group G5 having a negative refractive power; and a sixth lens group having a positive refractive power.

In relation to the embodiment described above, in this configuration, the first lens group G1 corresponds to the front lens group GFS, the second lens group G2 corresponds to the M1 lens group GM1, the third lens group G3 and the fourth lens group G4 correspond to the M2 lens group GM2, and the fifth lens group G5 corresponds to the RN lens group GRN.

The first lens group G1 consists of, in order from the object: a positive convexo-planar lens L11 having a convex surface facing the object; and a positive cemented lens consisting of a negative meniscus lens L12 having a convex surface facing the object, and a positive meniscus lens L13 having a convex surface facing the object.

The second lens group G2 consists of, in order from the object: a negative meniscus lens L21 having a convex surface facing the object; a positive biconvex lens L22; a negative biconcave lens L23; and a negative meniscus lens L24 having a concave surface facing the object.

The third lens group G3 consists of, in order from the object: a positive cemented lens consisting of a negative meniscus lens L31 having a convex surface facing the object, and a positive biconvex lens L32; a positive cemented lens consisting of a positive biconvex lens L33, and a negative biconcave lens L34; and an aperture stop S.

The fourth lens group G4 consists of, in order from the object: a negative cemented lens consisting of a negative meniscus lens L41 having a convex surface facing the object, and a positive biconvex lens L42; and a positive biconvex lens L43.

The fifth lens group G5 consists of, in order from the object: a positive meniscus lens L51 having a concave surface facing the object; and a negative biconcave lens L52.

The sixth lens group G6 consists of, in order from the object: a negative meniscus lens L61 having a concave surface facing the object; and a positive biconvex lens L62.

In the optical system according to this example, focusing from a long distant object to a short distant object is performed by moving the fifth lens group G5 in the image surface direction. The imaging position displacement due to a camera shake or the like is corrected by moving the positive cemented lens that consists of the negative meniscus lens L31 having the convex surface facing the object and the positive biconvex lens L32, in a direction orthogonal to the optical axis. That is, the lenses L31 and L32 constitute the vibration-proof lens group, and correspond to the A lens group of the present invention and this embodiment.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. At the wide-angle end in the third example, the vibration proof coefficient is 1.65, and the focal length is 72.1 mm. Accordingly, the amount of movement of the vibration-proof lens group to correct a rotational blur by 0.30° is 0.23 mm. In the telephoto end state in the third example, the vibration proof coefficient is 2.10, and the focal length is 292.0 mm. Accordingly, the amount of movement of the vibration-proof lens group to correct a rotational blur by 0.20° is 0.49 mm.

The following Table 3 lists the values of data on the optical system according to this example.

TABLE 3

Third Example

[Lens data]

| Surface No. | R | D | nd | vd |
|---|---|---|---|---|
| Object surface | ∞ | | | |
| 1 | 106.7563 | 4.600 | 1.48749 | 70.32 |
| 2 | ∞ | 0.200 | | |

TABLE 3-continued

Third Example

| | | | | |
|---|---|---|---|---|
| 3 | 99.4635 | 1.800 | 1.62004 | 36.40 |
| 4 | 49.2336 | 7.200 | 1.49700 | 81.61 |
| 5 | 332.7367 | Variable | | |
| 6 | 152.3830 | 1.700 | 1.69680 | 55.52 |
| 7 | 31.0229 | 5.695 | | |
| 8 | 32.0867 | 5.500 | 1.78472 | 25.64 |
| 9 | −139.5695 | 1.399 | | |
| 10 | −403.4713 | 1.300 | 1.77250 | 49.62 |
| 11 | 33.8214 | 4.300 | | |
| 12 | −34.0003 | 1.200 | 1.85026 | 32.35 |
| 13 | −235.0206 | Variable | | |
| 14 | 69.3622 | 1.200 | 1.80100 | 34.92 |
| 15 | 29.8420 | 5.900 | 1.64000 | 60.19 |
| 16 | −71.2277 | 1.500 | | |
| 17 | 34.4997 | 6.000 | 1.48749 | 70.32 |
| 18 | −43.1246 | 1.300 | 1.80610 | 40.97 |
| 19 | 382.2412 | 2.700 | | |
| 20 | ∞ | Variable | | (Stop S) |
| 21 | 350.0000 | 1.200 | 1.83400 | 37.18 |
| 22 | 30.6178 | 4.800 | 1.51680 | 63.88 |
| 23 | −88.2508 | 0.200 | | |
| 24 | 66.4312 | 2.800 | 1.80100 | 34.92 |
| 25 | −142.7832 | Variable | | |
| 26 | −93.6206 | 2.200 | 1.80518 | 25.45 |
| 27 | −44.3477 | 6.500 | | |
| 28 | −37.1859 | 1.000 | 1.77250 | 49.62 |
| 29 | 68.3000 | Variable | | |
| 30 | −24.9508 | 1.400 | 1.62004 | 36.40 |
| 31 | −42.7086 | 0.200 | | |
| 32 | 106.0000 | 3.800 | 1.67003 | 47.14 |
| 33 | −106.0000 | BF | | |
| Image surface | ∞ | | | |

[Various data]
Zooming ratio 4.05

| | W | M | T |
|---|---|---|---|
| f | 72.1 | 100.0 | 292.0 |
| FNO | 4.49 | 4.85 | 5.88 |
| 2ω | 33.98 | 24.48 | 8.44 |
| Ymax | 21.60 | 21.60 | 21.60 |
| TL | 190.26 | 205.79 | 245.82 |
| BF | 39.12 | 46.10 | 67.12 |

[Variable distance data]

| | W Infinity | M Infinity | T Infinity | W Short distance | M Short distance | T Short distance |
|---|---|---|---|---|---|---|
| d5 | 5.981 | 21.510 | 61.535 | 5.981 | 21.510 | 61.535 |
| d13 | 30.000 | 23.014 | 2.000 | 30.000 | 23.014 | 2.000 |
| d20 | 14.365 | 14.107 | 14.196 | 14.365 | 14.107 | 14.196 |
| d25 | 2.202 | 3.476 | 3.676 | 2.867 | 4.301 | 5.396 |
| d29 | 21.004 | 19.988 | 19.700 | 20.339 | 19.163 | 17.979 |

[Lens group data]

| Group | Starting surface | f |
|---|---|---|
| G1 | 1 | 145.335 |
| G2 | 6 | −29.607 |
| G3 | 14 | 48.974 |
| G4 | 21 | 62.364 |
| G5 | 26 | −48.296 |
| G6 | 30 | 336.791 |

[Conditional expression corresponding value]

(1) fvr/fTM2 = 1.747
(2) nvrN/nvrP = 1.098
(3) vvrN/vvrP = 0.580
(4) (−fTM1)/f1 = 0.204
(5) fTM2/f1 = 0.264
(6) (−fN)/fP = 1.253

TABLE 3-continued

Third Example (7) f1/fw= 2.016
(8) f1/(−fTM1) = 4.909
(9) f1/fTM2 = 3.786

Figure 12A:
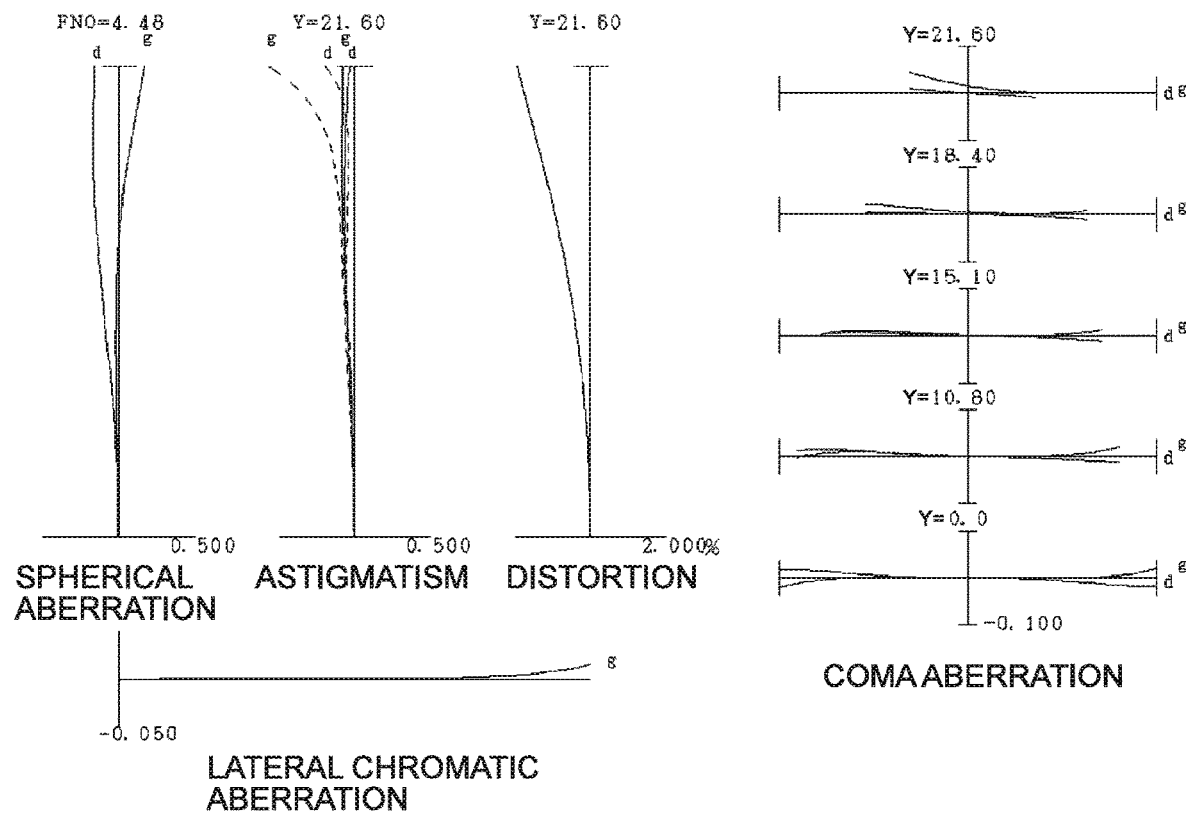
FIG. 12A is graphs showing various aberrations of the zoom optical system according to the third example upon focusing on infinity in the wide-angle end state.
Figure 12B:
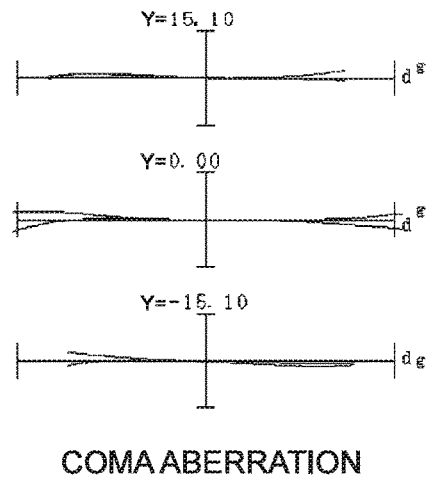
FIG. 12B is graphs showing meridional lateral aberrations when blur correction is applied to a rotational blur by 0.30°.
Figure 13:
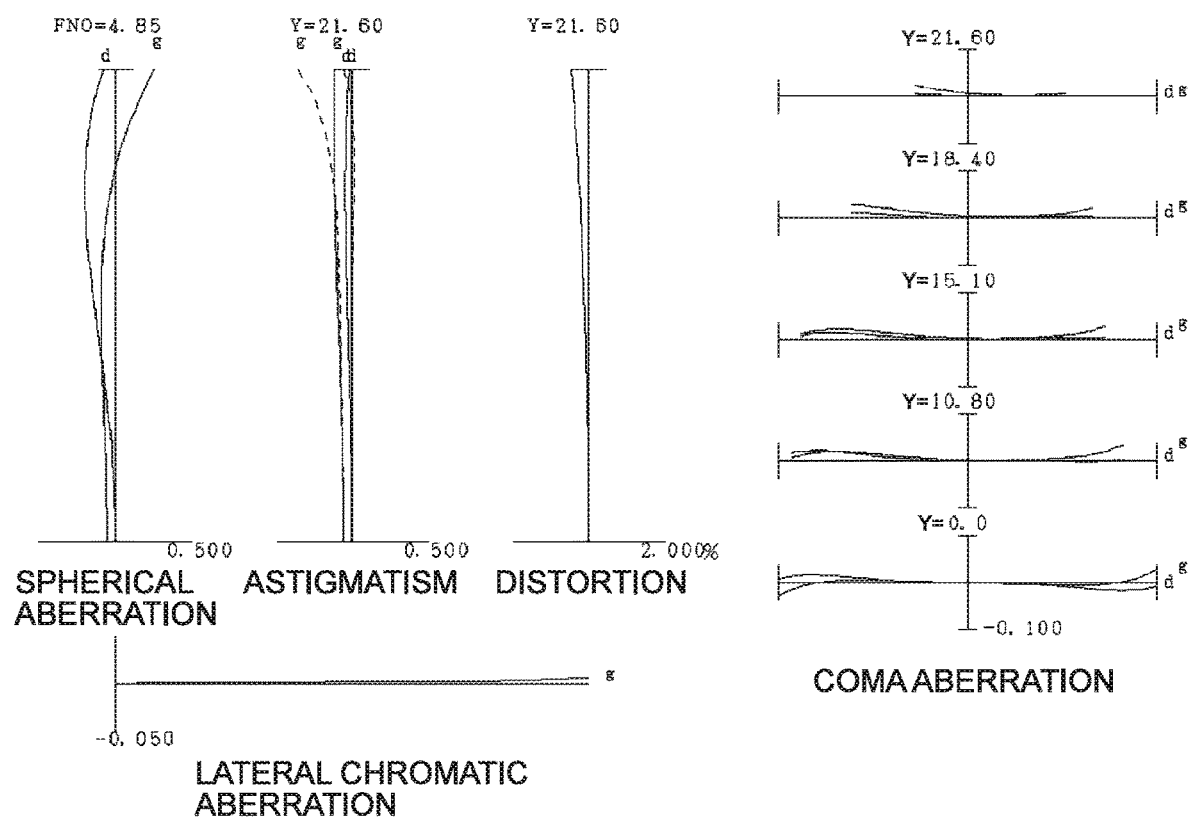
FIG. 13 is graphs showing various aberrations of the zoom optical system according to the third example upon focusing on infinity in the intermediate focal length state.
Figure 14A:
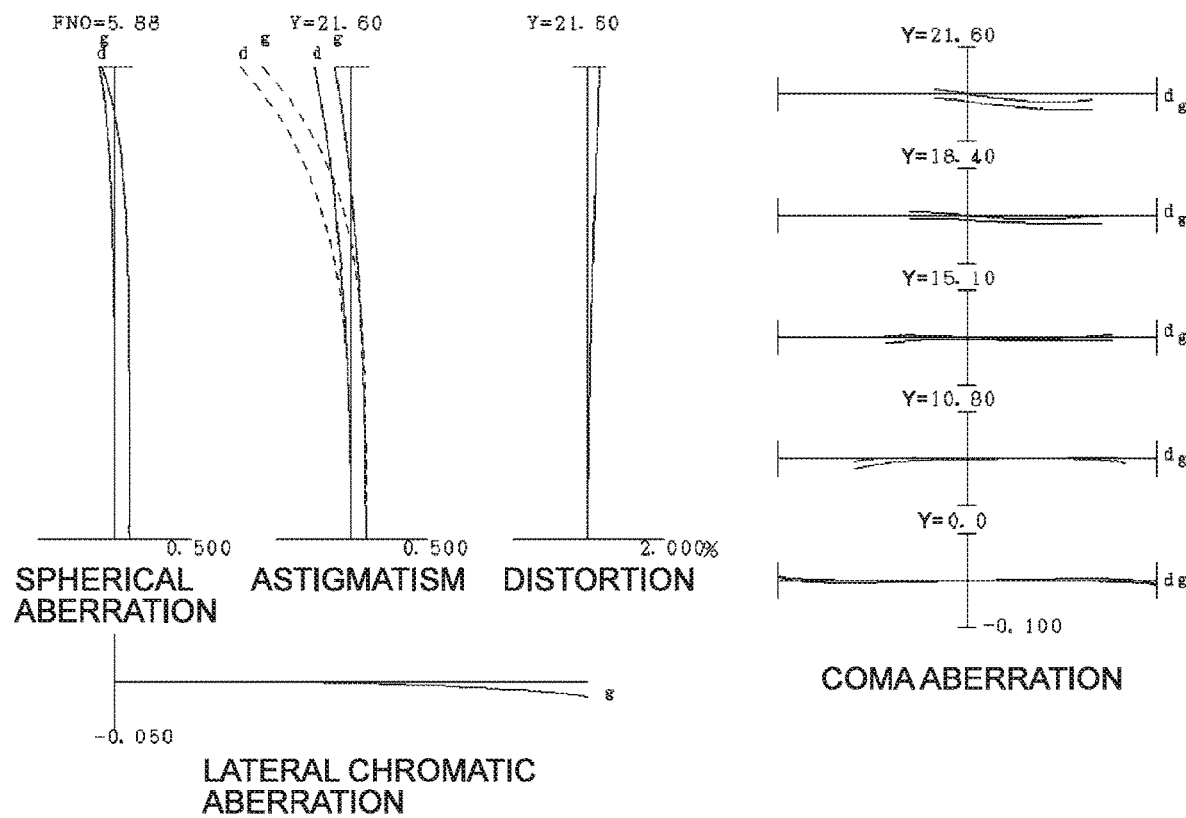
FIG. 14A is graphs showing various aberrations of the zoom optical system according to the third example upon focusing on infinity in the telephoto end state.
Figure 14B:
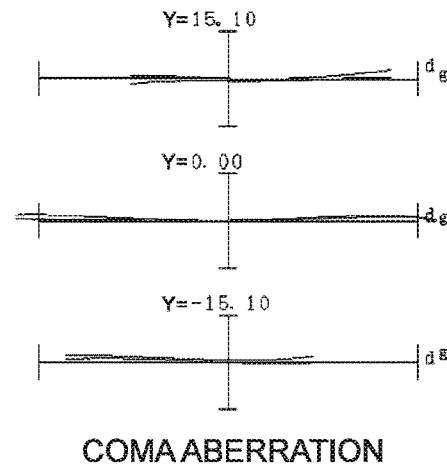
FIG. 14B is graphs showing meridional lateral aberrations when blur correction is applied to a rotational blur by 0.20°.
Figure 15A:
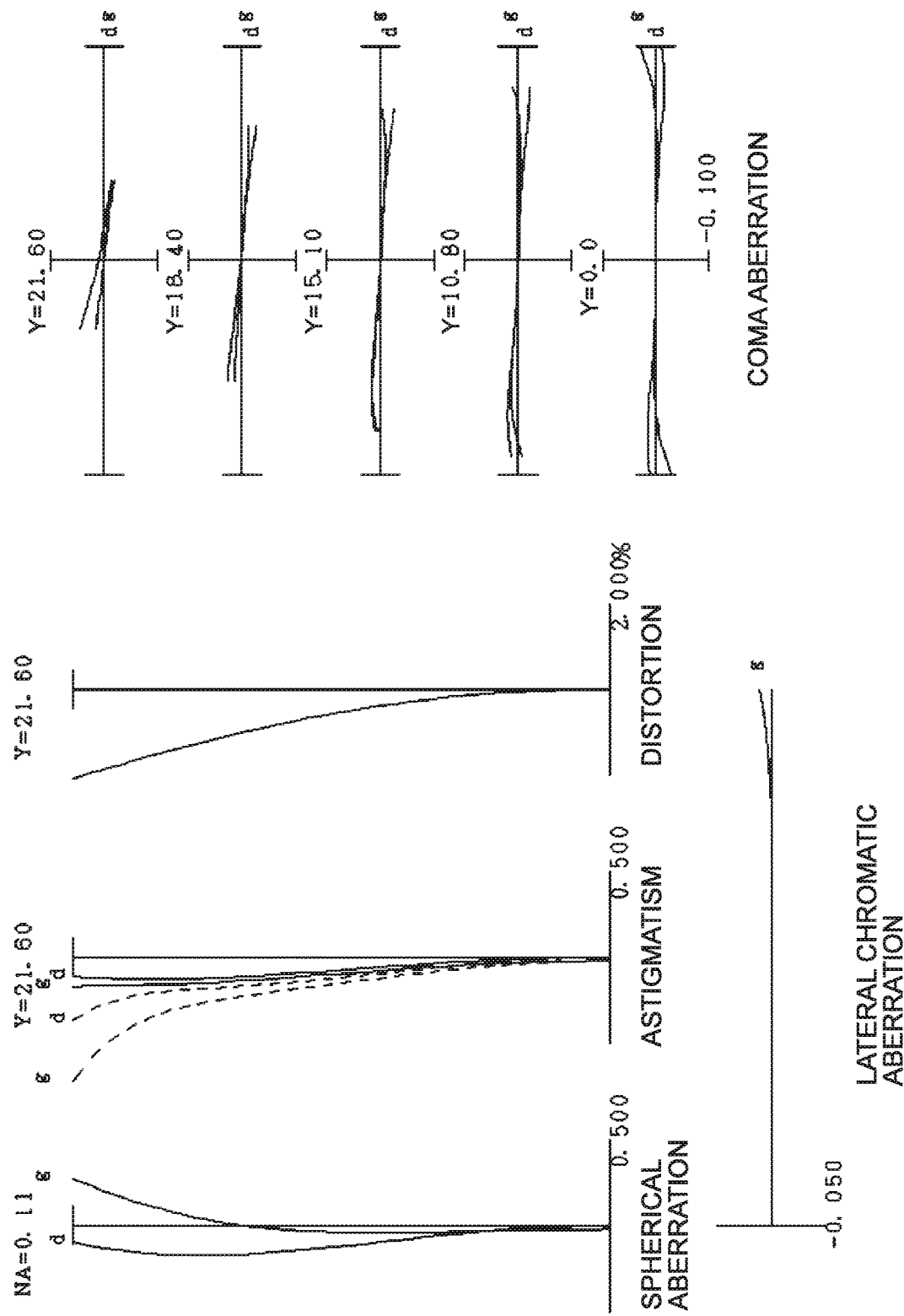

FIGS. 12A and 12B are graphs showing various aberrations of the zoom optical system having a vibration-proof function according to the third example upon focusing on infinity in the wide-angle end state, and graphs showing meridional lateral aberrations when blur correction is applied to a rotational blur by 0.30°, respectively. FIG. 13 is graphs showing various aberrations of the zoom optical system having the vibration-proof function according to the third example upon focusing on infinity in the intermediate focal length state. FIGS. 14A and 14B are graphs showing various aberrations of the zoom optical system having a vibration-proof function according to the third example upon focusing on infinity in the telephoto end state, and graphs showing meridional lateral aberrations when blur correction is applied to a rotational blur by 0.20°, respectively. FIGS. 15A, 15B and 15C are graphs showing various aberrations of the zoom optical system according to the third example upon focusing on a short distant object in the wide-angle end state, the intermediate focal length state, and the telephoto end state, respectively.

The graphs showing various aberrations show that the zoom optical system according to this example favorably corrects the various aberrations and has excellent image forming performances from the wide-angle end state to the telephoto end state, and further has excellent image forming performances also upon focusing on a short distant object.

Fourth Example

FIG. 16 shows a lens configuration of a zoom optical system according to the fourth example of this embodiment. The zoom optical system according to this example consists of, in order from the object: a first lens group G1 having a positive refractive power; a second lens group G2 having a negative refractive power; a third lens group G3 having a positive refractive power; and a fourth lens group G4 having a negative refractive power.

In relation to the embodiment described above, in this configuration, the first lens group G1 corresponds to the front lens group GFS, the second lens group G2 corresponds to the M1 lens group GM1, the third lens group G3 corresponds to the M2 lens group GM2, and the fourth lens group G4 corresponds to the RN lens group GRN.

The first lens group G1 consists of, in order from the object: a positive convexo-planar lens L11 having a convex surface facing the object; and a positive cemented lens consisting of a negative meniscus lens L12 having a convex surface facing the object, and a positive biconvex lens L13.

The second lens group G2 consists of, in order from the object: a negative meniscus lens L21 having a convex surface facing the object; a positive biconvex lens L22; a negative biconcave lens L23; and a negative meniscus lens L24 having a concave surface facing the object.

The third lens group G3 consists of, in order from the object: a positive cemented lens consisting of a negative meniscus lens L31 having a convex surface facing the object, and a positive biconvex lens L32; a positive cemented lens consisting of a positive biconvex lens L33, and a negative meniscus lens L34 having a concave surface facing the object; an aperture stop S; a negative cemented lens consisting of a negative meniscus lens L35 having a convex surface facing the object, and a positive biconvex lens L36; and a positive biconvex lens L37.

The fourth lens group G4 consists of, in order from the object: a positive meniscus lens L41 having a concave surface facing the object; and a negative biconcave lens L42.

In the optical system according to this example, focusing from a long distant object to a short distant object is performed by moving the fourth lens group G4 in the image surface direction.

The zoom optical system according to this example corrects the imaging position displacement due to a camera shake or the like by moving the positive cemented lens consisting of the negative meniscus lens L31 having the convex surface facing the object and the positive biconvex lens L32, in a direction orthogonal to the optical axis. That is, the lenses L31 and L32 constitute the vibration-proof lens group, and correspond to the A lens group of the present invention and this embodiment.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction may be moved in a direction orthogonal to the optical axis by (f·tan θ)/K. At the wide-angle end in the fourth example, the vibration proof coefficient is 1.64, and the focal length is 72.1 mm. Accordingly, the amount of movement of the vibration-proof lens group to correct a rotational blur by 0.30° is 0.23 mm. In the telephoto end state in the fourth example, the vibration proof coefficient is 2.10, and the focal length is 292.0 mm. Accordingly, the amount of movement of the vibration-proof lens group to correct a rotational blur by 0.20° is 0.48 mm.

The following Table 4 lists the values of data on the optical system according to this example.

TABLE 4

Fourth Example

[Lens data]

| Surface No. | R | D | nd | vd |
|---|---|---|---|---|
| Object surface | ∞ | | | |
| 1 | 124.8083 | 4.600 | 1.48749 | 70.32 |
| 2 | ∞ | 0.200 | | |
| 3 | 111.5077 | 1.800 | 1.62004 | 36.40 |
| 4 | 51.2894 | 7.200 | 1.49700 | 81.61 |
| 5 | −4057.4569 | Variable | | |
| 6 | 1232.8716 | 1.700 | 1.69680 | 55.52 |
| 7 | 32.6209 | 3.624 | | |
| 8 | 33.1180 | 5.224 | 1.78472 | 25.64 |
| 9 | −126.9611 | 1.768 | | |
| 10 | −243.6400 | 1.300 | 1.77250 | 49.62 |
| 11 | 37.7537 | 4.300 | | |
| 12 | −33.1285 | 1.200 | 1.85026 | 32.35 |
| 13 | −124.4232 | Variable | | |
| 14 | 80.2408 | 1.200 | 1.80100 | 34.92 |
| 15 | 32.8582 | 5.862 | 1.64000 | 60.19 |
| 16 | −70.9140 | 1.500 | | |
| 17 | 40.5722 | 6.000 | 1.48749 | 70.32 |
| 18 | −43.0594 | 1.300 | 1.80610 | 40.97 |
| 19 | −2388.6437 | 2.700 | | |
| 20 | ∞ | 18.922 | | (Stop S) |
| 21 | 812.4602 | 1.200 | 1.83400 | 37.18 |
| 22 | 34.5376 | 5.275 | 1.51680 | 63.88 |

TABLE 4-continued

Fourth Example

| 23 | −59.1982 | 0.200 | | |
|---|---|---|---|---|
| 24 | 75.5608 | 3.209 | 1.80100 | 34.92 |
| 25 | −197.1038 | Variable | | |
| 26 | −76.9453 | 2.263 | 1.80518 | 25.45 |
| 27 | −41.7537 | 6.500 | | |
| 28 | −33.9973 | 1.000 | 1.77250 | 49.62 |
| 29 | 132.3165 | BF | | |
| Image surface | ∞ | | | |

[Various data]
Zooming ratio 4.05

| | W | M | T |
|---|---|---|---|
| f | 72.1 | 100.0 | 292.0 |
| FNO | 4.68 | 4.90 | 6.19 |
| 2ω | 33.78 | 23.92 | 8.22 |
| Ymax | 21.60 | 21.60 | 21.60 |
| TL | 189.82 | 210.78 | 245.82 |
| BF | 64.99 | 69.56 | 89.99 |

[Variable distance data]

| | W Infinity | M Infinity | T Infinity | W Short distance | M Short distance | T Short distance |
|---|---|---|---|---|---|---|
| d5 | 2.000 | 22.956 | 58.000 | 2.000 | 22.956 | 58.000 |
| d13 | 30.000 | 25.721 | 2.000 | 30.000 | 25.721 | 2.000 |
| d25 | 2.777 | 2.495 | 5.785 | 3.449 | 3.343 | 7.497 |

[Lens group data]

| Group | Starting surface | f |
|---|---|---|
| G1 | 1 | 139.523 |
| G2 | 6 | −29.733 |
| G3 | 14 | 41.597 |
| G4 | 26 | −54.885 |

[Conditional expression corresponding value]

(1) fvr/fTM2 = 1.728
(2) nvrN/nvrP = 1.098
(3) vvrN/vvrP = 0.580
(4) (−fTM1)/f1 = 0.213
(5) fTM2/f1 = 0.298
(7) f1/fw = 1.935
(8) f1/(−fTM1) = 4.693
(9) f1/fTM2 = 3.354

Figure 17A:
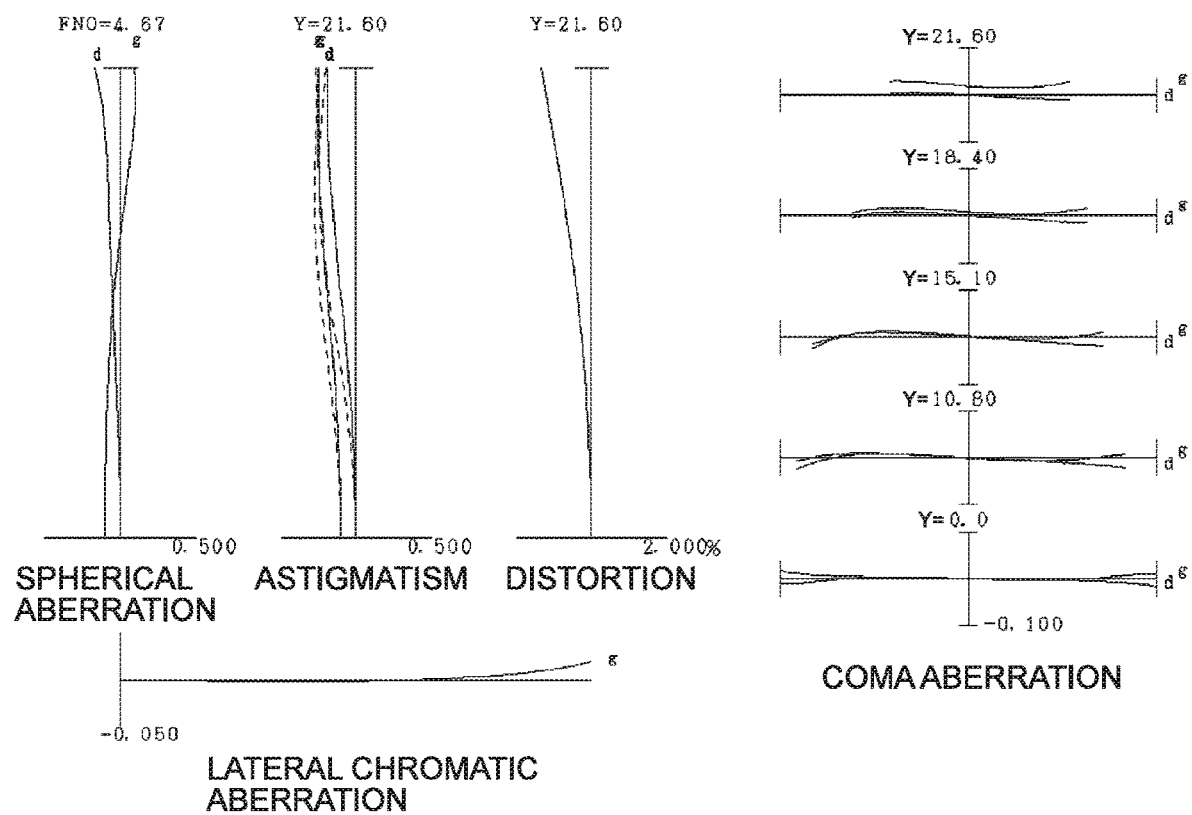
FIG. 17A is graphs showing various aberrations of the zoom optical system according to the fourth example upon focusing on infinity in the wide-angle end state.
Figure 17B:
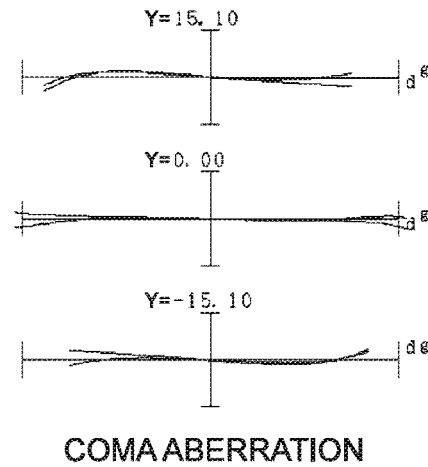
FIG. 17B is graphs showing meridional lateral aberrations when blur correction is applied to a rotational blur by 0.30°.
Figure 18:
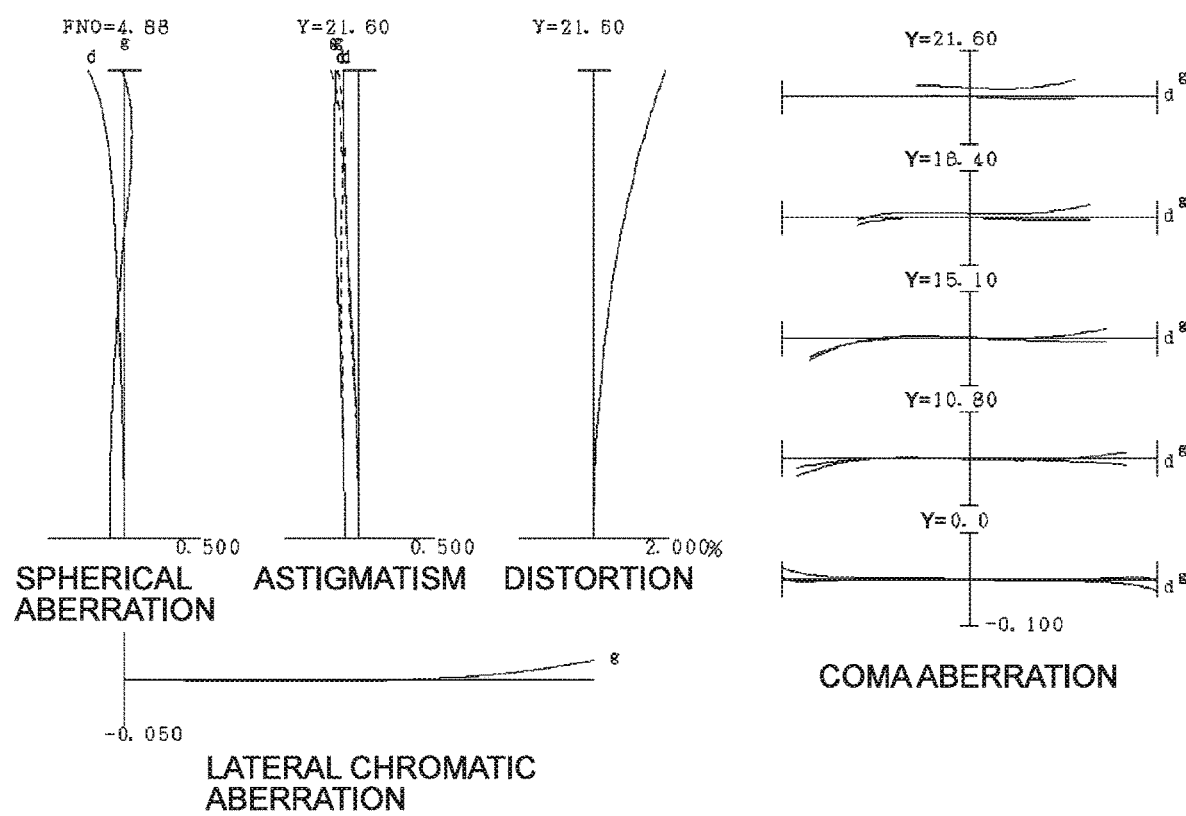
FIG. 18 is graphs showing various aberrations of the zoom optical system according to the fourth example upon focusing on infinity in the intermediate focal length state.
Figure 19A:
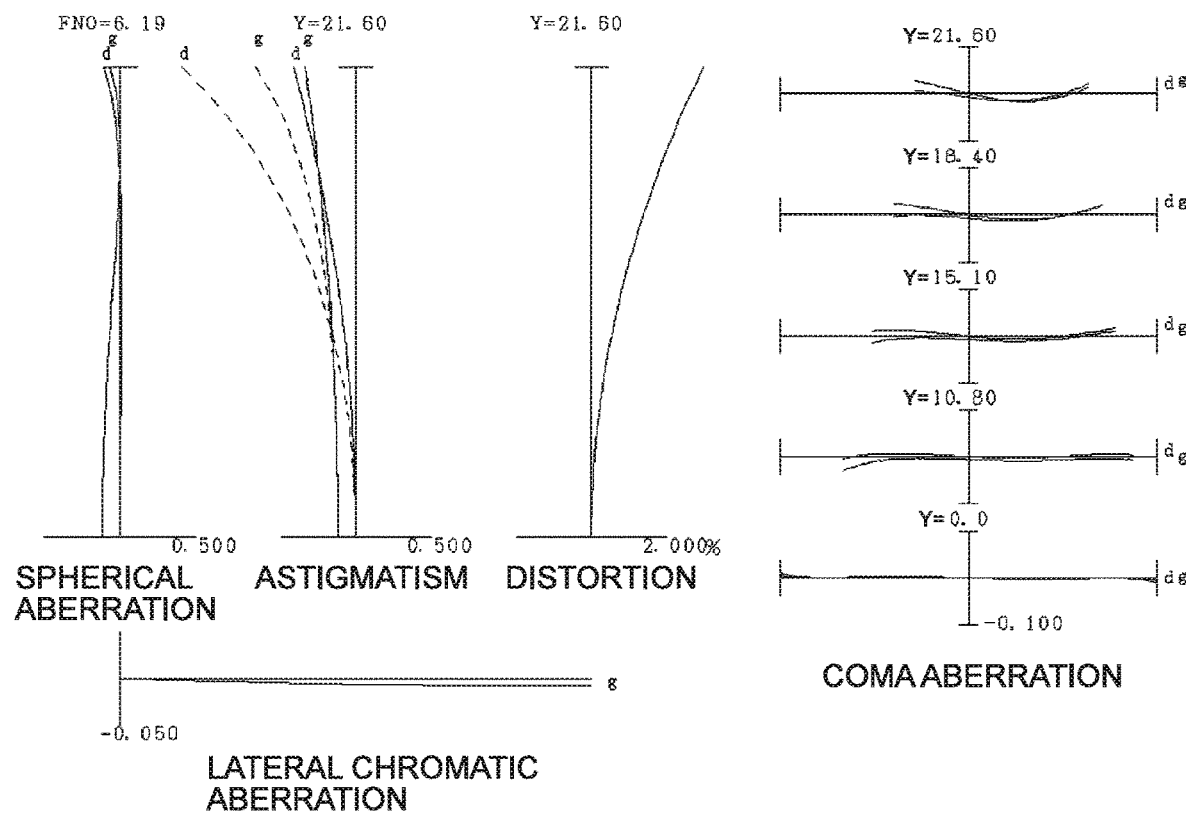
FIG. 19A is graphs showing various aberrations of the zoom optical system according to the fourth example upon focusing on infinity in the telephoto end state.
Figure 19B:
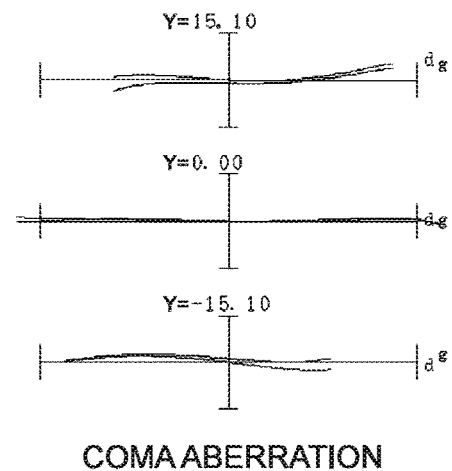
FIG. 19B is graphs showing meridional lateral aberrations when blur correction is applied to a rotational blur by 0.20°.

FIGS. 17A and 17B are graphs showing various aberrations of the zoom optical system having the vibration-proof function according to the fourth example upon focusing on infinity in the wide-angle end state, and graphs showing meridional lateral aberrations when blur correction is applied to a rotational blur by 0.30°, respectively. FIG. 18 is graphs showing various aberrations of the zoom optical system having the vibration-proof function according to the fourth example upon focusing on infinity in the intermediate focal length state. FIGS. 19A and 19B are graphs showing various aberrations of the zoom optical system having the vibration-proof function according to the fourth example upon focusing on infinity in the telephoto end state, and graphs showing meridional lateral aberrations when blur correction is applied to a rotational blur by 0.20°, respectively. FIGS. 20A, 20B and 20C are graphs showing various aberrations of the zoom optical system according to the fourth example upon focusing on a short distant object in the wide-angle end state, the intermediate focal length state, and the telephoto end state, respectively.

The graphs showing various aberrations show that the zoom optical system according to this example favorably corrects the various aberrations and has excellent image forming performances from the wide-angle end state to the telephoto end state, and further has excellent image forming performances also upon focusing on a short distant object.

Fifth Example

FIG. 21 shows a lens configuration of a zoom optical system according to the fifth example of this embodiment. The zoom optical system according to this example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power.

In relation to the embodiment described above, in this configuration, the first lens group G1 corresponds to the front lens group GFS, the second lens group G2 corresponds to the M1 lens group GM1, the third lens group G3 corresponds to the M2 lens group GM2, and the fourth lens group G4 corresponds to the RN lens group GRN.

The first lens group G1 consists of, in order from the object: a positive convexo-planar lens L11 having a convex surface facing the object; and a positive cemented lens consisting of a negative meniscus lens L12 having a convex surface facing the object, and a positive meniscus lens L13 having a convex surface facing the object.

The second lens group G2 consists of, in order from the object: a negative meniscus lens L21 having a convex surface facing the object; a positive biconvex lens L22; a negative biconcave lens L23; and a negative meniscus lens L24 having a concave surface facing the object.

The third lens group G3 consists of, in order from the object: a positive cemented lens consisting of a negative meniscus lens L31 having a convex surface facing the object, and a positive biconvex lens L32; a positive cemented lens consisting of a positive biconvex lens L33, and a negative biconcave lens L34; an aperture stop S; a negative cemented lens consisting of a negative meniscus lens L35 having a convex surface facing the object, and a positive biconvex lens L36; and a positive biconvex lens L37.

The fourth lens group G4 consists of, in order from the object: a positive meniscus lens L41 having a concave surface facing the object; and a negative biconcave lens L42.

The fifth lens group G5 consists of, in order from the object: a negative meniscus lens L51 having a concave surface facing the object; a positive biconvex lens L52; and a positive meniscus lens L53 having a convex surface facing the object.

In the optical system according to this example, focusing from a long distant object to a short distant object is performed by moving the fourth lens group G4 in the image surface direction. The imaging position displacement due to a camera shake or the like is corrected by moving the positive cemented lens that consists of the negative meniscus lens L31 having the convex surface facing the object and the positive biconvex lens L32, in a direction orthogonal to the optical axis. That is, the lenses L31 and L32 constitute the vibration-proof lens group, and correspond to the A lens group of the present invention and this embodiment.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. At the wide-angle end in the fourth example, the vibration proof coefficient is 1.65, and the focal length is 72.1 mm. Accordingly, the amount of movement of the vibration-proof lens group to correct a rotational blur by 0.30° is 0.23 mm. In the telephoto end state in the fourth example, the vibration proof coefficient is 2.10, and the focal length is 292.0 mm. Accordingly, the amount of movement of the vibration-proof lens group to correct a rotational blur by 0.20° is 0.49 mm.

The following Table 5 lists the values of data on the optical system according to this example.

TABLE 5

Fifth Example

[Lens data]

| Surface No. | R | D | nd | vd |
|---|---|---|---|---|
| Object surface | ∞ | | | |
| 1 | 109.5099 | 4.600 | 1.48749 | 70.32 |
| 2 | ∞ | 0.200 | | |
| 3 | 101.8486 | 1.800 | 1.62004 | 36.40 |
| 4 | 49.8873 | 7.200 | 1.49700 | 81.61 |
| 5 | 403.0130 | Variable | | |
| 6 | 166.1577 | 1.700 | 1.69680 | 55.52 |
| 7 | 31.1882 | 3.953 | | |
| 8 | 32.0256 | 5.500 | 1.78472 | 25.64 |
| 9 | −139.5816 | 1.553 | | |
| 10 | −767.2482 | 1.300 | 1.77250 | 49.62 |
| 11 | 33.9202 | 4.300 | | |
| 12 | −32.8351 | 1.200 | 1.85026 | 32.35 |
| 13 | −256.2484 | Variable | | |
| 14 | 69.5902 | 1.200 | 1.80100 | 34.92 |
| 15 | 29.9877 | 5.900 | 1.64000 | 60.19 |
| 16 | −70.0411 | 1.500 | | |
| 17 | 36.2271 | 6.000 | 1.48749 | 70.32 |
| 18 | −39.9358 | 1.300 | 1.80610 | 40.97 |
| 19 | 820.8027 | 2.700 | | |
| 20 | ∞ | 14.092 | | (Stop S) |
| 21 | 427.1813 | 1.200 | 1.83400 | 37.18 |
| 22 | 31.7606 | 4.800 | 1.51680 | 63.88 |
| 23 | −89.4727 | 0.200 | | |
| 24 | 73.5865 | 2.800 | 1.80100 | 34.92 |
| 25 | −110.0493 | Variable | | |
| 26 | −83.7398 | 2.200 | 1.80518 | 25.45 |
| 27 | −42.9999 | 6.500 | | |
| 28 | −36.8594 | 1.000 | 1.77250 | 49.62 |
| 29 | 73.0622 | Variable | | |
| 30 | −26.0662 | 1.400 | 1.62004 | 36.4 |
| 31 | −40.4068 | 0.200 | | |
| 32 | 143.0444 | 3.035 | 1.67003 | 47.14 |
| 33 | −220.8402 | 0.200 | | |
| 34 | 100.4330 | 2.145 | 1.79002 | 47.32 |
| 35 | 170.3325 | BF | | |
| Image surface | ∞ | | | |

[Various data]
Zooming ratio 4.05

| | W | M | T |
|---|---|---|---|
| f | 72.1 | 100.0 | 292.0 |
| FNO | 4.48 | 4.85 | 5.87 |
| 2ω | 33.94 | 24.44 | 8.42 |
| Ymax | 21.60 | 21.60 | 21.60 |
| TL | 190.21 | 205.27 | 245.82 |
| BF | 39.12 | 46.37 | 67.13 |

TABLE 5-continued

Fifth Example

[Variable distance data]

|  | W Infinity | M Infinity | T Infinity | W Short distance | M Short distance | T Short distance |
|---|---|---|---|---|---|---|
| d5 | 5.892 | 20.953 | 61.502 | 5.892 | 20.953 | 61.502 |
| d13 | 30.000 | 22.752 | 2.000 | 30.000 | 22.752 | 2.000 |
| d25 | 2.212 | 3.707 | 3.900 | 2.864 | 4.521 | 5.606 |
| d29 | 21.306 | 19.811 | 19.618 | 20.654 | 18.997 | 17.912 |

[Lens group data]

| Group | Starting surface | f |
|---|---|---|
| G1 | 1 | 145.022 |
| G2 | 6 | −29.562 |
| G3 | 14 | 38.233 |
| G4 | 26 | −48.257 |
| G5 | 30 | 318.066 |

[Conditional expression corresponding value]

(1) fvr/fTM2 = 1.738
(2) nvrN/nvrP = 1.098
(3) vvrN/vvrP = 0.580
(4) (−fTM1)/f1 = 0.204
(5) fTM2/f1 = 0.264
(6) (−fN)/fP = 0.947
(7) f1/fw = 2.011
(8) f1(−fTM1) = 4.906
(9) f1/fTM2 = 3.793

Figure 22A:
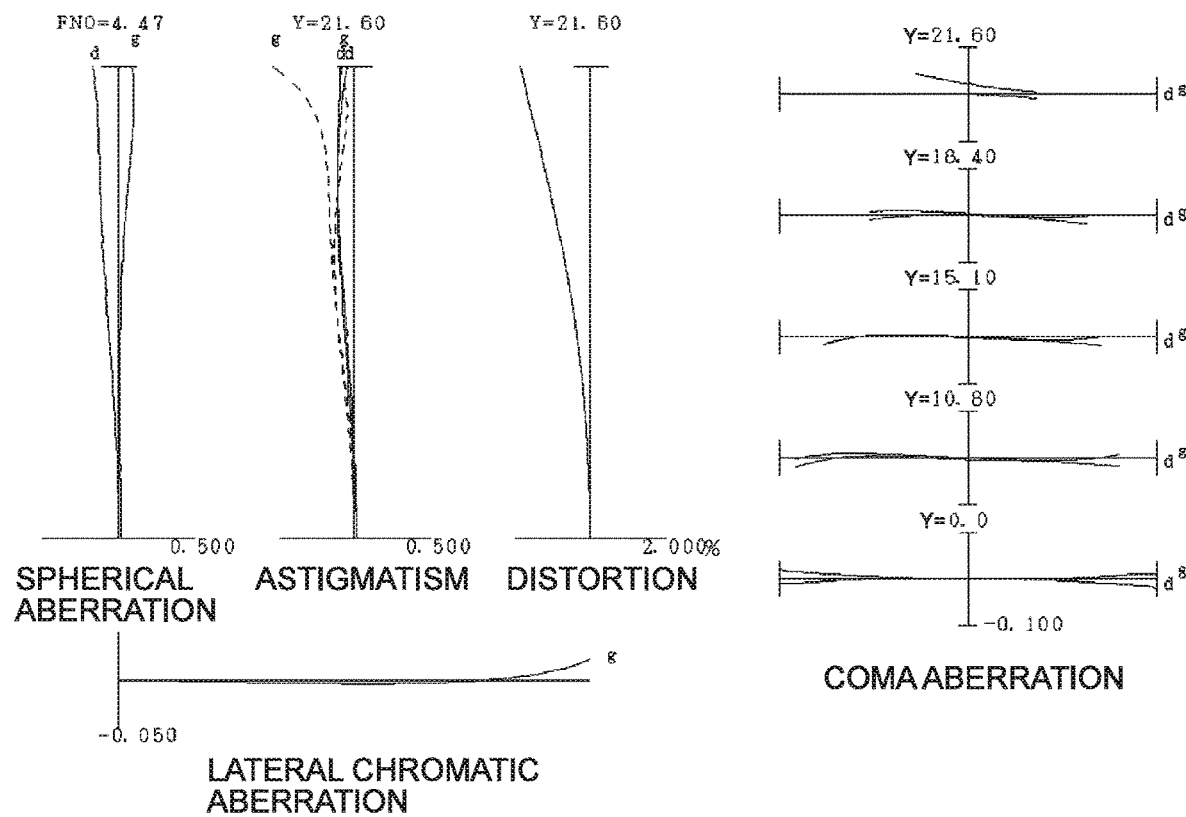
FIG. 22A is graphs showing various aberrations of the zoom optical system according to the fifth example upon focusing on infinity in the wide-angle end state.
Figure 22B:
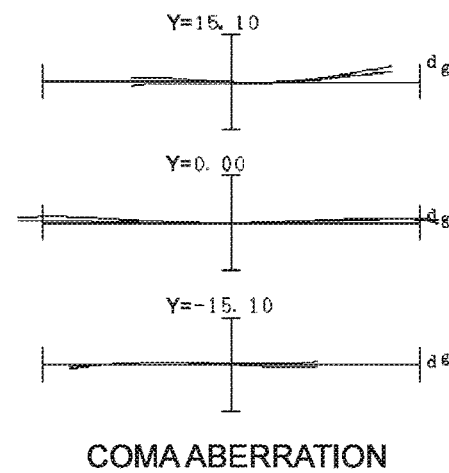
FIG. 22B is graphs showing meridional lateral aberrations when blur correction is applied to a rotational blur by 0.30°.
Figure 23:
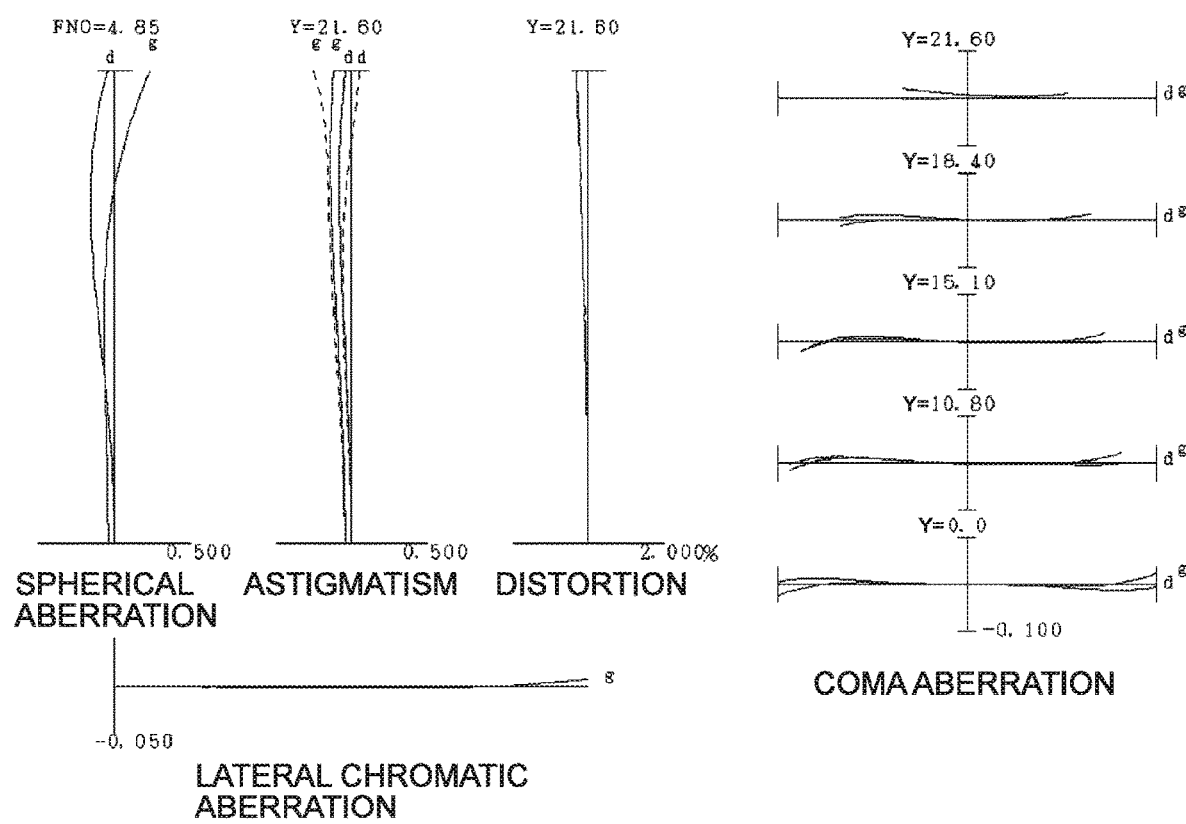
FIG. 23 is graphs showing various aberrations of the zoom optical system according to the fifth example upon focusing on infinity in the intermediate focal length state.
Figure 24A:
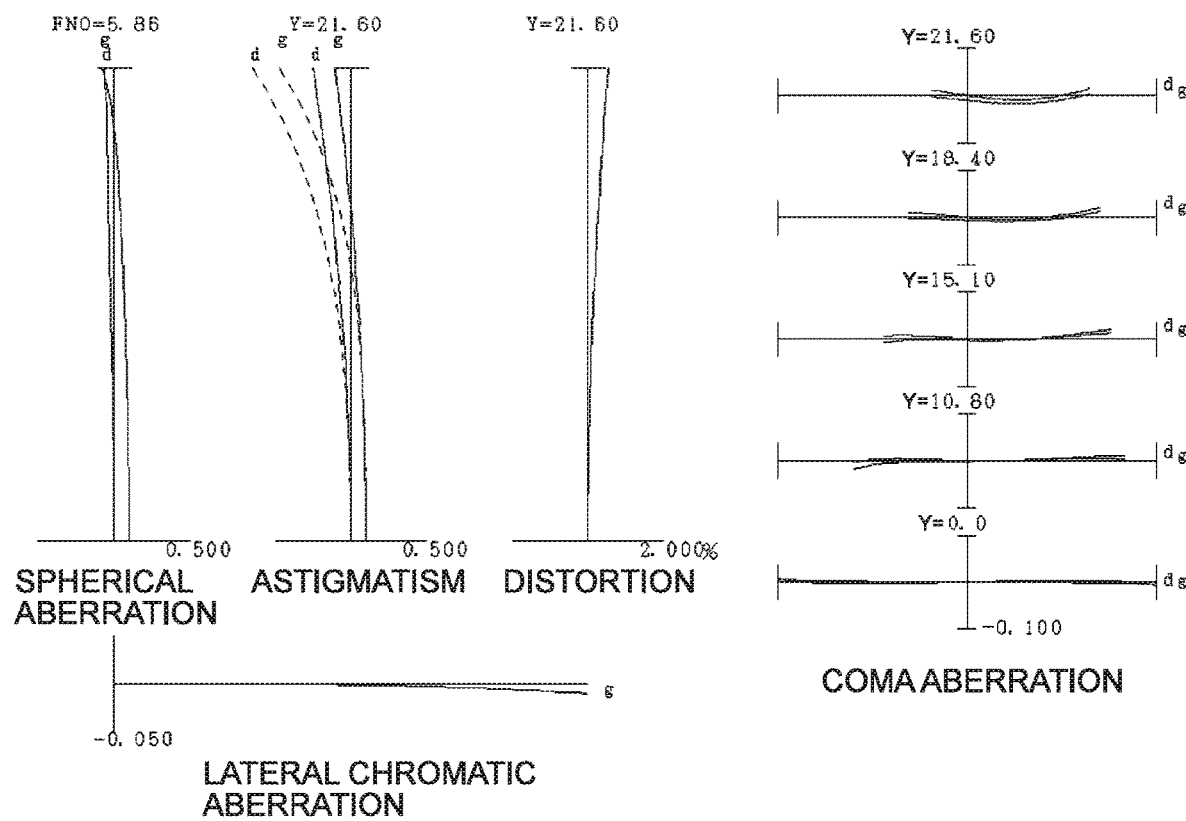
FIG. 24A is graphs showing various aberrations of the zoom optical system according to the fifth example upon focusing on infinity in the telephoto end state.
Figure 24B:
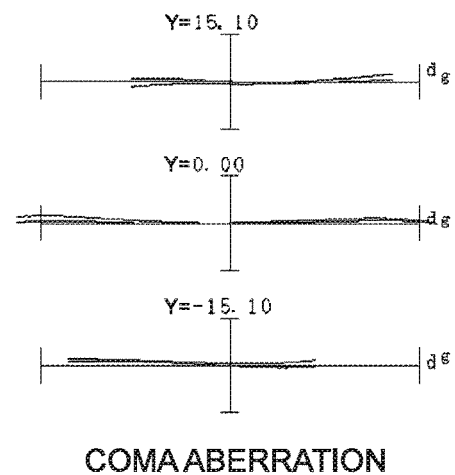
FIG. 24B is graphs showing meridional lateral aberrations when blur correction is applied to a rotational blur by 0.20°.

FIGS. 22A and 22B are graphs showing various aberrations of the zoom optical system having a vibration-proof function according to the fifth example upon focusing on infinity in the wide-angle end state, and graphs showing meridional lateral aberrations when blur correction is applied to a rotational blur by 0.30°, respectively. FIG. 23 is graphs showing various aberrations of the zoom optical system having the vibration-proof function according to the fifth example upon focusing on infinity in the intermediate focal length state. FIGS. 24A and 24B are graphs showing various aberrations of the zoom optical system having a vibration-proof function according to the fifth example upon focusing on infinity in the telephoto end state, and graphs showing meridional lateral aberrations when blur correction is applied to a rotational blur by 0.20°, respectively. FIGS. 25A, 25B and 25C are graphs showing various aberrations of the zoom optical system according to the fifth example upon focusing on a short distant object in the wide-angle end state, the intermediate focal length state, and the telephoto end state, respectively.

The graphs showing various aberrations show that the zoom optical system according to this example favorably corrects the various aberrations and has excellent image forming performances from the wide-angle end state to the telephoto end state, and further has excellent image forming performances also upon focusing on a short distant object.

According to each of the examples described above, reduction in size and weight of the focusing lens group can achieve high-speed AF and silence during AF without increasing the size of the lens barrel, and the zoom optical system can be achieved that favorably suppresses variation of aberrations upon zooming from the wide-angle end state to the telephoto end state, and variation of aberrations upon focusing from an infinite distant object to a short distant object.

Here, each of the examples described above represents a specific example of the invention of the present application. The invention of the present application is not limited thereto.

Note that the following details can be appropriately adopted in a range without impairing the optical performance of the zoom optical system of the present application.

The five-group configurations and the six-group configurations have been described as the numeric examples of the zoom optical systems of the present application. However, the present application is not limited thereto. Zoom optical systems having other group configurations (for example, seven-group ones and the like) can also be configured. Specifically, a zoom optical system having a configuration where a lens or a lens group is added to the zoom optical system of the present application at a position nearest to the object or to the image surface may be configured. Note that the lens group indicates a portion that has at least one lens and is separated by air distances varying upon zooming.

The lens surfaces of the lenses constituting the zoom optical system of the present application may be spherical surfaces, plane surfaces, or aspherical surfaces. A case where the lens surface is a spherical surface or a plane surface facilitates lens processing and assembly adjustment, and can prevent the optical performance from being reduced owing to the errors in lens processing or assembly adjustment. Consequently, the case is preferable. It is also preferable because reduction in depiction performance is small even when the image surface deviates. In a case where the lens surface is an aspherical surface, the surface may be an aspherical surface made by a grinding process, a glass mold aspherical surface made by forming glass into an aspherical shape with a mold, or a composite type aspherical surface made by forming resin provided on the glass surface into an aspherical shape. The lens surface may be a diffractive surface. The lens may be a gradient index lens (GRIN lens) or a plastic lens.

An antireflection film having a high transmissivity over a wide wavelength range may be applied to the lens surfaces of the lenses constituting the zoom optical system of the present application. This reduces flares and ghosts, and can achieve a high optical performance having a high contrast.

According to the configurations described above, this camera 1 mounted with the zoom optical system according to the first example as the imaging lens 2 can achieve high-speed AF and silence during AF without increasing the size of the lens barrel, by reducing the size and weight of the focusing lens group, can favorably suppresses variation of aberrations upon zooming from the wide-angle end state to the telephoto end state, and variation of aberrations upon focusing from an infinite distant object to a short distant object, and can achieve a favorable optical performance. Note that possible configurations of cameras mounted with the zoom optical systems according to the second to seventh examples described above as the imaging lens 2 can also exert the advantageous effects analogous to those of the camera 1 described above.

EXPLANATION OF NUMERALS AND CHARACTERS

| | |
|---|---|
| G1 First lens group | G2 Second lens group |
| G3 Third lens group | G4 Fourth lens group |
| G5 Fifth lens group | GFS Front lens group |

| | |
|---|---|
| GM1 M1 lens group | GM2 M2 lens group |
| GEN KN lens group | S Aperture stop |
| I Image surface | |

The invention claimed is:

1. A zoom optical system comprising, in order from an object:
   a front lens group having a positive refractive power;
   an M1 lens group having a negative refractive power;
   an M2 lens group having a positive refractive power; and
   an RN lens group having a negative refractive power, wherein
   upon zooming, a distance between the front lens group and the M1 lens group changes, a distance between the M1 lens group and the M2 lens group changes, and a distance between the M2 lens group and the RN lens group changes,
   upon zooming, a lens group nearest to an image moves along an optical axis,
   upon focusing from an infinite distant object to a short distant object, the RN lens group moves,
   the zoom optical system further comprises, in order from the object, a lens having a negative refractive power and a lens having a positive refractive power provided adjacent to the RN lens group on an image side,
   the M2 lens group comprises an A lens group, and following conditional expressions are satisfied, $$1.10 < fvr/fTM2 < 2.00$$

$$3.20 < f1/(fTM2) < 5.00$$

where
   fvr: a focal length of the A lens group,
   fTM2: a focal length of the M2 lens group in a telephoto end state, and
   f1: a focal length of the front lens group.

2. The zoom optical system according to claim 1, wherein upon zooming from a wide-angle end state to a telephoto end state, the front lens group moves toward the object.

3. The zoom optical system according to claim 1, wherein upon zooming, a lens group nearest to the object in the M1 lens group is fixed with respect to an image surface.

4. The zoom optical system according to claim 1, wherein the A lens group consists of, in order from the object:
   a lens having a negative refractive power; and
   a lens having a positive refractive power.

5. The zoom optical system according to claim 4, wherein a following conditional expression is satisfied, $$1.00 < nvrN/nvrP < 1.25$$

where
   nvrN: a refractive index of the lens having the negative refractive power in the A lens group, and
   nvrP: a refractive index of the lens having the positive refractive power in the A lens group.

6. The zoom optical system according to claim 4, wherein a following conditional expression is satisfied, $$0.30 < vvrN/vvrP < 0.90$$

where
   vvrN: an Abbe number of the lens having the negative refractive power in the A lens group, and
   vvrP: an Abbe number of the lens having the positive refractive power in the A lens group.

7. The zoom optical system according to claim 1, wherein a following conditional expression is satisfied, $$0.15 < (-fTM1)/f1 < 0.35$$

where
   fTM1: a focal length of the M1 lens group in a telephoto end state, and
   f1: a focal length of the front lens group.

8. The zoom optical system according to claim 1, wherein a following conditional expression is satisfied, $$0.20 < fTM2/f1 < 0.40$$

f1: a focal length of the front lens group.

9. The zoom optical system according to claim 1, wherein the A lens group is a vibration-proof lens group movable in a direction orthogonal to an optical axis to correct an imaging position displacement due to a camera shake or the like.

10. The zoom optical system according to claim 1, further comprising a negative meniscus lens that has a concave surface facing the object, which is provided adjacent to the RN lens group on the image side.

11. The zoom optical system according to claim 1, wherein a following conditional expression is satisfied, $$0.70 < (-fN)/fP < 2.00$$

where
    fN: a focal length of a lens that has a strongest negative refractive power among lenses disposed to the image side of the RN lens group, and
    fP: a focal length of a lens that has a strongest positive refractive power among lenses disposed to the image side of the RN lens group.

12. The zoom optical system according to claim 1, wherein a following conditional expression is satisfied, $$1.80 < f1/fw < 3.50$$

where
    fw: a focal length of the zoom optical system in a wide-angle end state, and
    f1: a focal length of the front lens group.

13. The zoom optical system according to claim 1, wherein a following conditional expression is satisfied, $$3.70 < f1/(-fTM1) < 5.00$$

where
    fTM1: a focal length of the M1 lens group in a telephoto end state, and
    f1: a focal length of the front lens group.

14. An optical apparatus comprising the zoom optical system according to claim 1.

15. An imaging apparatus comprising:
    the zoom optical system according to claim 1; and
    an imaging unit that takes an image formed by the zoom optical system.

16. A method for manufacturing a zoom optical system comprising, in order from an object, a front lens group having a positive refractive power, an M1 lens group having a negative refractive power, an M2 lens group having a positive refractive power, and an RN lens group having a negative refractive power,
    the method comprising one of features (A) and (B), wherein
    feature (A) comprises:
    achieving an arrangement where upon zooming, a distance between the front lens group and the M1 lens group changes, a distance between the M1 lens group and the M2 lens group changes, a distance between the M2 lens group and the RN lens group changes, and a lens group nearest to an image moves along an optical axis, wherein upon focusing from an infinite distant object to a short distant object, the RN lens group moves, the zoom optical system further comprises, in order from the object, a lens having a negative refractive power and a lens having a positive refractive power provided adjacent to the RN lens group on an image side, the M2 lens group comprises an A lens group, and following conditional expressions are satisfied, $1.10 < fvr/fTM2 < 2.00$ $3.20 < f1/fTM2 < 5.00$ where fvr: a focal length of the A lens group,
fTM2: a focal length of the M2 lens group in a telephoto end state, and
f1: a focal length of the front lens group, and
feature (B) comprises:
achieving an arrangement where upon zooming, a distance between the front lens group and the M1 lens group changes, a distance between the M1 lens group and the M1 lens group changes, and a distance between the M2 lens group and the RN lens group changes, wherein upon focusing from an infinite distant object to a short distant object, the RN lens group moves, a negative meniscus lens that has a concave surface facing the object is provided adjacent to the RN lens group on an image side, the M2 lens group comprises an A lens group, and following conditional expressions are satisfied, $1.10 < fvr/fTM2 < 2.00$ $0.15 < (-fTM1)/f1 < 0.30$ where
fvr: a focal length of the A lens group,
fTM2: a focal length of the M2 lens group in a telephoto end state,
fTM1: a focal length of the M1 lens group in a telephoto end state, and
f1: a focal length of the front lens group.

17. A zoom optical system comprising, in order from an object:

a front lens group having a positive refractive power;
an M1 lens group having a negative refractive power;
an M2 lens group having a positive refractive power; and
an RN lens group having a negative refractive power, wherein upon zooming, a distance between the front lens group and the M1 lens group changes, a distance between the M1 lens group and the M2 lens group changes, and a distance between the M2 lens group and the RN lens group changes, upon focusing from an infinite distant object to a short distant object, the RN lens group moves, a negative meniscus lens that has a concave surface facing the object is provided adjacent to the RN lens group on an image side, the M2 lens group comprises an A lens group, and following conditional expressions are satisfied, $1.10 < fvr/fTM2 < 2.00$ $0.15 < (-fTM1)/f1 < 0.35$ where
fvr: a focal length of the A lens group,
fTM2: a focal length of the M2 lens group in a telephoto end state,
fTM1: a focal length of the M1 lens group in a telephoto end state, and
f1: a focal length of the front lens group.

* * * * *